US012723687B2

(12) United States Patent
Finlayson

(10) Patent No.: US 12,723,687 B2
(45) Date of Patent: Sep. 1, 2026

(54) COUPLING PERMITTING LONGITUDINAL AXIS ROTATION OF PIPE ELEMENTS

(71) Applicant: Victaulic Company, Easton, PA (US)

(72) Inventor: Eric Frank Finlayson, Stroudsburg, PA (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 18/588,140

(22) Filed: Feb. 27, 2024

(65) Prior Publication Data

US 2024/0288104 A1 Aug. 29, 2024

Related U.S. Application Data

(60) Provisional application No. 63/600,392, filed on Nov. 17, 2023, provisional application No. 63/600,400, filed on Nov. 17, 2023, provisional application No. 63/448,366, filed on Feb. 27, 2023, provisional application No. 63/448,363, filed on Feb. 27, 2023, (Continued)

(51) Int. Cl.

| | |
|---|---|
| ***F16L 23/08*** | (2006.01) |
| ***F16L 1/06*** | (2006.01) |
| ***F16L 23/18*** | (2006.01) |
| ***F16L 27/08*** | (2006.01) |

(52) U.S. Cl.

CPC ................. *F16L 23/08* (2013.01); *F16L 1/06* (2013.01); *F16L 23/18* (2013.01); *F16L 27/0804* (2013.01)

(58) Field of Classification Search

CPC ... F16L 27/08; F16L 27/0804; F16L 27/0808; F16L 27/0812; F16L 27/0816; F16L 27/082; F16L 27/0824; F16L 27/0828; F16L 27/00; F16L 39/04; F16L 47/18; F16L 25/12

See application file for complete search history.

(56) References Cited

U.S. PATENT DOCUMENTS

| | | | |
|---|---|---|---|
| 686,598 | A | 11/1901 | Evans |
| 1,824,422 | A | 9/1931 | Badger |

(Continued)

FOREIGN PATENT DOCUMENTS

| | | | |
|---|---|---|---|
| CA | 2488958 | A1 | 6/2006 |
| CN | 216512621 | U | 5/2022 |

(Continued)

*Primary Examiner* — Aaron M Dunwoody
(74) *Attorney, Agent, or Firm* — Ballard Spahr LLP

(57) ABSTRACT

A coupling permitting rotation of pipe elements about their longitudinal axes includes a first ring attachable to a first of the pipe elements. The first ring has a first collar projecting outwardly therefrom and defining a low friction bearing surface. A housing defines a bore therethrough surrounding a longitudinal axis arranged coaxially with the bore. The housing has a first end and a second end oppositely disposed from one another. The first end is adapted to receive the first ring coaxially within the bore. The housing comprises a first shoulder and a first channel. When the first ring is received within the bore at the first end, the first collar is positionable between the first shoulder and the first channel. The bearing surface is engageable with the first shoulder. Engagement between the bearing surface and the first shoulder allows rotation of the first ring with respect to the housing.

35 Claims, 41 Drawing Sheets

Related U.S. Application Data provisional application No. 63/448,364, filed on Feb. 27, 2023.

(56) References Cited

U.S. PATENT DOCUMENTS 1,872,089 A 8/1932 Mckee
2,028,182 A 1/1936 Barnickol, Jr.
2,225,208 A 12/1940 Crickmer
2,308,757 A 1/1943 William
2,319,543 A 5/1943 Hall
2,323,179 A 6/1943 Robert et al.
2,422,502 A 6/1947 Schrader
2,438,312 A 3/1948 Bunn et al.
2,545,701 A 3/1951 McCausland
2,580,626 A * 1/1952 Warren .............. F16L 27/0816 285/179
3,455,582 A 7/1969 Von Hoevel
3,938,832 A 2/1976 Preston
3,984,131 A 10/1976 Gingrich, Jr. et al.
4,030,740 A 6/1977 Kniss, Jr. et al.
4,106,798 A 8/1978 Haug
4,146,253 A 3/1979 Celommi
4,225,143 A 9/1980 Hannah
4,274,663 A 6/1981 Becker et al.
4,284,280 A 8/1981 Bertram et al.
4,512,410 A 4/1985 Forester
4,569,539 A 2/1986 Creedon
4,640,533 A 2/1987 Klemm
5,011,196 A 4/1991 Sabatier et al.
5,094,795 A 3/1992 McMillan et al.
5,116,085 A 5/1992 Carrel
5,131,666 A 7/1992 Hutchens
5,262,438 A 11/1993 Benoit et al.
5,282,654 A 2/1994 Hendrickson
5,299,843 A 4/1994 Weigl et al.
5,421,621 A 6/1995 Schaefer
5,433,482 A 7/1995 Baddour
5,605,359 A 2/1997 Hoff
5,626,438 A 5/1997 Etheridge
5,746,453 A 5/1998 Roberts
5,785,358 A 7/1998 Kujawski et al.
5,879,010 A 3/1999 Nilkanth et al.
6,131,960 A 10/2000 McHughs
6,494,503 B1 12/2002 Heubach et al.
6,763,892 B2 7/2004 Kaszuba
7,185,922 B2 3/2007 Takayanagi et al.
7,316,423 B2 1/2008 Rochelle
7,967,342 B2 6/2011 Gunderson
2004/0164554 A1 8/2004 Cabezas
2005/0253380 A1 11/2005 Gibb et al.
2008/0129048 A1 6/2008 Nagle et al.
2009/0096207 A1 4/2009 Argersinger
2010/0052315 A1 3/2010 Kerin et al.
2010/0289262 A1 11/2010 Kobayashi
2011/0031737 A1 2/2011 Krausz et al.
2013/0154259 A1 6/2013 Chiproot
2013/0193685 A1 8/2013 Bird et al.
2015/0285417 A1 10/2015 Beagen, Jr.
2017/0146165 A1 5/2017 Eaton et al.
2017/0328505 A1 11/2017 Sith et al.
2019/0264842 A1* 8/2019 Ohkoshi ................ F16L 15/04
2020/0011465 A1 1/2020 Sith et al.
2021/0062945 A1 3/2021 Mitchell et al.
2021/0254765 A1 8/2021 Tedrow

FOREIGN PATENT DOCUMENTS

DE 2162903 A1 6/1973
EP 3205921 A1 8/2017
JP 62075190 A 4/1987
JP 2000154894 A 6/2000
KR 200436189 Y1 6/2007
KR 20220026259 A 3/2022
TW 573717 U 1/2004
WO 2007109729 A2 9/2007

* cited by examiner

COUPLING PERMITTING LONGITUDINAL AXIS ROTATION OF PIPE ELEMENTS

CROSS REFERENCE TO RELATED APPLICATIONS

This application is based upon and claims priority to U.S. Provisional Application No. U.S. 63/448,363, filed Feb. 27, 2023, U.S. Provisional Application No. U.S. 63/448,364, filed Feb. 27, 2023, U.S. Provisional Application No. U.S. 63/448,366, filed Feb. 27, 2023, U.S. Provisional Application No. U.S. 63/600,392, filed Nov. 17, 2023, and U.S. Provisional Application No. U.S. 63/600,400, filed Nov. 17, 2023, which applications are hereby incorporated by reference herein.

FIELD OF THE INVENTION

This invention relates to mechanical couplings for joining pipe elements and methods for pipeline maintenance.

BACKGROUND

Large diameter pipelines are complicated, expensive and hazardous to assemble and deploy in the field. In some industries, especially mining, the media transported in the pipeline (such as slurries) may be abrasive and/or corrosive and cause accelerated wear on interior portions of the pipe elements in contact with the media. The lowermost area of the pipe element interior typically suffers the most wear, as the abrasive particles stratify within the flow under gravity, with most of the abrasive particles in the fluid contacting and eroding the lowermost area most rapidly.

The life of such pipelines can be significantly increased by periodically rotating the pipe elements to position a different, less eroded portion of the pipe element interior so that it is lowermost (at the bottom), while rotating the worn portion to the side or top. Depending on the media and wear rates, pipe elements may be rotated (called "clocking") at 90, 120, or 180 degree intervals. Once a pipe element has been clocked enough times such that all the interior surfaces have seen roughly equal wear, the pipe element is replaced.

Rotation of pipelines is also a complicated, expensive and hazardous endeavor, especially pipelines of large diameter, which often requires the same heavy equipment used to initially lay the pipeline. As it is impractical to rotate each pipe element of the pipeline individually, it is common to rotate long sections of the pipeline, which may comprise several hundred feet of pipe elements and several joints (the joints remaining intact). A common method for rotating pipeline sections uses a series of specialized tracked vehicles called "sidebooms", although lifting equipment such as cranes and other machinery known in the art may also be employed. Each sideboom has a lifting crane boom that extends to the side of the tracked vehicle to lift pipe elements out of a trench or off elevated supports. When the pipe elements of the pipeline are joined by bolted flanges, the flanges at opposite ends of the section of pipeline to be rotated are unbolted. Specialized slings, which permit rotation of the pipe elements about their longitudinal axes, are strung around the pipeline section in spaced relation along its length. Multiple sidebooms are then brought in, connected to the slings, and used to lift the pipe elements. Additionally, one or more sidebooms will be brought in and connected to different slings which are arranged to tighten around the pipeline. These slings are positioned eccentric to the pipe element diameter such that the lifting axis of each sling pulls tangentially to the pipe element when the sling is lifted. When the sidebooms lift the pipe elements, each eccentric sling rotates its pipe element, and consequently the entire pipeline section rotates. Only a limited amount of rotation can be created with each lift of the eccentric slings, so they may need to be reset several times during a lift, and the rotating process is repeated while the lifting sidebooms hold the pipeline section in an elevated position until the desired amount of rotation is achieved.

Once the pipeline section has been rotated sufficiently, the eccentric slings are disengaged, and the lifting sidebooms lower the pipeline section back into place for reconnection of the end flanges of the pipeline section to the pipeline. When flanged pipe elements are used, rotation of the pipeline section must be carefully controlled to ensure that the bolt holes on the flanges at the ends of the section line up with the mating flanges of the pipeline. Joints between pipe elements formed by mechanical couplings engaging grooved pipe elements ("grooved joints") may be employed instead of flanged pipe elements to eliminate the need for rotational alignment of the pipeline section with the pipeline because grooved joints are agnostic as to the rotational position of the pipe elements being joined. However, grooved joints have lower rotational resistance about the longitudinal axis of the pipe element than flanged joints. Pipe elements joined by grooved joints may slip and permit individual pipe elements to rotate relative to one another. Thus, all pipe elements in the pipe section may not rotate the same amount as the pipe elements rotated by the eccentric slings. Pipe element slip relative to the coupling reduces the number of joints which can be included in sections of pipeline being rotated together resulting in shorter pipeline sections being rotated at one time. Regardless of whether grooved or flanged joints are used, the need to disconnect pipe elements at the ends of each pipeline section can allow loss of fluid from the pipeline. This loss may not be economically practical or environmentally conscientious depending on the fluid in the pipeline.

There is clearly an opportunity to improve large diameter pipeline joints as well as the process of lifting and rotating large diameter pipeline sections which does not suffer the disadvantages of processes according to the prior art.

SUMMARY

The disclosure concerns a coupling permitting rotation of pipe elements about their longitudinal axes. In one example embodiment, the coupling comprises a first ring attachable to a first of the pipe elements. The first ring comprises a first collar extending circumferentially around the first ring and projecting outwardly therefrom. The first collar defines a bearing surface and a retaining surface oppositely disposed from one another. The surfaces are oriented transversely to a first ring axis arranged coaxially with the first ring. A housing defines a bore therethrough surrounding a longitudinal axis arranged coaxially with the bore. The housing has a first end and a second end oppositely disposed from one another. The first end is adapted to receive the first ring coaxially within the bore. The housing comprises a first shoulder positioned distal to the first end thereof. The first shoulder projects toward the longitudinal axis and is oriented transversely thereto. A first channel extends circumferentially around the housing and faces the longitudinal axis. The first channel is positioned in spaced apart relation to the first shoulder and proximate to the first end of the housing. A first retaining ring is positionable within the first channel. The first retaining ring projects into the bore toward the longitudinal axis. When the first ring is received within the bore at the first end, the first collar is positionable between the first shoulder and the first channel, the first retaining ring is thereafter positionable within the first channel, the bearing surface is engageable with the first shoulder, and the retaining surface is engageable with the first retaining ring, thereby retaining the first ring within the housing.

In an example embodiment, the coupling further comprises a seal positioned between the housing and the first ring. By way of example, the seal is positioned distal to the first end of the housing. Further by way of example, the seal comprises an O-ring received within a circumferential groove positioned in one of the first ring or the housing. By way of example, the seal is positioned between the housing and the first collar. Further by way of example, the seal comprises an O-ring received within a circumferential groove in one of the first collar or the housing.

In an example embodiment, the coupling further comprises a first bearing positioned between the housing and the first ring. By way of example, the first bearing is positioned distal to the first end of the housing. Further by way of example, the first bearing comprises a first bearing ring extending circumferentially around the bore. The first bearing ring is formed of material having a lower coefficient of friction than either the first ring or the housing. Further by way of example, the first bearing ring comprises polytetrafluoroethylene.

In an example embodiment, the coupling further comprises a second bearing positioned between the housing and the first ring. By way of example, the second bearing is positioned between the first collar and the housing. Further by way of example, the second bearing comprises a second bearing ring extending circumferentially around the first collar. The second bearing ring is formed of material having a lower coefficient of friction than either the first ring or the housing. Further by way of example, the second bearing ring comprises polytetrafluoroethylene.

By way of example, the first ring comprises a first outer groove extending circumferentially therearound. The outer groove is positioned outside of the bore.

In an example embodiment, the coupling further comprises a second ring attachable to a second of the pipe elements. The second ring comprises a second collar extending circumferentially around the second ring and projects outwardly therefrom. The second collar defines a bearing surface and a retaining surface oppositely disposed from one another. The surfaces of the second ring are oriented transversely to a second ring axis arranged coaxially with the second ring. The second end of the housing is adapted to receive the second ring coaxially within the bore. The housing further comprises a second shoulder positioned distal to the second end thereof. The second shoulder projects toward the longitudinal axis and is oriented transversely thereto. A second channel extends circumferentially around the housing and faces the longitudinal axis. The second channel is positioned in spaced apart relation to the second shoulder and proximate to the second end of the housing. A second retaining ring is positionable within the second channel. The second retaining ring projects into the bore toward the longitudinal axis. When the second ring is received within the bore at the second end of the housing, the second collar is positionable between the second should and the second channel, the second retaining ring is thereafter positionable within the second channel, the bearing surface of the second collar is engageable with the second shoulder, and the retaining surface of the second collar is engageable with the second retaining ring, thereby retaining the second ring within the housing.

In a further example embodiment, the coupling further comprises a seal positioned between the housing and the second ring. By way of example, the seal is positioned distal to the first end of the housing. Further by way of example, the seal comprises an O-ring received within a circumferential groove positioned in one of the second ring or the housing. By way of example, the seal is positioned between the housing and the second collar. Further by way of example, the seal comprises an O-ring received within a circumferential groove in one of the second collar or the housing.

In a further example embodiment, the coupling further comprises a first bearing positioned between the housing and the second ring. By way of example, the first bearing is positioned distal to the second end of the housing. Further by way of example, the first bearing comprises a first bearing ring extending circumferentially around the bore. The first bearing ring is formed of material having a lower coefficient of friction than either the second ring or the housing. By way of example, the first bearing ring comprises polytetrafluoroethylene. In an example embodiment, the coupling further comprises a second bearing positioned between the housing and the second ring. By way of example, the second bearing is positioned between the second collar and the housing. Further by way of example, the second bearing comprises a second bearing ring extending circumferentially around the second collar. The second bearing ring is formed of material having a lower coefficient of friction than either the second ring or the housing. By way of example, the second bearing ring comprises polytetrafluoroethylene.

By way of example, the first ring comprises an outer groove extending circumferentially therearound, the outer groove being positioned outside of the bore.

In an example embodiment, the first ring comprises a locking surface positioned in spaced relation to the retaining surface and outside of the bore. The locking surface faces away from the longitudinal axis. The housing comprises a locking tab projecting from the first end thereof. The locking tab defines a jamming surface in spaced relation to and facing the locking surface. A lock body is insertable between the locking surface and the jamming surface. The lock body engages the locking surface and the jamming surface when the lock body is positioned therebetween so as to prevent relative rotation between the first ring and the housing. By way of example, the locking surface comprises a flat surface extending through a chord of the first ring. By way of example, the jamming surface comprises a flat surface on the locking tab. By way of example, the lock body comprises a bar.

In another example embodiment, the first ring comprises a first locking surface positioned in spaced relation to the retaining surface and outside of the bore. The first locking surface faces away from the longitudinal axis. A second locking surface is positioned in spaced relation to the retaining surface and outside of the bore. The second locking surface faces away from the longitudinal axis. The housing comprises a first locking tab projecting from the first end thereof. The first locking tab defines a first jamming surface in spaced relation to and facing the first locking surface. A second locking tab projects from the first end thereof. The second locking tab defines a second jamming surface in spaced relation to and facing the second locking surface. A lock body is insertable between the first locking surface and the first jamming surface and the second locking surface and the second jamming surface. The lock body engages the first and second locking surfaces and the first and second jamming surfaces when the lock body is positioned therebetween so as to prevent relative rotation between the first ring and the housing. By way of example, the locking surfaces comprise respective flat surfaces extending through respective chords of the first ring. By way of example, the jamming surfaces comprise respective flat surfaces on the first and second locking tabs. By way of example, the lock body comprises a fork having a first tine positionable between the first locking surface and the first jamming surface and a second tine positionable between the second locking surface and the second jamming surface.

In another example embodiment, the first ring comprises a notch positioned in spaced relation to the retaining surface and outside of the bore. The notch faces away from the longitudinal axis. The housing comprises a slot extending into the housing from the first end thereof. A lock body is insertable into the notch of the first ring and the slot of the housing. The lock body engages the notch and the slot so as to prevent relative rotation between the first ring and the housing.

BRIEF DESCRIPTION OF THE DRAWINGS

FIG. 6 is a cross sectional view taken along section line 6-6 in

FIG. 4;

DETAILED DESCRIPTION

Disclosed herein with reference to FIGS. 1-30 are torsion resistant or anti-rotational couplings. Advantageously, these couplings may join pipe elements of various sizes, including large diameter pipe elements, while preventing rotation of the pipe elements relative to each other along a longitudinal axis extending the length of the pipe elements. Advantageously, the couplings may be designed to reduce rotational slippage at pipe joints between the pipe elements and couplings.

With reference to FIGS. 31-38A, rotational couplings are also disclosed. The rotational couplings may join pipe elements of various sizes, including large diameter pipe element, while allowing the pipe elements to rotate relative to each other along a longitudinal axis extending the length of the pipe elements. The rotational couplings my include locking features to selectively prevent the pipe elements joined by the rotational couplings from rotating relative to one another.

The torsion resistant couplings and rotational couplings disclosed herein may be used together to join pipeline and form pipeline sections. For example, a section of pipeline may include a rotational coupling at either end of the section wherein the rotational couplings may be configured to join the section of pipeline to adjacent pipeline sections. Torsion resistant couplings may join the pipe elements together between the rotational couplings. Further, the torsion resistant couplings may join the pipe elements within the section of pipeline to the rotational couplings. The section of pipeline, joined by torsion resistant couplings and rotational couplings may be rotated relative to adjacently joined pipeline sections without being disconnected from the adjacently joined pipeline sections.

Methods of rotating a pipeline section are also disclosed herein with reference to FIGS. 39-42A. The pipeline section may include pipe elements coupled together via the torsional resistant couplings disclosed herein wherein each end of the pipeline section is coupled to a rotational coupling disclosed herein. The methods may provide efficient ways to rotate the pipeline section to extend the life of the pipeline section without decoupling or disconnecting the rotating pipeline section from adjacently joined pipeline sections.

Torsion Resistant Couplings

Disclosed herein are example torsion resistant couplings configured to join pipe elements and prevent the pipe elements from rotating with respect to one another. The couplings comprise two rings, each attachable to a pipe element to be joined by segments. The segments are attached via adjustable fasteners around the rings and pipe elements. The segments comprise action surfaces configured to engage with receiving surfaces of the rings. The action and receiving surfaces are designed so that engagement between the surfaces prevents rotation between coupled rings and pipe elements. Optionally, the receiving surfaces extend along chords of respective rings.

Figure 1:
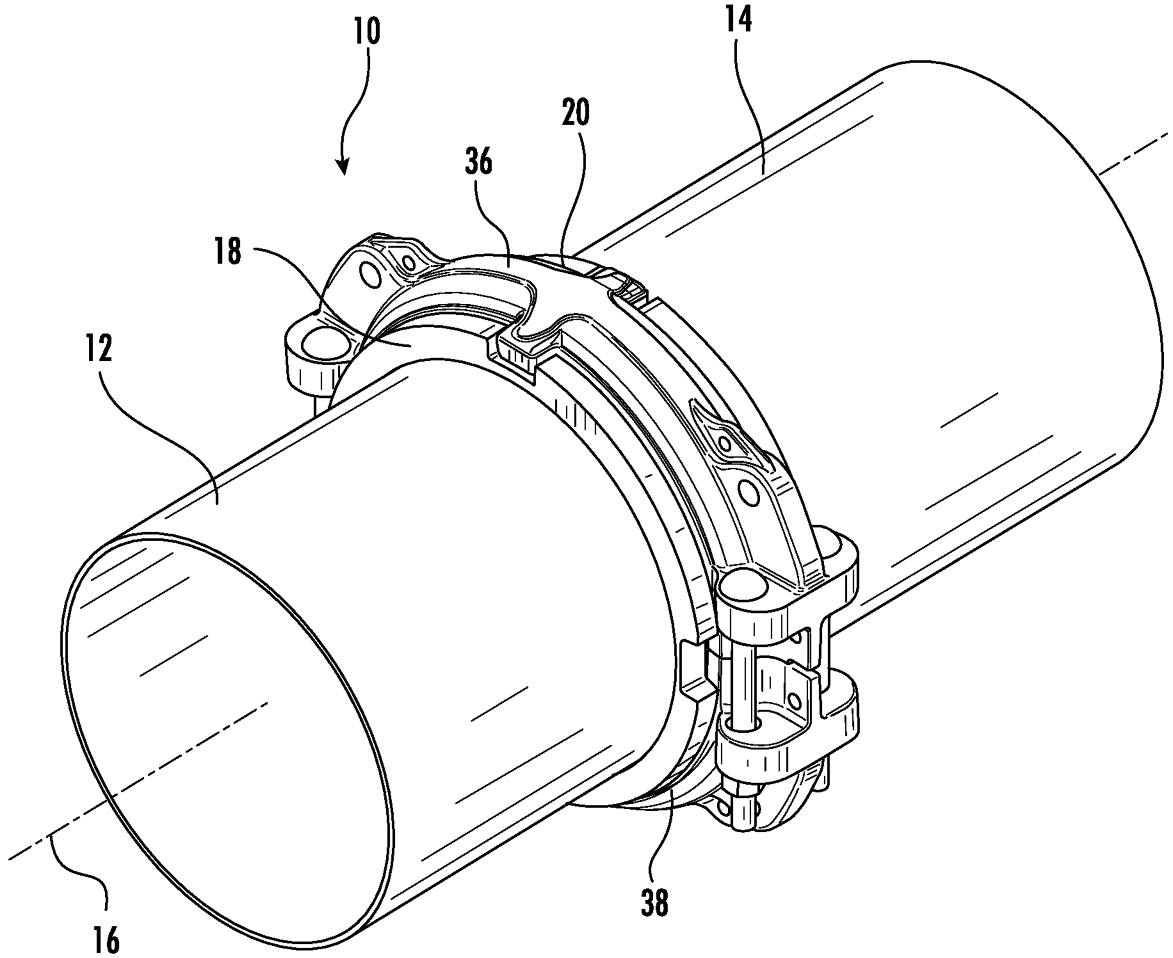
FIG. 1 is an isometric view of an example coupling according to the invention, the coupling shown joining pipe elements.
Figure 1A:
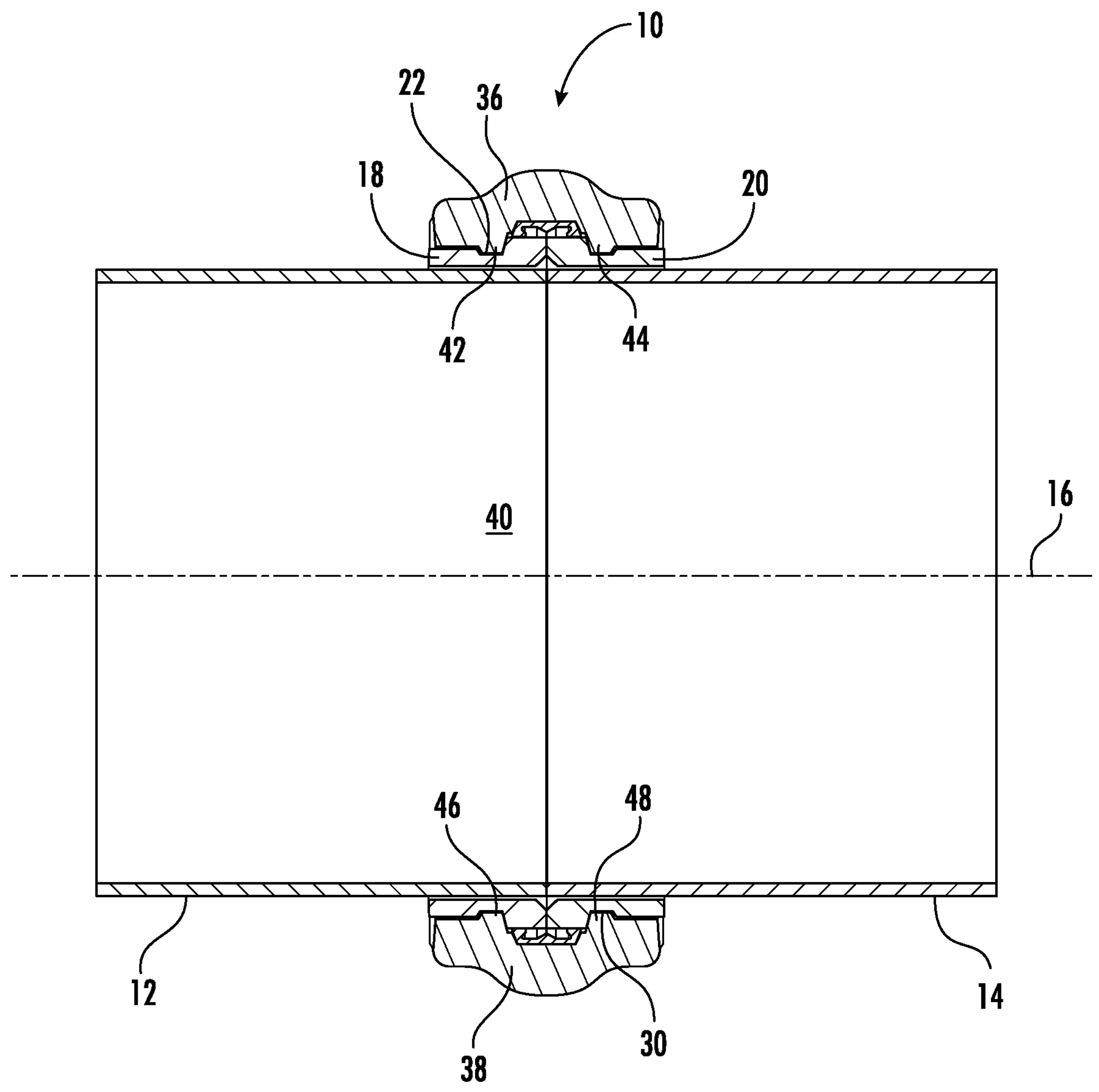
FIG. 1A is a cross sectional view of the coupling shown in FIG. 1.
Figure 2:
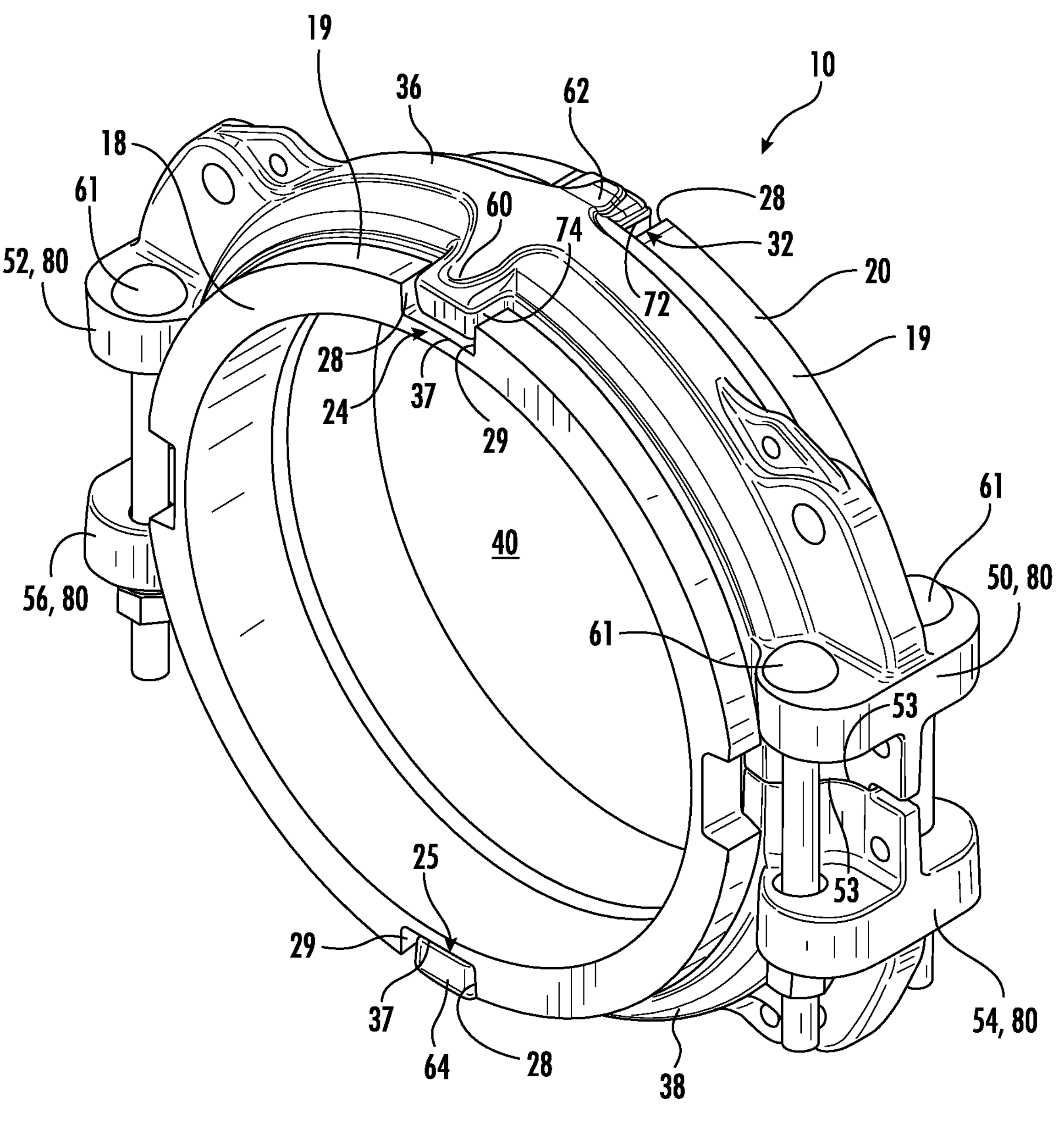
FIG. 2 is an isometric view of an example coupling according to the invention.

FIG. 1 shows an example coupling 10 for joining first and second pipe elements 12 and 14 while also preventing relative rotation of the pipe elements 12, 14 about a coaxial longitudinal axis 16. As shown in FIG. 1, the coupling 10 comprises a first ring 18 attachable to an end of the first pipe element 12 and a second ring 20 attachable to an end of the second pipe element 14. Attachment of the rings 18 and 20 to the respective pipe elements 12 and 14 may be effected by welding, but other means of attachment are also feasible. As shown in FIGS. 1A and 2, the coupling 10 surrounds a central space 40. As shown in FIG. 1A, the ends of the pipe elements 12, 14 may abut one another within the central space 40. During rotation of the pipe elements 12, 14, the end to end contact of the pipe elements 12, 14 may provide frictional resistance to torsion. The torsional frictional resistance may prevent or limit rotational slippage between pipe elements 12, 14. Further, the end to end contact of the pipe elements 12, 14 may provide a smooth internal transition between pipe elements 12, 14 thereby minimizing turbulence and leading-edge wear.

Figure 7:
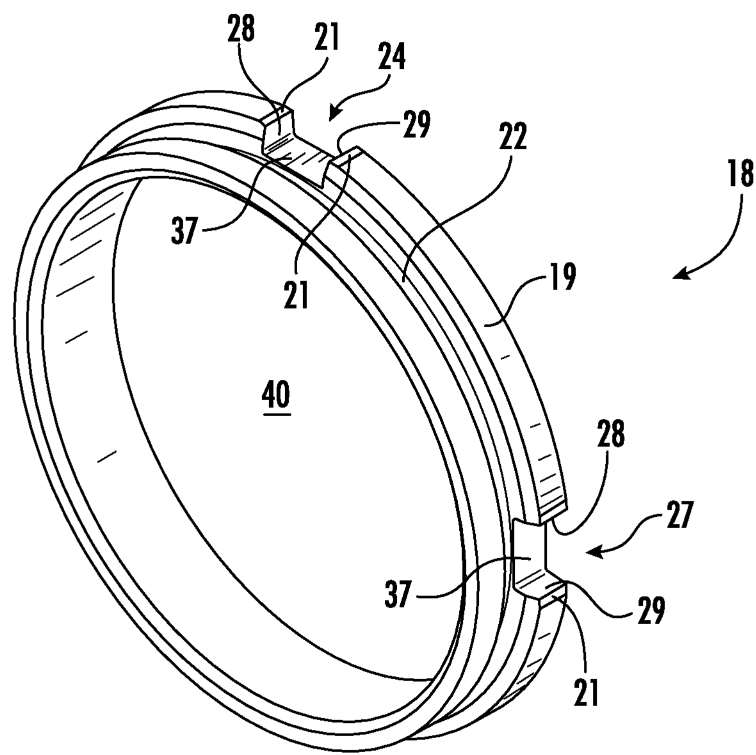
FIG. 7 is an isometric view of an example first ring.
Figures 9, 10:
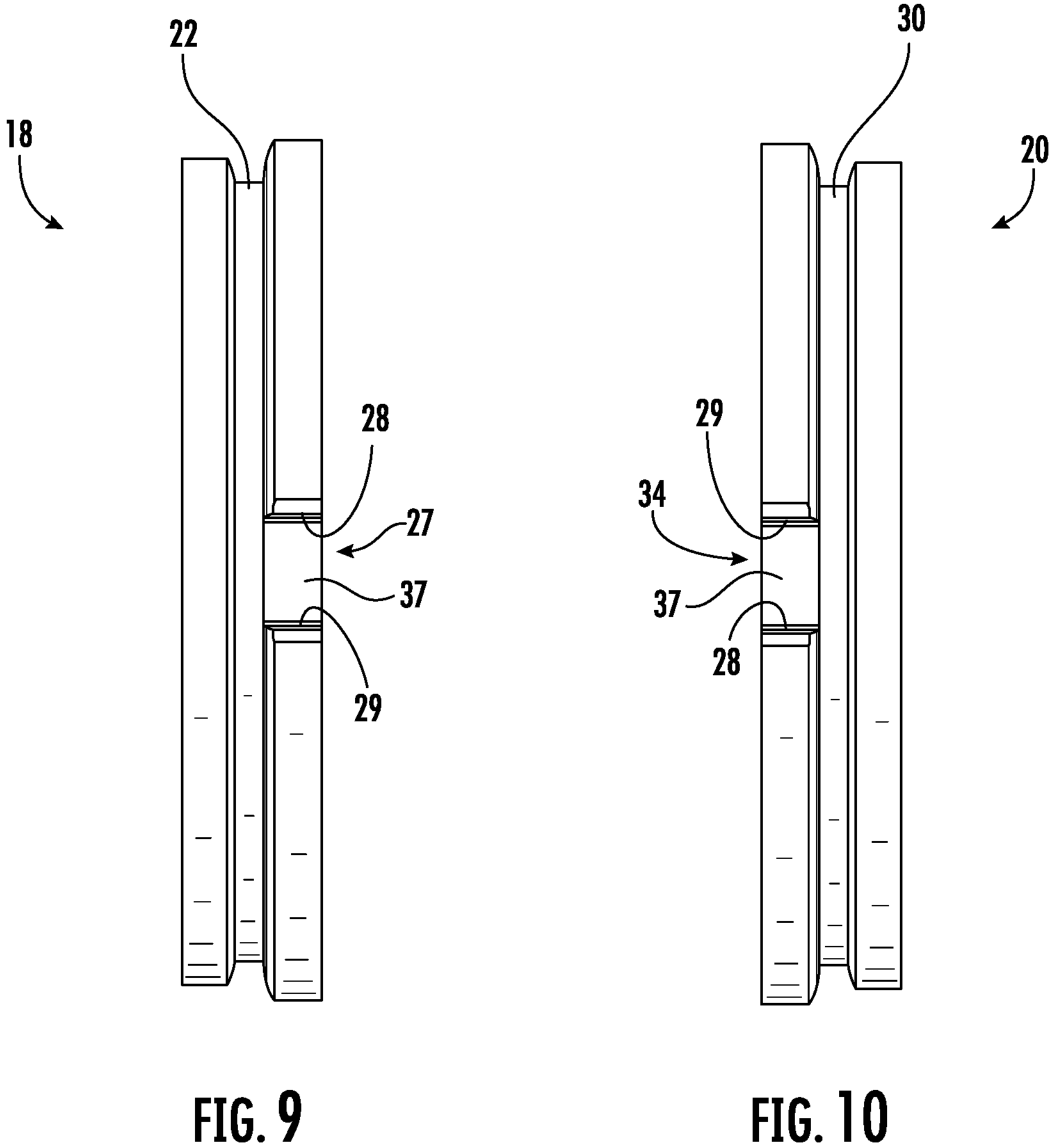
FIG. 9 is a side view of the example first ring shown in FIG. 7.
FIG. 10 is a side view of the example second ring shown in FIG. 8.
Figure 11:
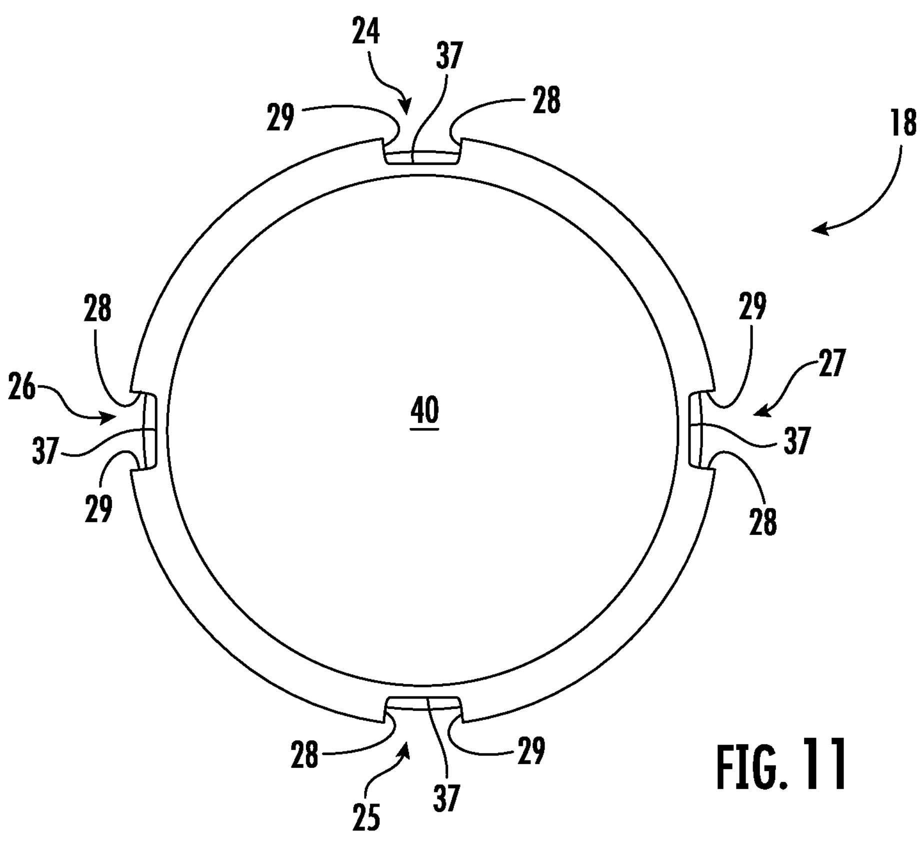
FIG. 11 is a front view of the example first ring shown in FIG. 7.
Figure 12:
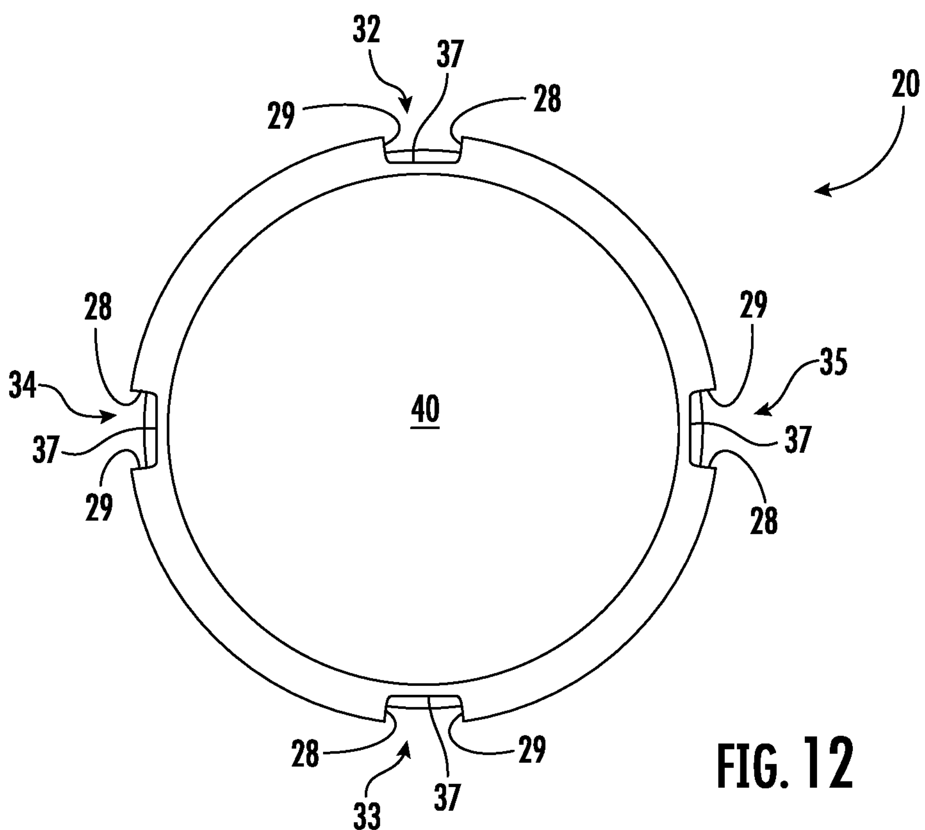
FIG. 12 is a front view of the example second ring shown in FIG. 8.

As shown in FIGS. 7 and 9, the first ring 18 defines a first groove 22 extending circumferentially around the ring 18. As shown in FIG. 11, the first ring 18 also defines one or more notches, in this example four notches 24, 25, 26 and 27, adjacent to the first groove 22. The notches 24, 25, 26, 27 may be arranged 90° apart from one another about the first ring 18. Each notch 24, 25, 26, 27 may comprise first and second receiving surfaces 28, 29 extending inwardly toward said central space 40 and a third receiving surface 37 extending transversely between the first and second receiving surfaces 28, 29. Optionally, the third receiving surface 37 may extend perpendicularly or substantially perpendicularly (e.g., within 10 degrees of perpendicular) to the first and second receiving surfaces 28, 29. Optionally, the first and second receiving surfaces 28, 29 may extend along respective chords of the first ring 18 wherein the chord extends through the central space 40. Optionally, the first and second receiving surfaces 28, 29 may taper inwardly towards one another approaching the third receiving surface 37.

Figure 8:
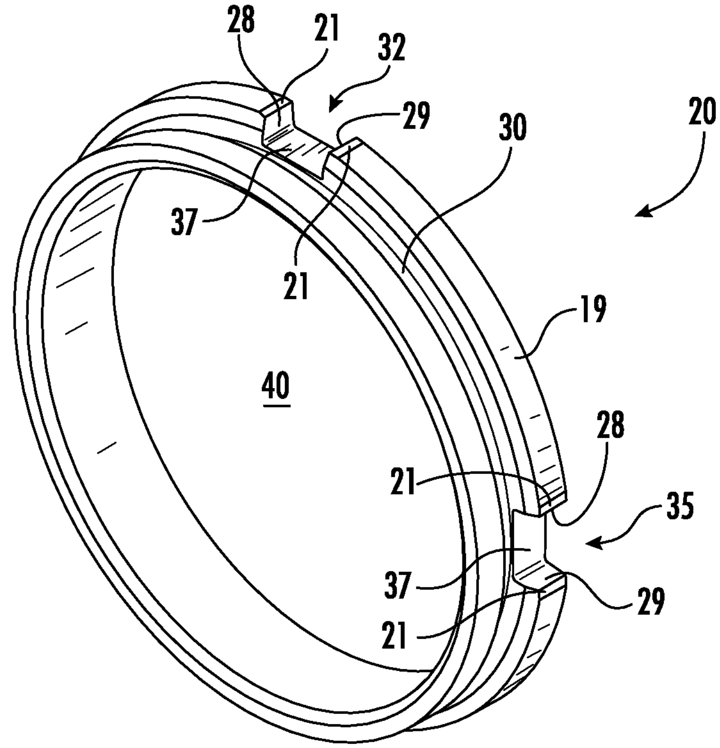
FIG. 8 is an isometric view of an example second ring.

In this example embodiment, the second ring 20 is identical to the first ring 18, and, as shown in FIGS. 8 and 10, defines a second groove 30 extending circumferentially around the second ring. As with the first ring 18, the second ring 20 defines one or more notches 32, 33, 34 and 35 adjacent to the second groove 30 (see FIG. 12) that may be arranged 90° apart from one another about the second ring 20. The notches 32, 33, 34, 35 again comprise first and second receiving surfaces 28, 29 extending inwardly toward said central space 40 and a third receiving surface 37 extending transversely between the first and second receiving surfaces 28, 29. Optionally, the third receiving surface 37 may extend perpendicularly or substantially perpendicularly (e.g., within 10 degrees of perpendicular) to the first and second receiving surfaces 28, 29. Optionally, the first and second receiving surfaces 28, 29 may extend along respective chords of the second ring 20 wherein the chord extends through the central space 40. Optionally, the first and second receiving surfaces 28, 29 may taper inwardly towards one another approaching the third receiving surface 37. Rings 18 and 20 are not limited to four notches, as either more or fewer notches, arranged in pairs at angular intervals around the rings, are feasible. Optionally, rings 18, 20 may include flat portions 21 to provide a flat datum for consistent placement of a level during assembly to the pipe elements 12, 14. In this example, as shown in FIGS. 7 and 8, the flat portions 21 may be positioned immediately adjacent to the notches 32, 33, 34, 35.

Figure 3:
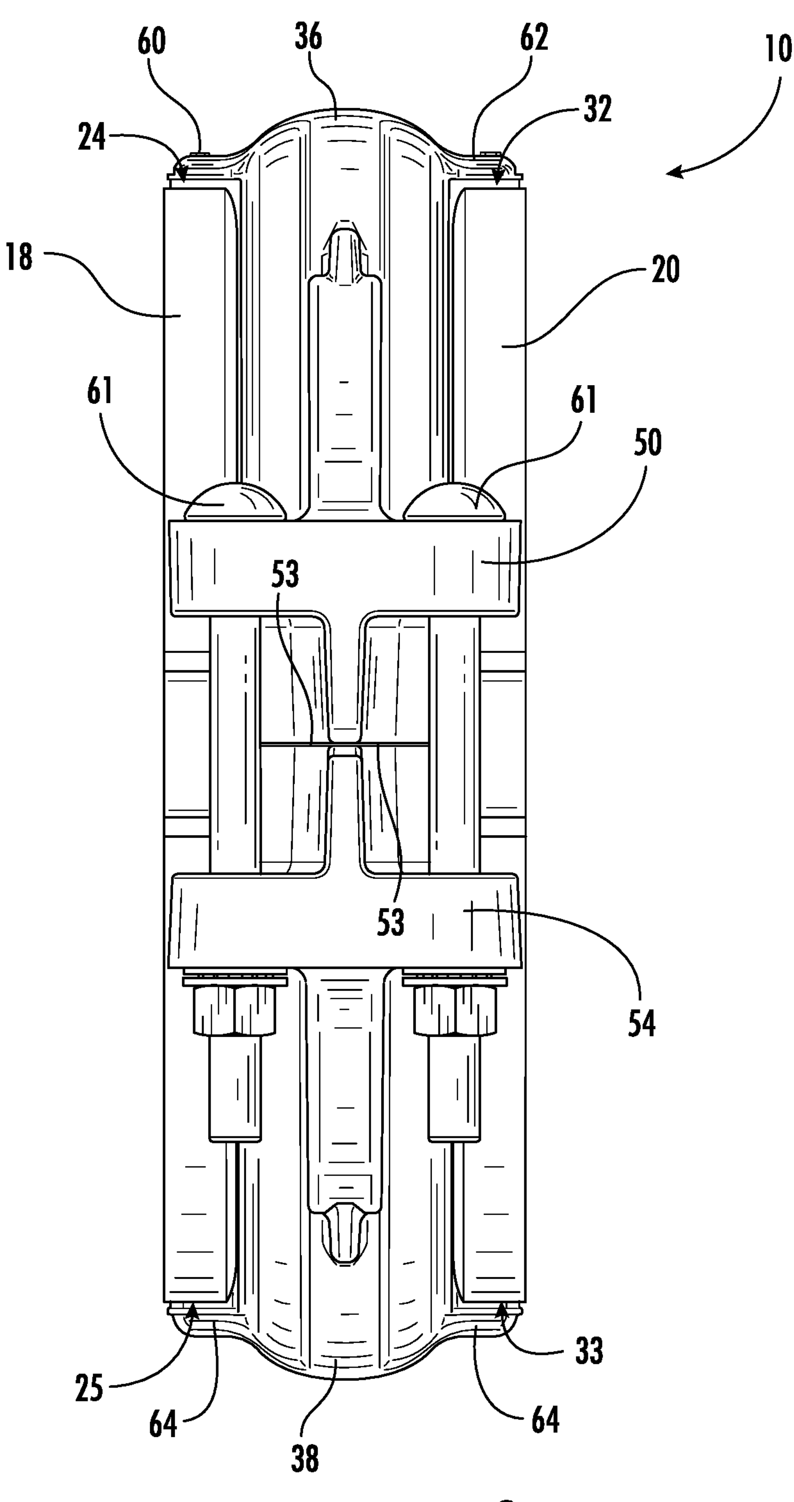
FIG. 3 is a side view of the coupling shown in FIG. 2.
Figure 4:
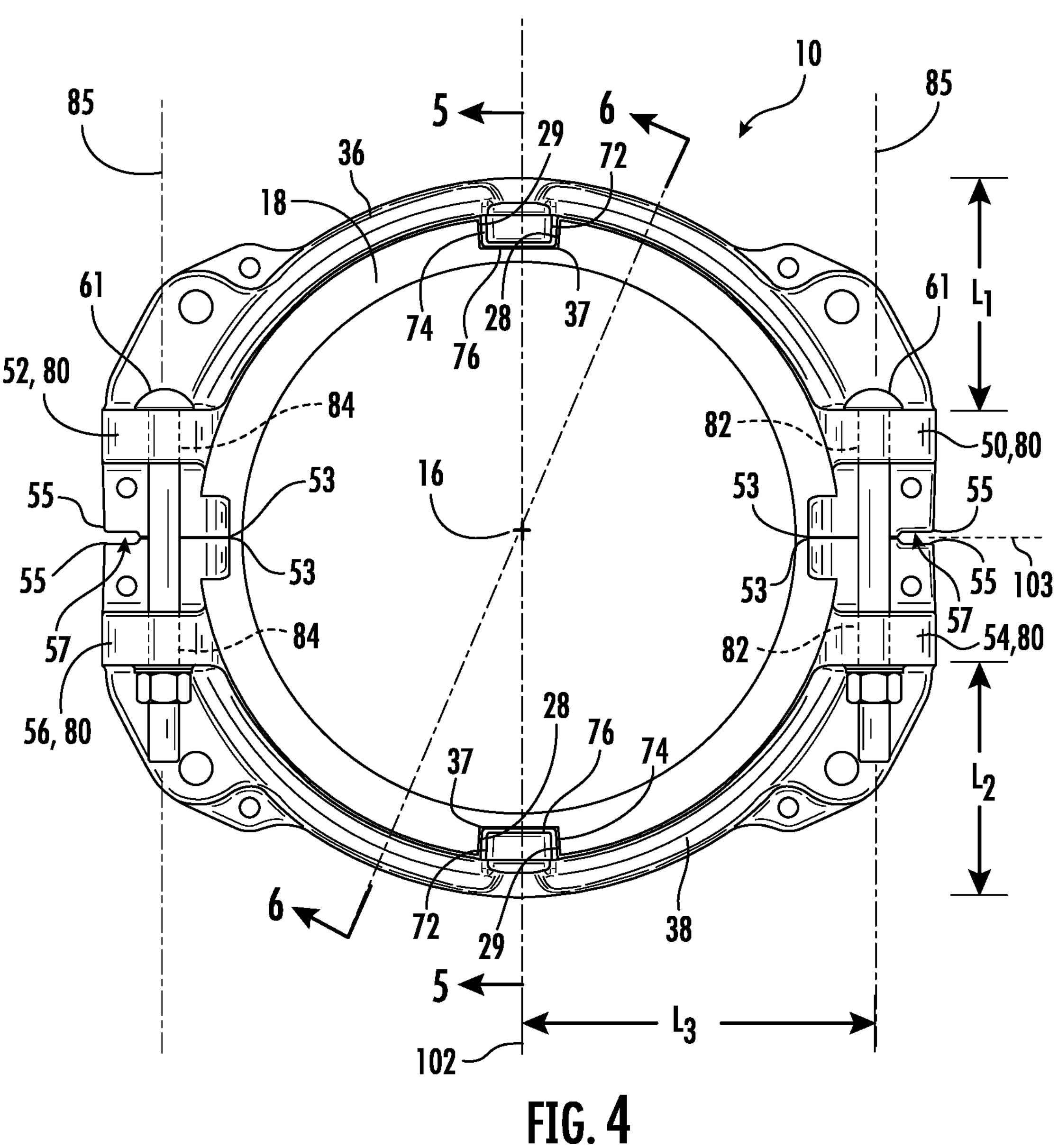
FIG. 4 is a front view of the coupling shown in FIG. 2.
Figure 5:
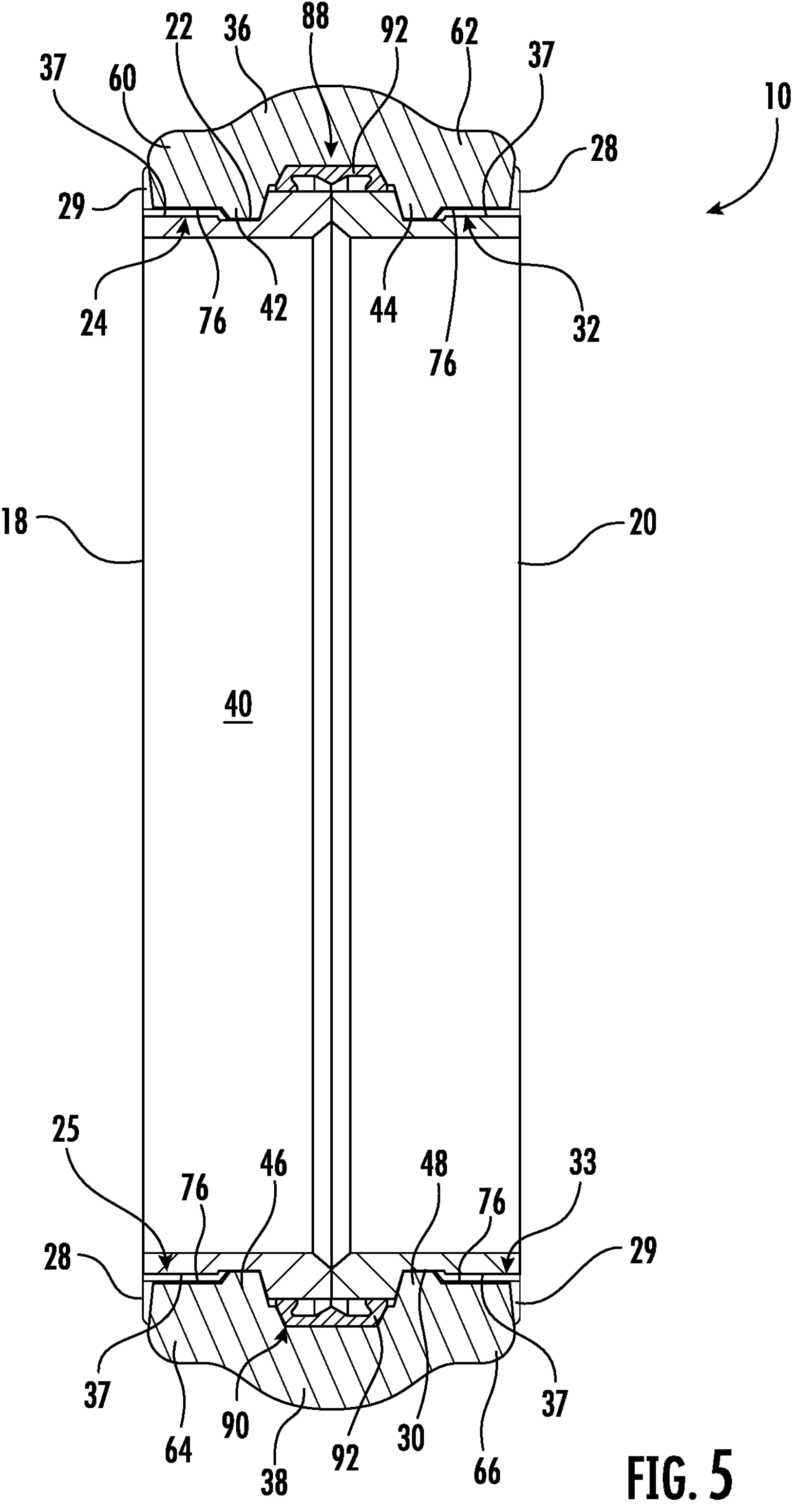
FIG. 5 is a cross sectional view taken along section line 5-5 in FIG. 4.
Figure 6:
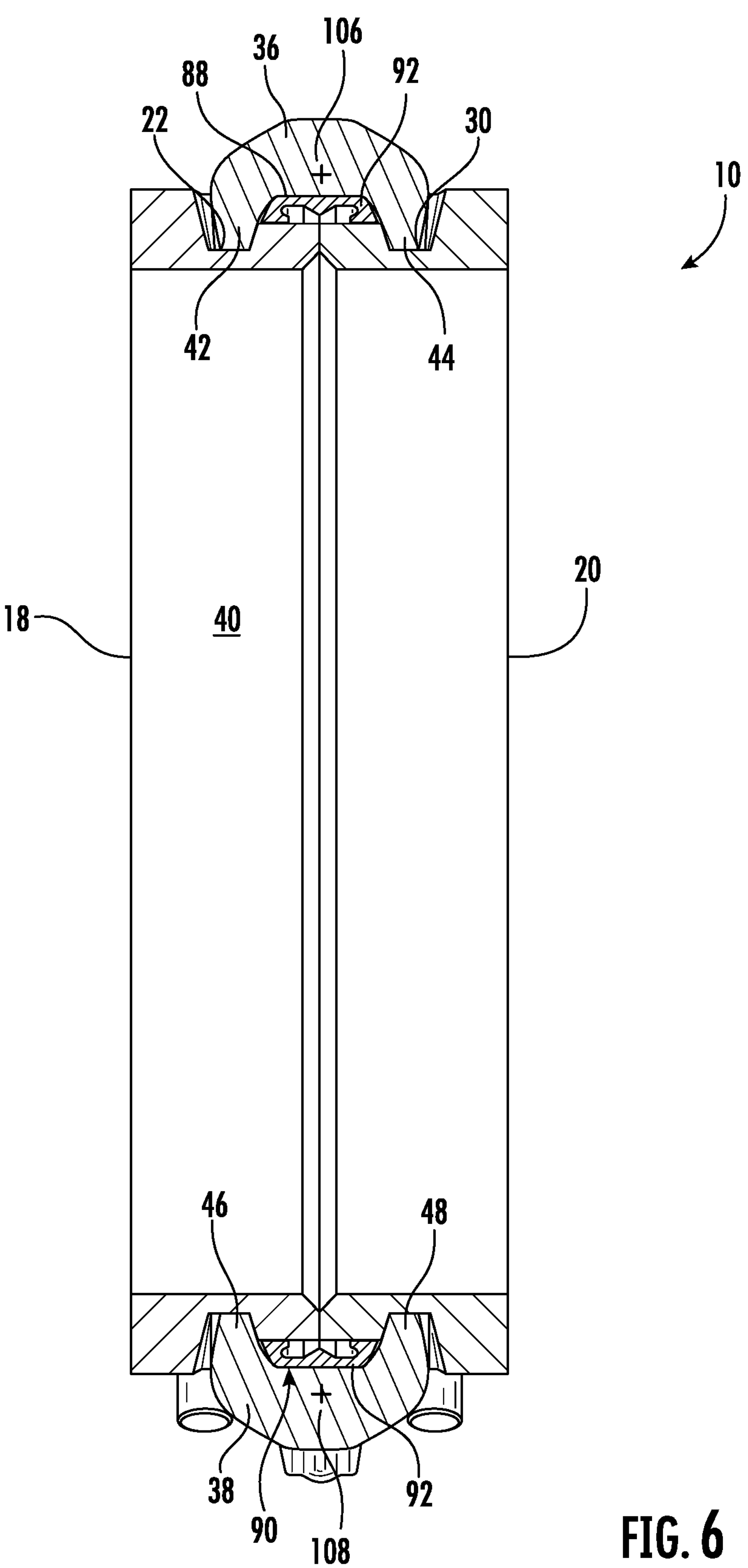
Figures 13, 14:
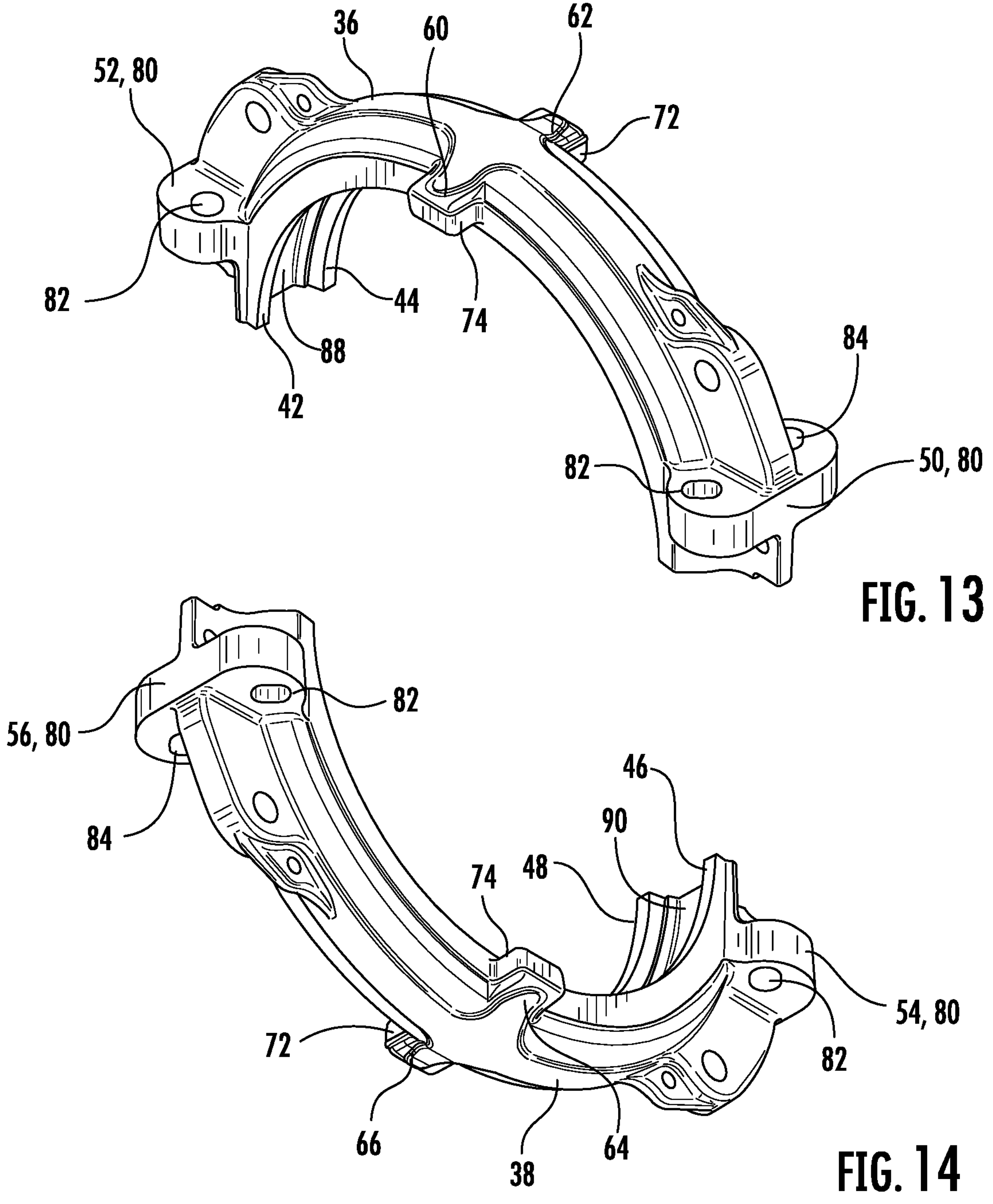
FIG. 13 is an isometric view of an example first segment.
FIG. 14 is an isometric view of an example second segment.

As shown in FIGS. 1-6, the coupling 10 also comprises first and second segments 36 and 38 attachable end to end to surround the central space 40. As shown in FIG. 13, the first segment 36 comprises first and second keys 42 and 44 which, in this example take the form of arcuate projections which extend lengthwise along the first segment and project toward the central space 40. The first and second keys 42 and 44 are in spaced apart relation and, as shown in FIGS. 5 and 6, spaced so as to engage the first and second grooves 22 and 30 defined in the first and second rings 18 and 20 when the rings are positioned within the central space 40.

The second segment 38 may be identical to the first segment 36, as in the example coupling embodiment 10 shown in FIG. 1, and, as shown in FIGS. 3 and 6, comprises first and second keys 46, 48 extending lengthwise along the second segment 38 and projecting toward the central space 40. The first and second keys 46 and 48 on the second segment 38 are in spaced apart relation, and, as shown in FIGS. 5 and 6, spaced so as to engage the first and second grooves 22 and 30 defined in the first and second rings 18 and 20 when the rings are positioned within the central space 40.

Figure 15:
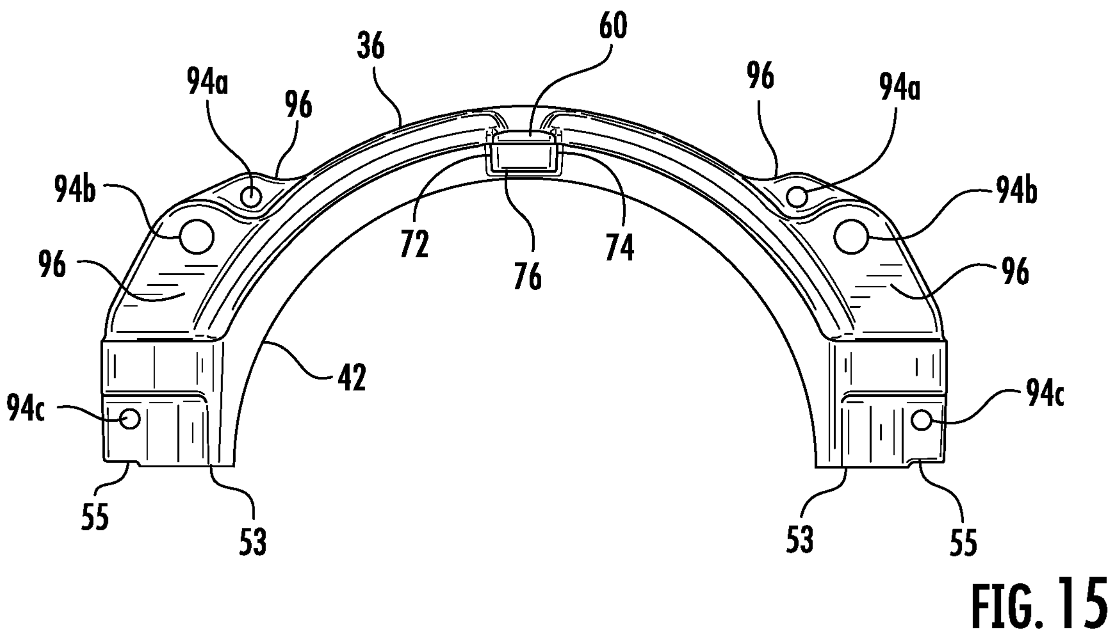
FIG. 15 is a front view of the example first segment shown in FIG. 13.
Figure 16:
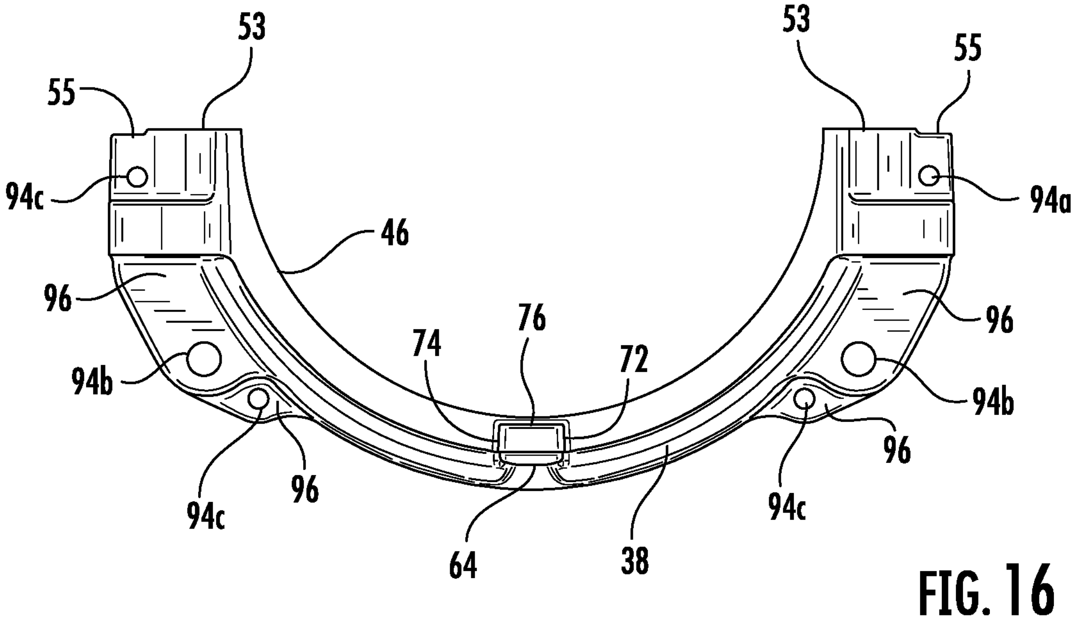
FIG. 16 is a front view of the example second segment shown in FIG. 14.
Figures 17, 18:
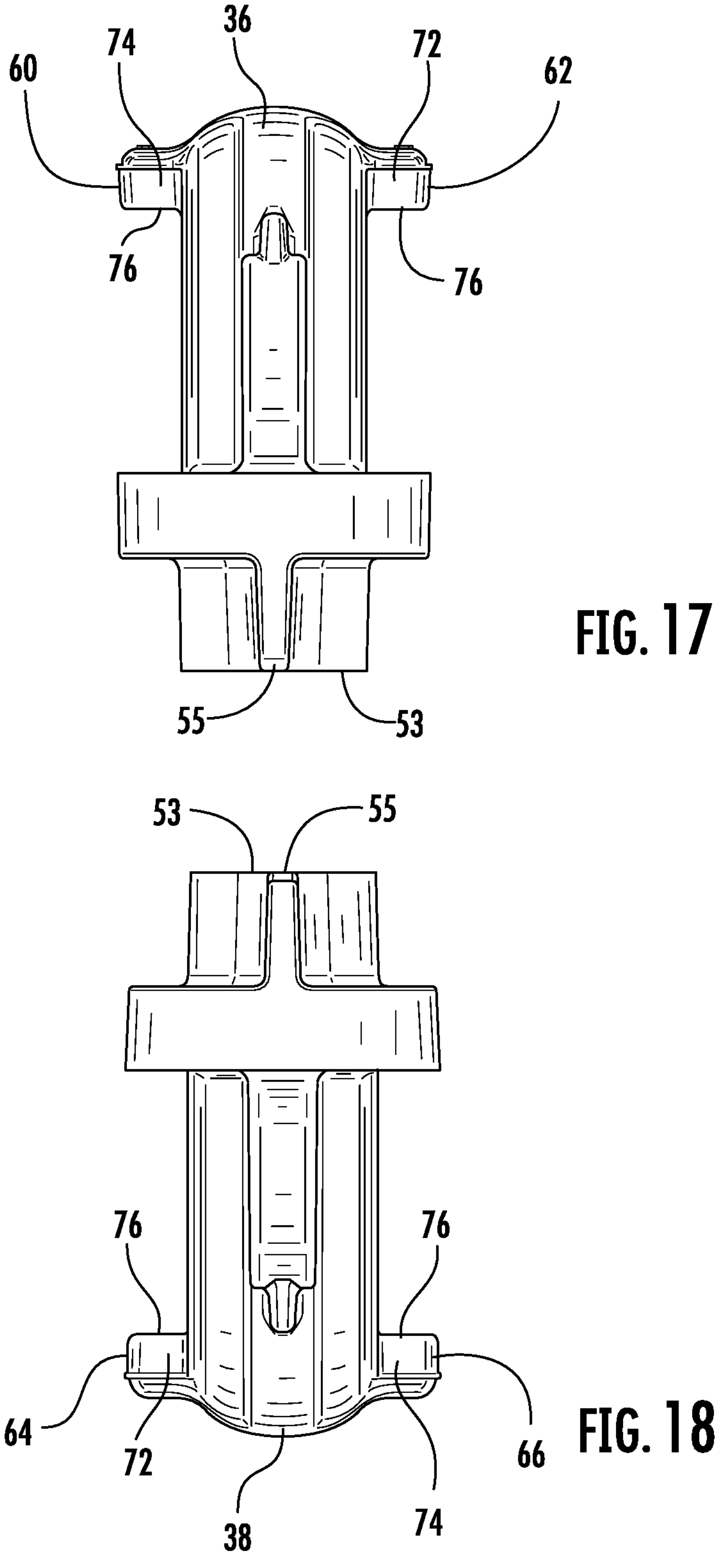
FIG. 17 is a side view of the example first segment shown in FIG. 13.
FIG. 18 is a side view of the example second segment shown in FIG. 14.

As shown in FIGS. 13, 15, and 17, the first segment 36 comprises first and second projections 60, 62 extending transversely to the first and second keys 42, 44. Optionally, the first and second projections 60, 62 extend perpendicularly or substantially perpendicularly (e.g., within 10 degrees of perpendicular) to the first and second keys 42, 44. As shown in FIGS. 2 and 5, the first and second projections 60, 62 are positioned so as to engage the first notches 24, 32 defined in the first and second rings 18 and 20 when the rings are positioned within the central space 40. As shown in FIGS. 14, 16, and 18, the second segment 38 comprises first and second projections 64, 66 extending transversely to the first and second keys 46, 48. Optionally, the first and second projections 64, 66 extend perpendicularly or substantially perpendicularly (e.g., within 10 degrees of perpendicular) to the first and second keys 46, 48. As shown in FIG. 5, the first and second projections 64, 66 of the second segment 38 are positioned so as to engage the second notches 25, 33 defined in the first and second rings 18 and 20 when the rings are positioned within the central space 40. As shown in FIGS. 13-18, each of projections 60, 62, 64, 66 may comprise first and second action surfaces 72, 74 extending outwardly away from respective first and second keys 42, 44, 46, 48 and a third action surface 76 extending transversely between the first and second action surfaces 72, 74. Optionally, the third action surface 76 may extend perpendicularly or substantially perpendicularly (e.g., within 10 degrees of perpendicular) between the first and second action surfaces 72, 74. As shown in FIGS. 2, 4, and 5, the first and second action surfaces 72, 74 may be configured to respectively engage the first and second receiving surfaces 28, 29. It is advantageous that the first and second action surfaces 72, 74 are oriented to match the orientation of the first and second receiving surfaces 28, 29 respectively to optimize the contact and engagement between action surfaces 72, 74 and receiving surfaces 28, 29. Optionally, the third action surface 76 may be configured to engage the third receiving surface 37. Engagement between the first and second action surfaces 72, 74 and the first and second receiving surfaces 28 and 29, respectively, prevents rotation of the first and second pipe elements 12 and 14 with respect to one another about the longitudinal axis 16. Engagement between the first and second action surfaces 72, 74 and the first and second receiving surfaces 28 and 29 may transmit torque through the pipe elements 12, 14 with reduced relative slip.

Each notch 24, 25, 26, 27 in the first ring 18 may be configured to receive the first projection 60 of the first segment 36 and the first projection 64 of the second segment 38, and each notch 32, 33, 34, 35 in the second ring 20 may be configured to receive the second projection 62 of the first segment 36 and the second projection 66 of the second segment 38. Using a plurality of paired notches on each ring 18 and 20 permits effective mechanical engagement between the segments 36 and 38 and the rings 18, 20 and also allows the pipe elements 12, 14 to which the rings 18, 20 are attached to be rotated or "clocked" over angular intervals about the pipe element longitudinal axis 16 relative to the segments 36 and 38 as defined by the number of paired notches. In this example, the pipe elements may be clocked over 90° intervals consistent with the 90° angular separation between the paired notches. The ability to clock the pipe elements allows the pipe elements to be rotated to more evenly distribute the abrasive wear on their inner surfaces (thereby increasing the useful life of the pipe elements) while maintaining the orientation of the coupling segments 36 and 38. This may also be advantageous if couplings 10 are disconnected at the end of the portion that is to be clocked, as it permits convenient access to the fasteners connecting the segments after repeated clocking of the pipe elements, which might not be possible if the segments rotated with the pipe elements when clocked.

As shown in FIGS. 1 and 2, the first segment 36 comprises first and second attachment members 50 and 52 positioned at opposite ends thereof. The second segment 38 also comprises first and second attachment members 54 and 56, positioned at opposite ends thereof. The first attachment member 50 on the first segment 36 is engageable with the first attachment member 54 on the second segment 38. Similarly, the second attachment member 52 on the first segment 36 is engageable with the second attachment member 56 on the second segment 38. The attachment members attach the first and second segments 36 and 38 to one another.

In the example embodiment, each attachment member 50, 52, 54, 56 comprises a lug 80 (see FIGS. 13 and 14) defining first and second holes 82 and 84 in spaced relation. Each hole is adapted to receive an adjustable fastener 61 for attaching the first attachment member 50 on the first segment 36 to the first attachment member 54 on the second segment 38, and for attaching the second attachment 52 member on the first segment 36 to the second attachment member 56 on the second segment 38. As shown in FIGS. 2 and 4, at least one adjustable fastener 61 may extend through the first attachment members 50, 54 of the first and second segments 36, 38 and at least one adjustable fastener 61 may extend through the second attachment members 52, 56 of the first and second segments 36, 38. Tightening of the adjustable fasteners 61 may draw the segments 36, 38 together around the pipe elements 12, 14 as shown in FIGS. 1 and 1A. As shown in FIG. 2, upon tightening of the adjustable fasteners 61, space may remain between the stop surfaces 53 of the first segment 36 and the stop surfaces 53 of the second segment 38. As shown in FIG. 1A, tightening of the adjustable fasteners 61 effectuates engagement of the first keys 42, 46 of the first and second segments 36, 38 with the first groove 22 and the second keys 44, 48 of the first and second segments 36, 38 with the second groove 30.

Optionally, in an exemplary embodiment, engagement of the first keys 42, 46 with the first groove 22 and the second keys 44, 48 with the second groove may provide a wedging effect on the end of the pipe elements 12, 14 to drive the ends of the pipe elements 12, 14 toward one another. Advantageously, the wedging effect may compressively preload the pipe ends thereby creating a rigid coupling 10 with no clearances between the rings 18, 20 and segments 36, 38 and clamping together the butt ends of the pipe elements 12, 14. The compressively preloaded pipe-to-pipe interface may remain closed, i.e. zero gap between pipe elements 12, 14, under the influence of axial pressure forces. Optionally, the interface may remain closed under an axial pressure force of up to at least 750 psi and/or other loadings. The coupling 10 according to the disclosure may comprise structural components that prevent rotation of the pipe elements relative to one another, create the wedging effect on the end of the pipe elements, or both.

Figure 4A:
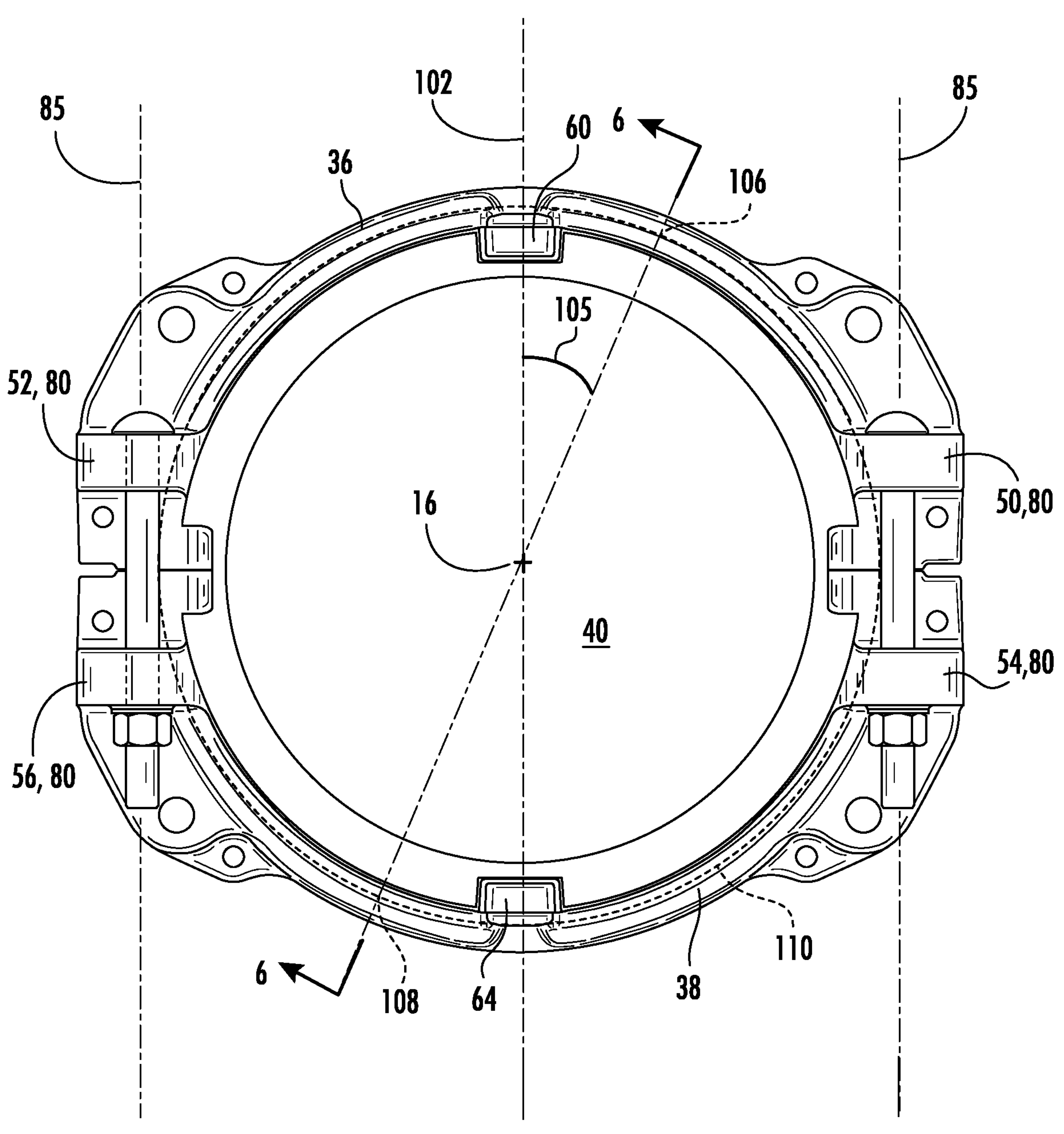
FIG. 4A is a front view of the coupling shown in FIG. 2.

As shown in FIG. 4, the first and second attachment members 50, 52 of the first segment 36 may be positioned on the segment 36 a distance $L_1$ from the peak of the first segment 36. The first and second attachment members 54, 56 of the second segment 38 may be positioned on the segment 38 a distance $L_2$ from the peak of the second segment 38. As shown in FIG. 4, respective holes 82, 84 in lugs 80 of the first and second segment 36, 38 are arranged coaxially with each adjustable fastener 61 extending along a first axis 85. The first axis 85 is positioned a distance $L_3$ from a first plane 102. The first plane 102 includes the longitudinal axis 16 and extends perpendicularly to a second plane 103 that includes the longitudinal axis and extends perpendicularly to the first axes 85. Distance $L_1$ and $L_2$ may each be between 8 inches and 20 inches depending on the diameter of the coupling. It is advantageous to minimize $L_1$ and $L_2$ to reduce $L_3$ thereby reducing bending in the attachment members 50, 52, 54, 56 and the adjustable fasteners 61. Optionally, with reference to FIGS. 4A and 6, to reduce bending in the attachment members 50, 52, 54, 56 and fasteners 61, at least a portion of each first axis 85 may be positioned less than or equal to the diameter of the fastener 61 away from a point on a circumference of a circle 110 defined by a centroid 106 of the first segment 36 and a centroid 108 of the second segment 38. As shown in FIG. 6, the centroid 106 of the first segment 36 and the centroid 108 of the second segment 38 are area centroids of the exposed surfaces of the segments 36, 38 resulting from cutting plane line 6-6 shown in FIG. 4 and FIG. 4A. Cutting plane line 6-6 extends through the longitudinal axis 16. Cutting plane line 6-6 may extend through the longitudinal axis 16, through the first segment 36 between the first and second projections 60, 62 and the first attachment member 50, and through the second segment 38 between the first and second projections 64, 66 and the second attachment member 56. The cutting plane line 6-6 may extend through the longitudinal axis 16, through the first segment 36 between the first and second attachment members 50, 52, and through the second segment 38 between the first and second attachment members 54, 56 at a location providing the minimum area of the exposed surfaces of the segments 36, 38. An angle 105 between the first plane 102 and the cutting plane line 6-6 may range from 5 to 80 degrees. Optionally, to reduce bending in the attachment members 50, 52, 54, 56 and fasteners 61, at least a portion of each first axis 85 may be positioned less than or equal to the diameter of the respective hole 82, 84 away from a point on the circumference of the circle 110 defined by the centroid 106 of the first segment 36 and the centroid 108 of the second segment 38. Optionally, to reduce bending in the attachment members 50, 52, 54, 56 and fasteners 61, a distance between a point on each first axis 85 and the longitudinal axis 16 is less than or equal to a radius plus the diameter of the respective hole 82, 84, wherein the radius is equal to the radius of the circle 110 defined by the centroid 106 of the first segment 36 and the centroid 108 of the second segment 38. Optionally, to reduce bending in the attachment members 50, 52, 54, 56 and fasteners 61, a distance between a point on each first axis 85 and the longitudinal axis 16 is a distance less than or equal to a radius plus the diameter of the fastener 61, wherein the radius is equal to the radius of the circle 110 defined by the centroid 106 of the first segment 36 and the centroid 108 of the second segment 38. Optionally, to reduce bending in the attachment members 50, 52, 54, 56 and fasteners 61, each first axis 85 is a first distance from an inner edge of the respective lug 80 closest to the central space 40 and a second distance from an outer edge of the respective lug 80 furthest from the central space 40. The ratio of the first distance to the second distance may be 0.333 to 0.5.

As shown in FIGS. 15 and 16, each segment 36, 38 may comprise a stop surface 53 at either end. Upon tightening of the adjustable fasteners 61, at least a portion of the stop surfaces 53 of the first segment 36 may abut at least a portion of the stop surfaces 53 of the second segment 38. Alternatively, upon tightening of the adjustable fasteners 61, there may be gaps between the stop surfaces 53 of the first segment 36 and the stop surfaces 53 of the second segment 38. As shown in FIGS. 15 and 16, each stop surface 53 may comprise a recessed portion 55. As shown in FIG. 4, when the segments 36, 38 are drawn together, respective recessed portions 55 of the stop surfaces 53 may define a slot 57 adapted to receive a tool, such as a pry bar or flange spreader, that may be used to pry open the coupling 10 if needed. Optionally, a tool, such as a gauge may be used to measure the slot 57 to verify proper installation.

As shown in FIGS. 15 and 16, each segment 36, 38 may comprise a plurality of openings 94*a-c* which may be used to assemble the coupling 10 as described herein. In this example, shown in FIGS. 15 and 16, the openings 94*a-c* may extend through one or more gussets 96 connected to the segments 36, 38. Openings 94*a-c* may be located at different positions around the circumference of the segments 36, 38 to provide attachment points for equipment to lift the coupling 10 and rotate pipeline sections. Standard lift openings 94*a* may be located where they are advantageous for lifting a segment 36, 38 in an orientation that allows the fasteners 61 to be vertically inserted in holes 82, 84. Rotation openings 94*b* may be located on a relatively thicker section of the segment 36, 38 and may be a larger diameter than lifting openings 94*a* such that they can be used to rotate pipeline segments when the coupling 10 is fully installed. Clamshell openings 94*c* may be advantageously located between stop surfaces 53 and attachment members 50, 52, 54, 56 in order to aid installation of the coupling 10 using slings and to allow fasteners 61 to be horizontally inserted in holes 82, 84. The clamshell openings 94*c* may be positioned such that the fasteners 61 may be easily inserted into holes 82, 84 while attached to the lifting equipment and without interference from lifting equipment, such as shackles and/or sling(s).

As shown in FIG. 13, the first segment 36 defines a first channel 88 positioned between the first and second keys 42 and 44 on the first segment. The channel 88 extends lengthwise along the first segment 36. As shown in FIG. 14, the second segment 38 defines a second channel 90 positioned between the first and second keys 46, 48 on the second segment 38. The second channel 90 extends lengthwise along the second segment 38. As shown in FIG. 6, a seal 92 is received within the first and second channels 88 and 90. The seal 92 is engageable with the first and second rings 18 and 20 for effecting a fluid-tight joint between the pipe elements 12 and 14.

Figure 19:
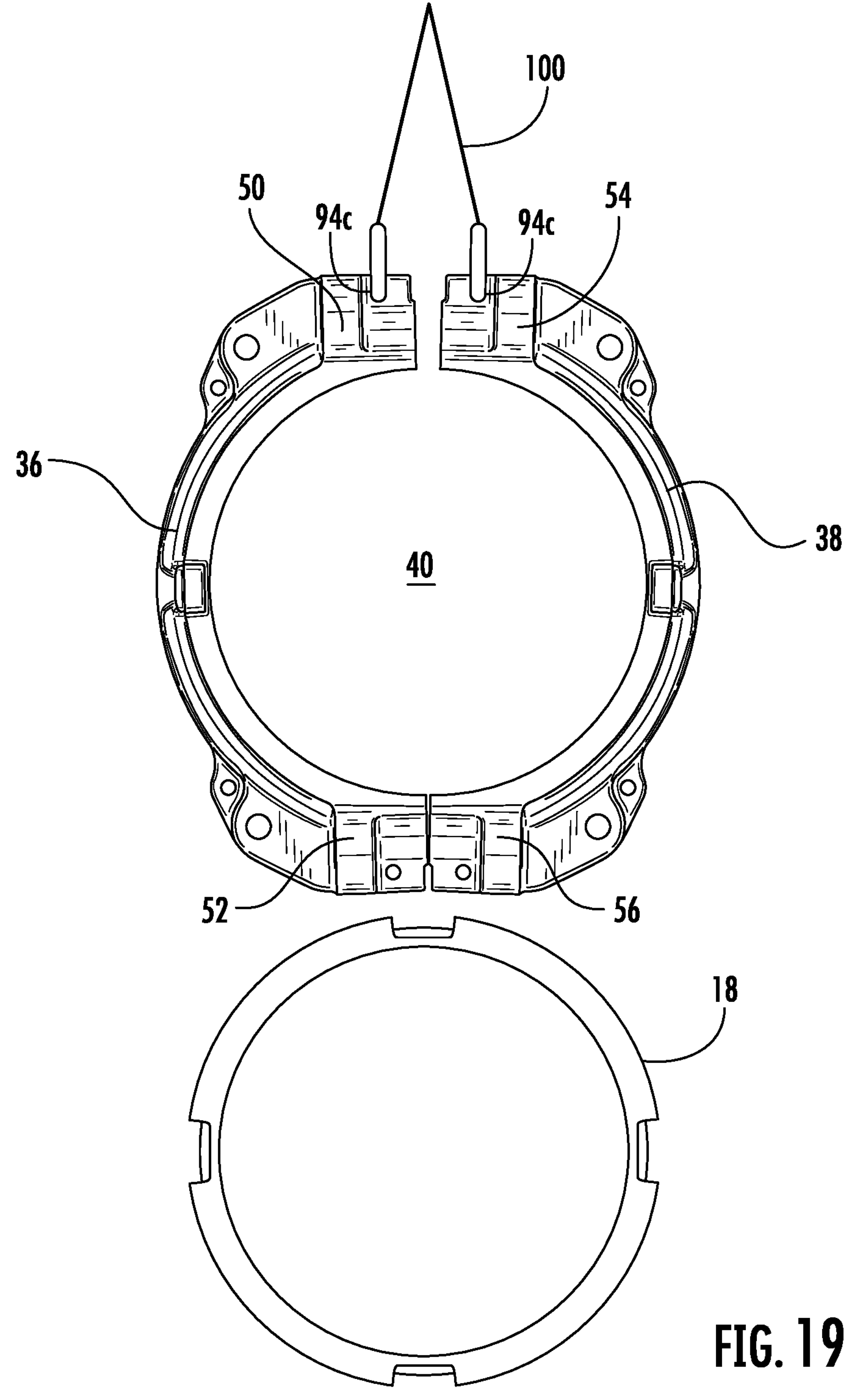
FIGS. 19-24 show an exemplary method of assembling the coupling according to the invention.

FIGS. 19-24 show an exemplary method of assembling the coupling 10 disclosed herein. The method of assembling the coupling 10 disclosed herein may also be called "clamshelling" or the "clamshell" method. As shown in FIG. 19, the method comprises positioning the first ring 18 and the second ring 20 (the first ring 18 shown) facing end to end. The method may further comprise placing the seal 92 around the first and second rings 18, 20 so that the seal 92 overlays a seam formed between the first and second ring 18, 20 facing end to end (shown in FIGS. 5 and 6). As shown in FIG. 19, the method comprises lifting the first and second segments 36, 38 positioned end to end surrounding the central space 40 proximate to the first attachment member 50 of the first segment 36 and the first attachment member 54 of the second segment 38. Optionally, the first and second segments 36, 38 may be lifted at a location between the first attachment member 50 of the first segment 36 and the stop surface 53 of the first segment 36 and between the first attachment member 54 of the second segment 38 and the stop surface 53 of the second segment 38. The first and second segments 36, 38 may be lifted at points between the first attachment member 50 of the first segment 36 and the first attachment member 54 of the second segment 38. Optionally, the first and second segments 36, 38 may be lifted via a sling 100 attached to shackles connected to the first and second segments 36, 38 via clamshell openings 94*c*. The sling 100 may be connected to lifting equipment such as a crane. As shown in FIG. 19, the location of the clamshell openings 94*c* may advantageously cause the opposing ends of the first and second segments 36, 38 proximate the second attachment members 52, 56 to hang closer together than the ends proximate the lifting location. Optionally, as shown in FIG. 19, the ends of the first and second segments 36, 38 closer to the second attachment members 52, 56 may contact one another.

Figure 20:
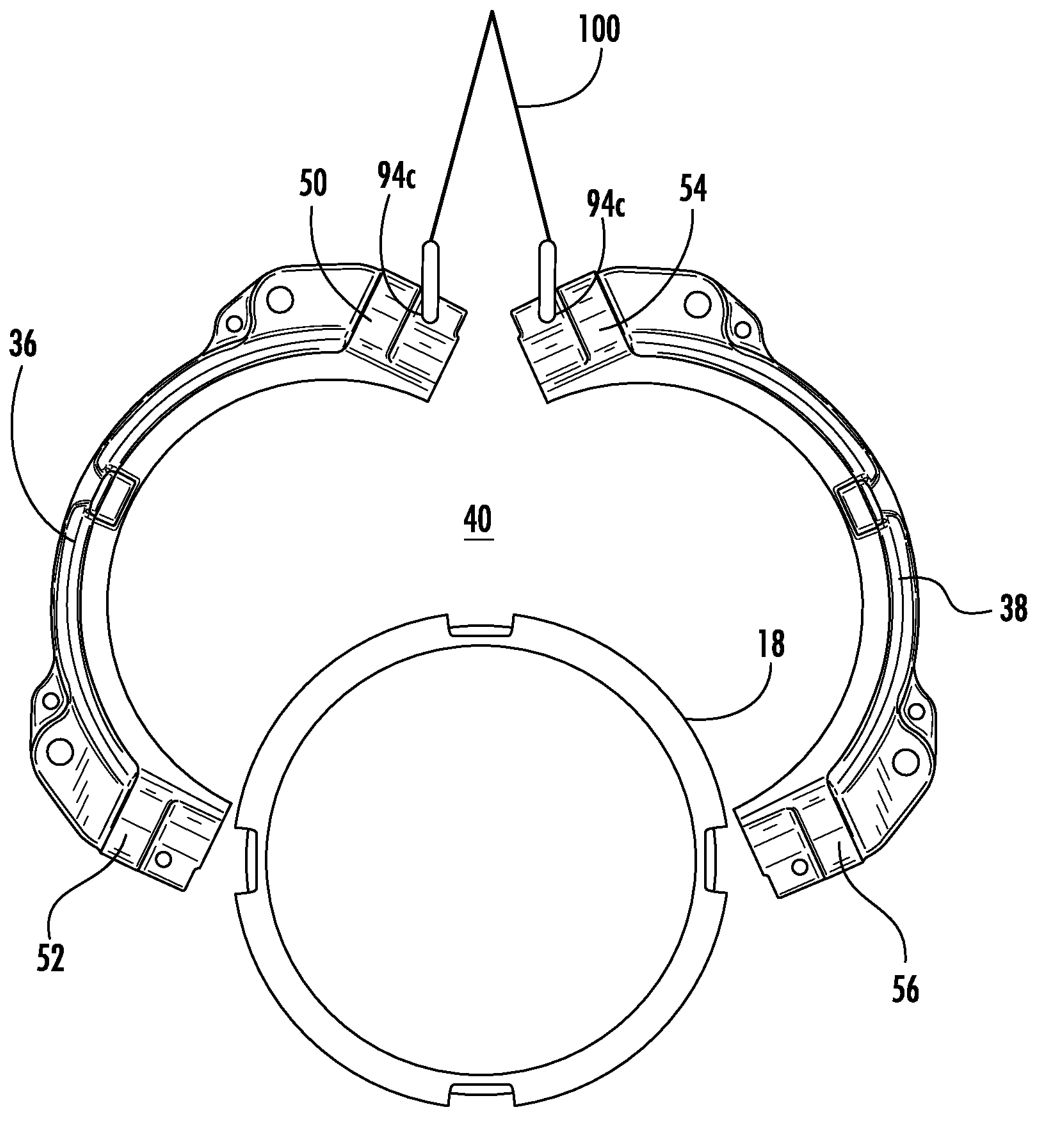
Figure 21:
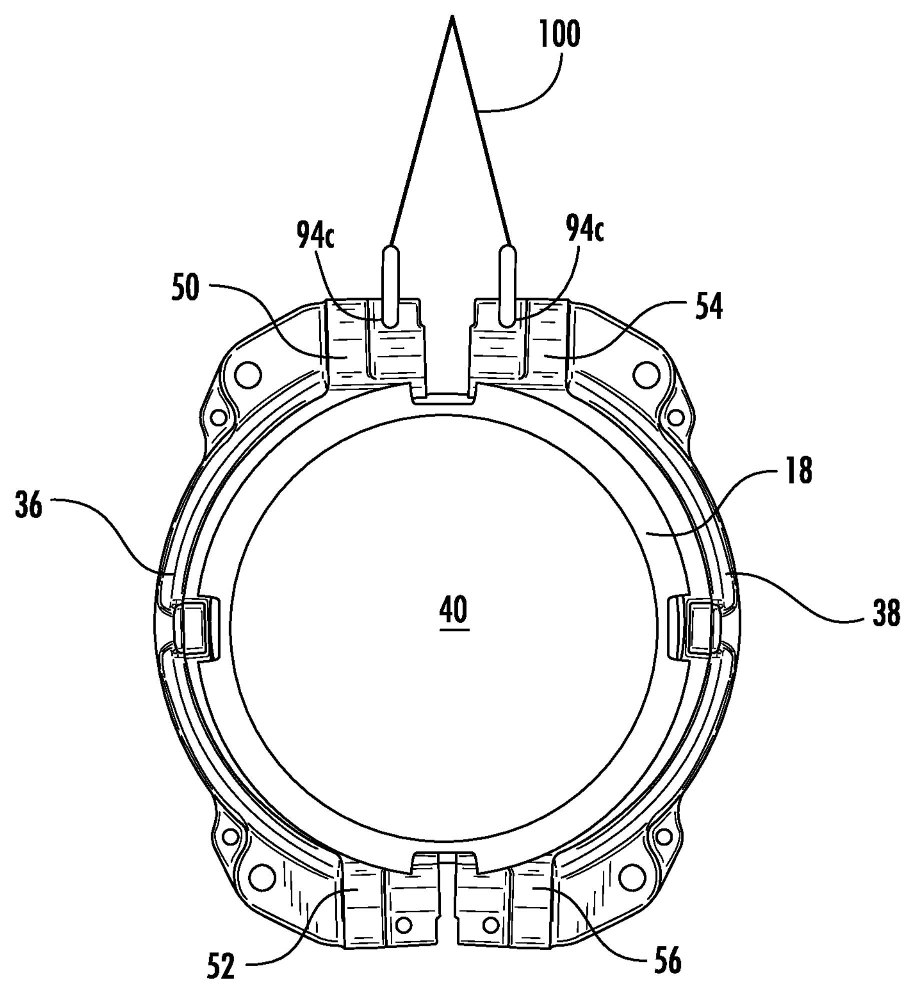

As shown in FIGS. 20 and 21, the method comprises pulling the first and second segments 36, 38 away from one another and lowering the first and second segments 36, 38 over the first and second rings 18, 20 until the first and second rings 18, 20 are positioned within the central space 40. As shown in FIG. 21, once the first and second segments 36, 38 have been completely lowered over the rings 18, 20 and the rings 18, 20 are positioned within the central space 40, the opposing ends of the first and second segments 36, 38 proximate the second attachment members 52, 56 may return to their position close together or may substantially return to their position close together thereby allowing easy insertion of fasteners 61. Because of the location of the lifting points, more specifically, the location of the clamshell openings 94*c*, the opposing ends may return to a position relatively close together without manually forcing the segments 36, 38 together to insert the fasteners 61.

Figure 22:
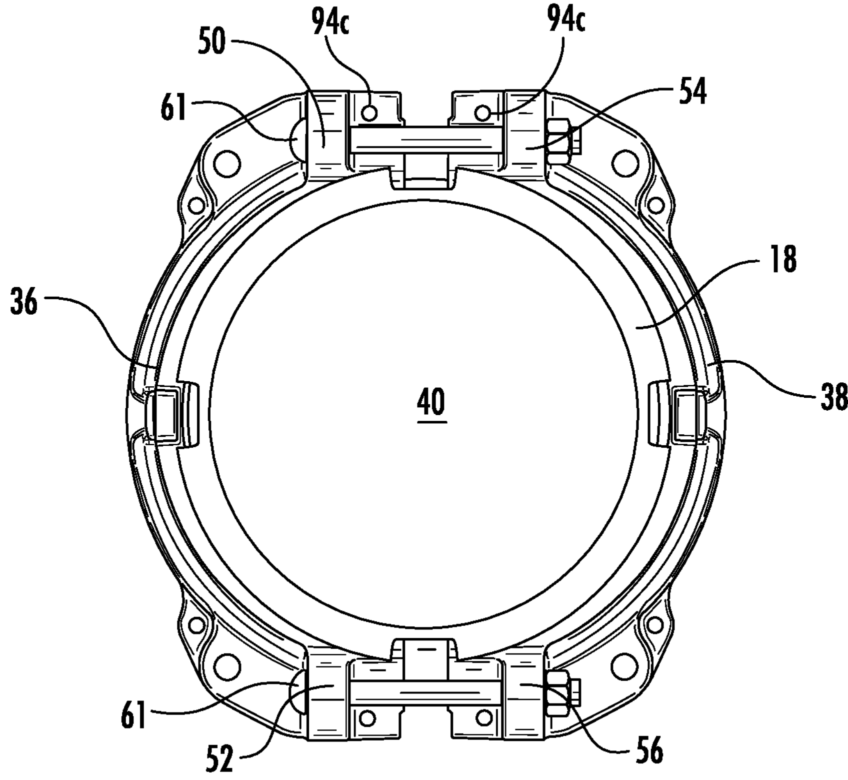

As shown in FIG. 22, the method comprises attaching the second attachment member 52 of the first segment 36 and the second attachment member 56 of the second segment 38 via fasteners 61. The method comprises attaching the first attachment member 50 of the first segment 36 and the first attachment member 54 of the second segment 38 via fasteners 61. Optionally, after the second attachment members 52, 56 are attached, the sling 100 may again be lifted, forcing the ends proximate the lifting points to come together to allow the fasteners 61 to be easily installed to attach the first attachment members 50, 54. After the fasteners 61 are installed, the sling 100 may be removed.

Figure 23:
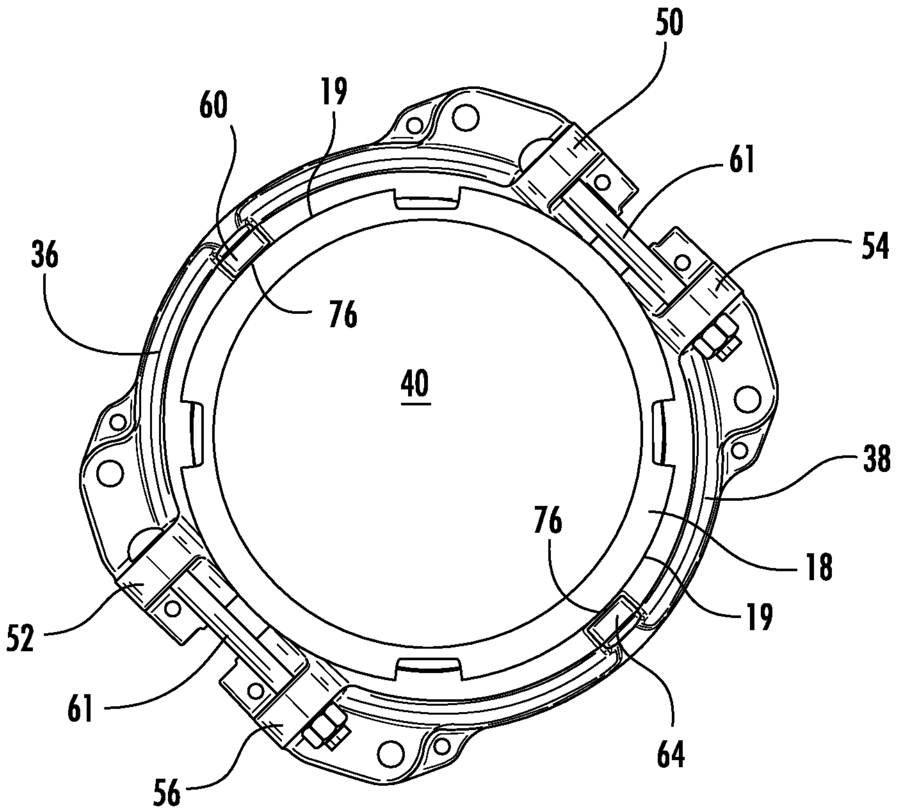
Figure 24:
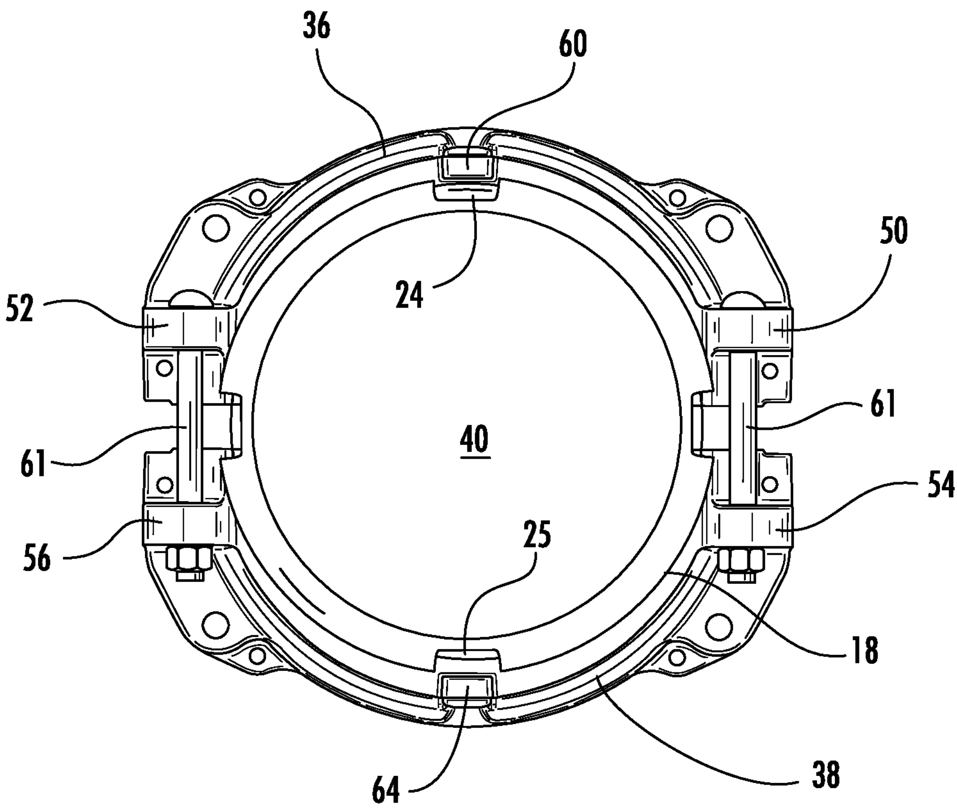

As shown in FIGS. 23 and 24, the method comprises rotating the attached first and second segments 36, 38 about the first and second rings 18, 20 until the first and second projections 60, 62 of the first segment 36 respectively align with the first notch 24 in the first ring 18 and the first notch 32 in the second ring 20. The method may comprise rotating the attached first and second segments 36, 38 about the first and second rings 18, 20 until the first and second projections 64, 66 of the second segment 38 respectively align with the second notch 25 in the first ring 18 and the second notch 33 in the second ring 20. The partially assembled coupling 10 may be rotated about the rings 18, 20 to advantageously vertically orient the fasteners 61. In this position, the fasteners 61 may be fully tightened more easily. During rotation, the third action surfaces 76 may slide on an outer surface 19 of the rings 18, 20. The outer surface 19 of the rings 18, 20 extending between notches may provide a piloting surface for the third action surface 76 of the projections to ride on to stabilize and guide the segments 36, 38 and provide space between the segments and the seal 92 as the segments 36, 38 are rotated with respect to the rings 18, 20 and pipe elements. The outer surface 19 may have a diameter greater than the outer diameter of the seal 92 thereby creating gaps or space between the channels 88, 90 and the seal 92. The gaps or space between the channels 88, 90 and seal 92 may prevent the rotation of the segments 36, 38 from damaging or moving the seal 92. Further, the gaps or space may reduce friction between the seal 92 and segments 36, 38 to allow the segments 36, 38 to rotate about the rings 18, 20 more easily.

As shown in FIG. 4, once the projections 60, 62, 64, 66 are in position, the method may comprise tightening the fasteners 61 until the first and second projections 60, 62 of the first segment 36 respectively engage the first notch 24 in the first ring 18 and the first notch 32 in the second ring 20. Upon tightening of the fasteners 61, the first and second projections 64, 66 of the second segment 38 respectively engage the second notch 25 in the first ring 18 and the second notch 33 in the second ring 20. Tightening of the fasteners 61 may also effectuate engagement of the keys 42, 44, 46, 48 of the segments 36, 38 with the grooves 22, 30 of the rings 18, 20. Upon tightening of the fasteners 61, the first channel 88 and the second channel 90 may receive the seal 92. Upon tightening of the fasteners 61, the first channel 88 and the second channel 90 are drawn towards the rings 18, 20 and the seal 92 positioned around the rings 18, 20. As the channels 88, 90 are drawn towards the rings 18, 20 and seal 92, the seal 92 may seat within the channels 88, 90.

Figure 25:
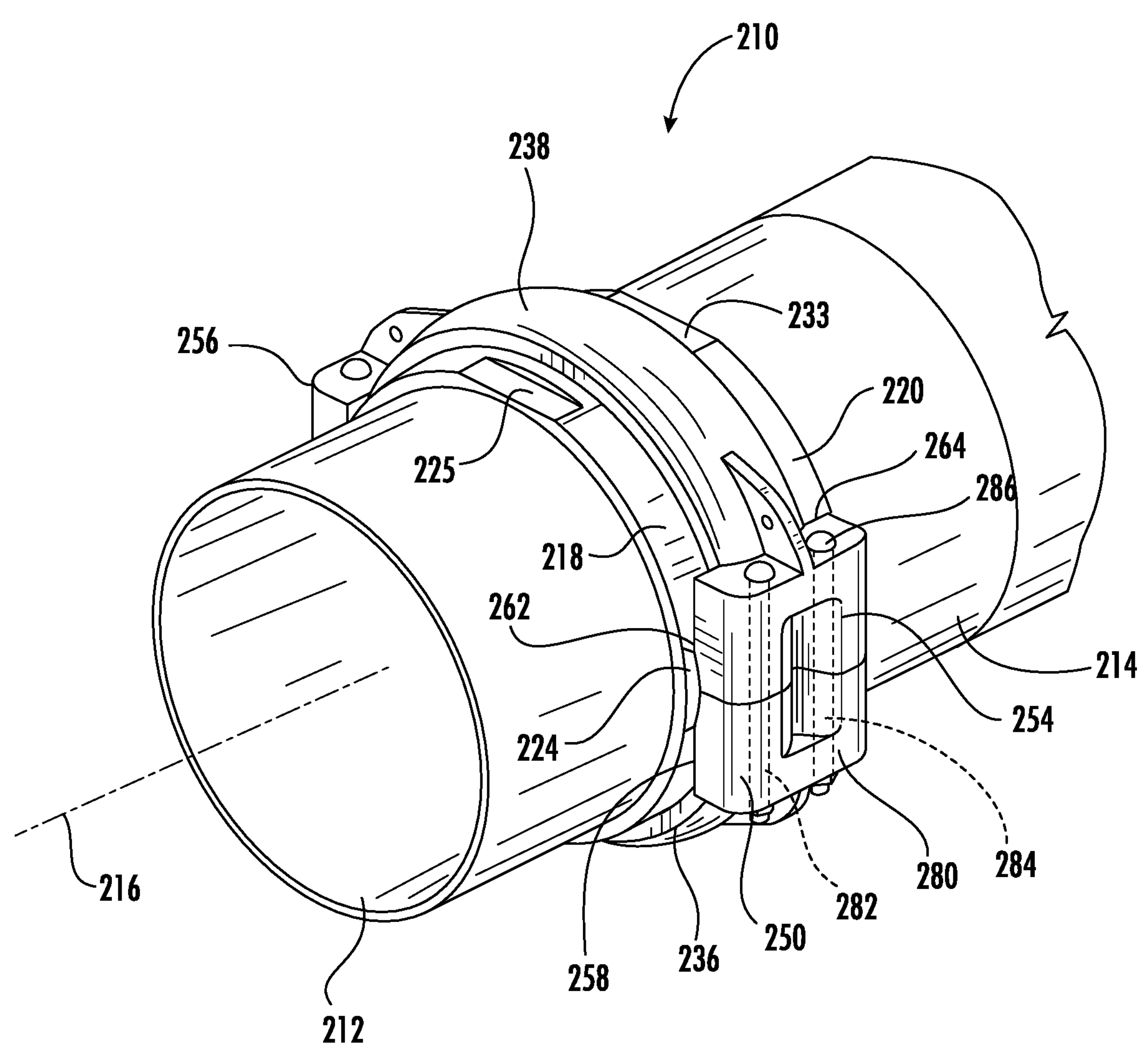
FIG. 25 is an isometric view of an example coupling according to the invention joining pipe elements.
Figure 26:
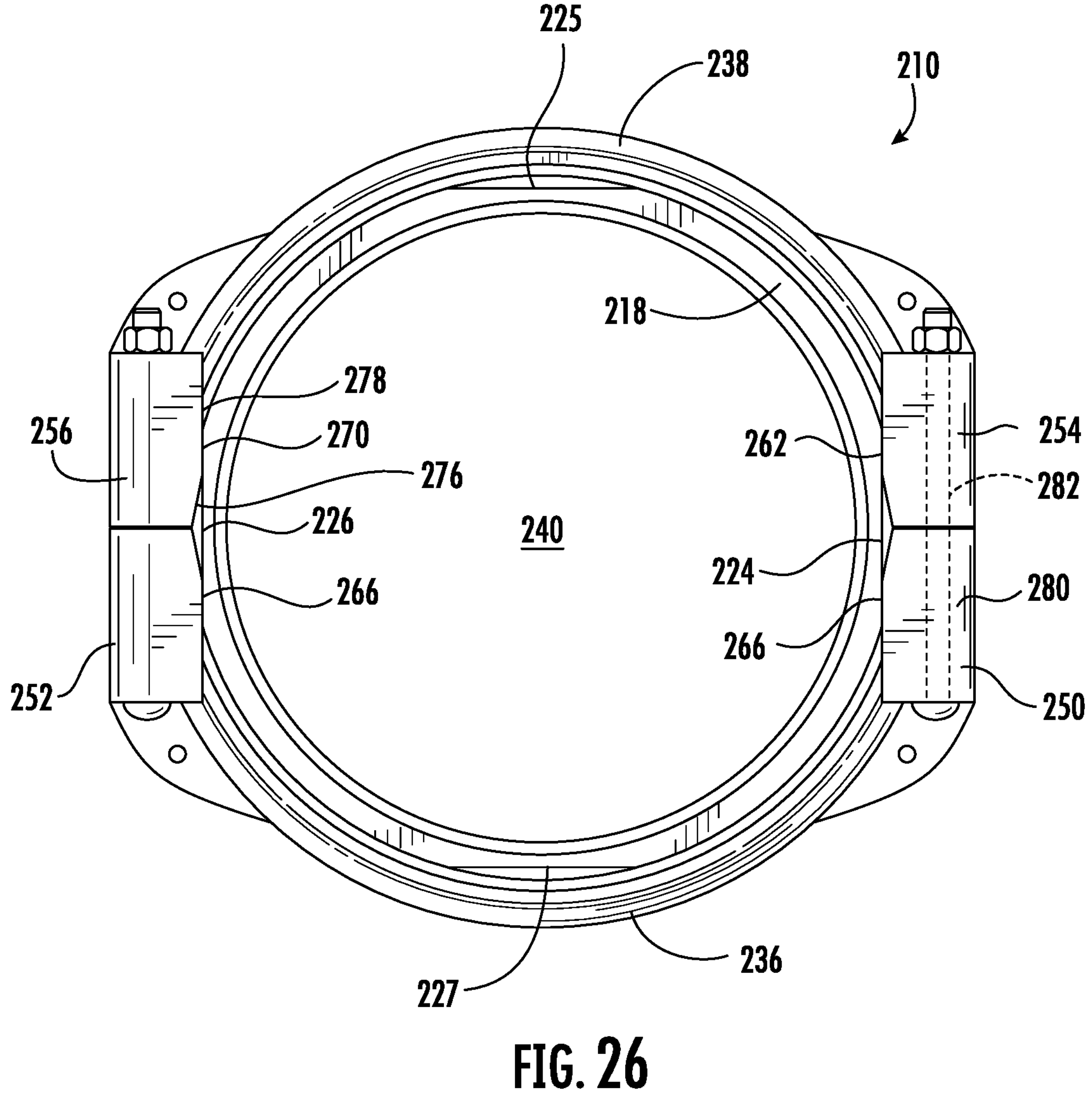
FIG. 26 is a plan view of the coupling shown in FIG. 25.
Figure 28:
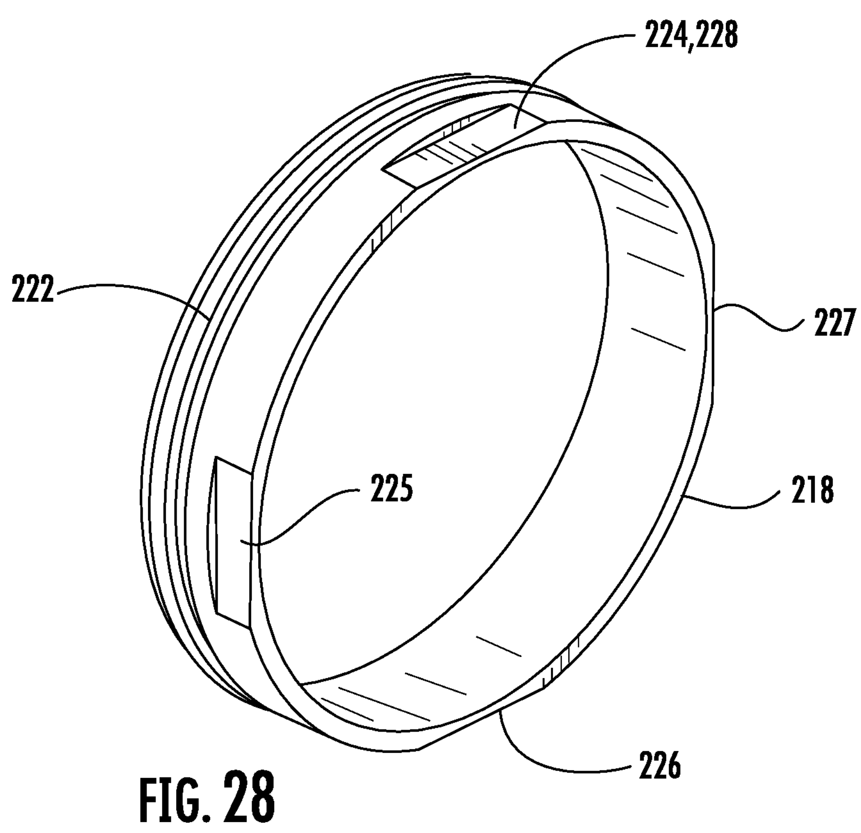
FIGS. 28 and 29 are isometric views of components of the coupling shown in FIG. 25.
Figure 29:
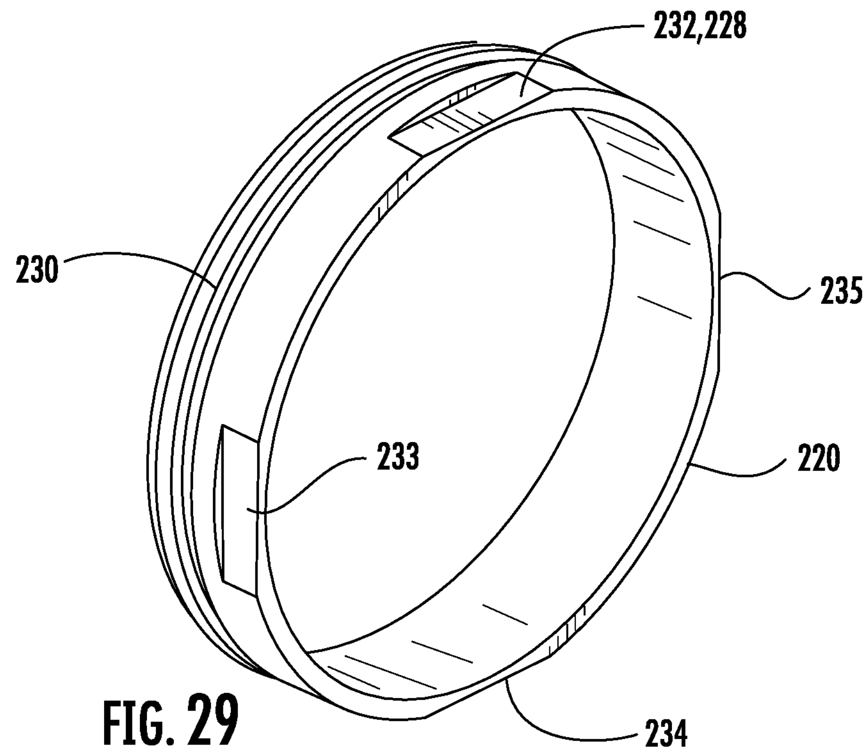
Figure 30:
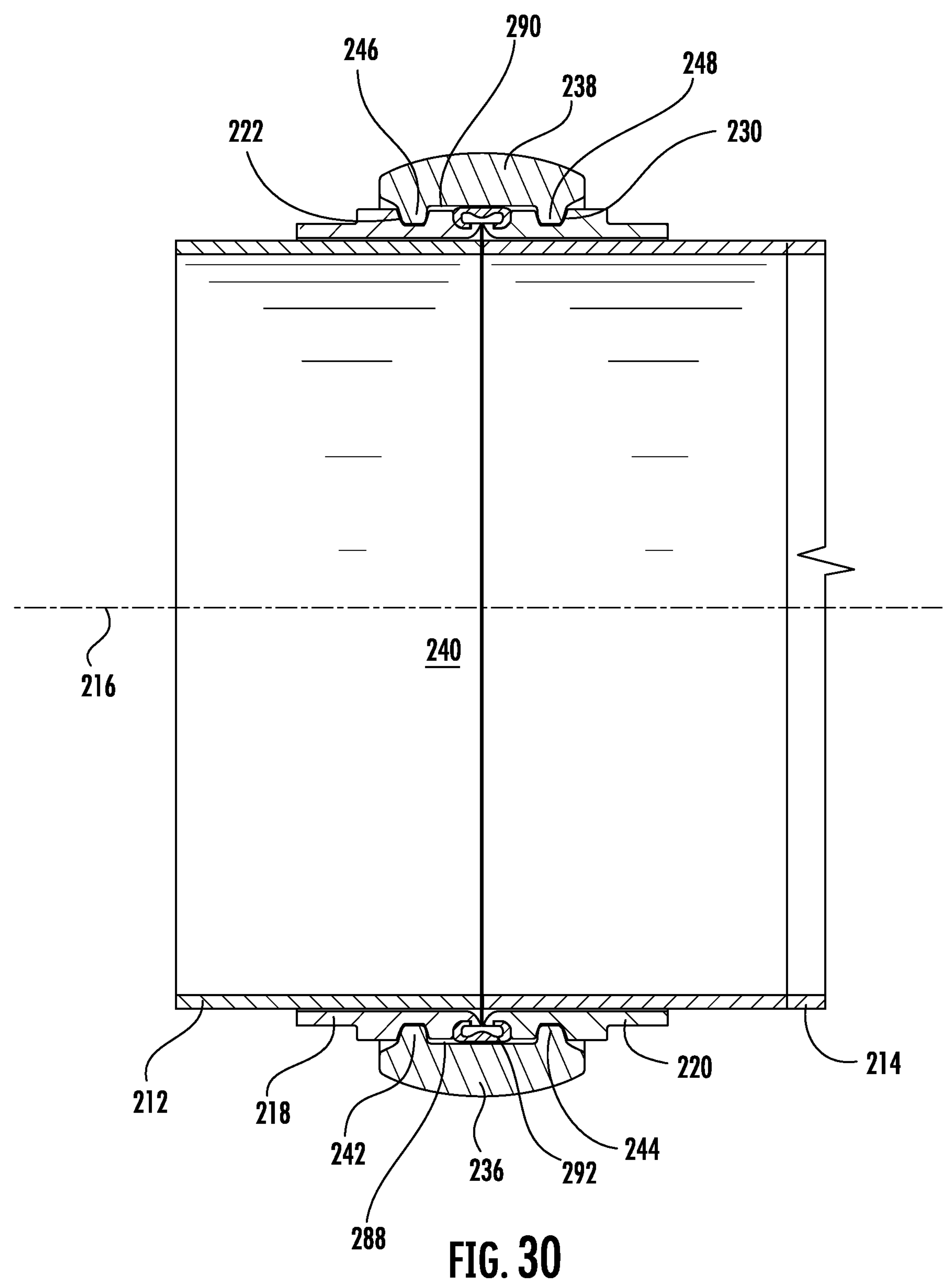
FIG. 30 is a longitudinal sectional view of the coupling and pipe elements shown in FIG. 25.

FIGS. 25 and 26 show an example coupling 210 for joining first and second pipe elements 212 and 214 while also preventing relative rotation of the pipe elements about a coaxial longitudinal axis 216. As shown in FIG. 25, the coupling 210 comprises a first ring 218 attachable to an end of the first pipe element 212 and a second ring 220 attachable to an end of the second pipe element 214. Attachment of the rings 218 and 220 to the respective pipe elements 212 and 214 may be effected by welding, but other means of attachment are also feasible. As shown in FIGS. 28 and 30, the first ring 218 defines a first groove 222 extending circumferentially around the ring. As shown in FIG. 28, the first ring 218 also defines one or more receiving surfaces, in this example four receiving surfaces 224, 225, 226 and 227. Each receiving surface 224, 225, 226 and 227 extends over a respective portion of the first ring 218 adjacent to the first groove 222. In this example embodiment the receiving surfaces 224, 225, 226, and 227 comprise flat surfaces 228, each flat surface extending along a chord of the ring 218. The receiving surfaces are arranged 90° apart from one another about the first ring 218. In this example embodiment, the second ring 220 is identical to the first ring 218, and, as shown in FIGS. 29 and 30, defines a second groove 230 extending circumferentially around the second ring. As with ring 218, four receiving surfaces 232, 233, 234 and 235 extend over respective portions of the second ring 220 (see FIG. 28), the receiving surfaces again comprising flat surfaces 228 each of which extend along a chord of the ring 220 and are arranged 90° apart from one another about the second ring 220. Rings 218 and 220 are not limited to four receiving surfaces, as either more or fewer surfaces, arranged in pairs at angular intervals around the rings, are feasible.

Figure 27:
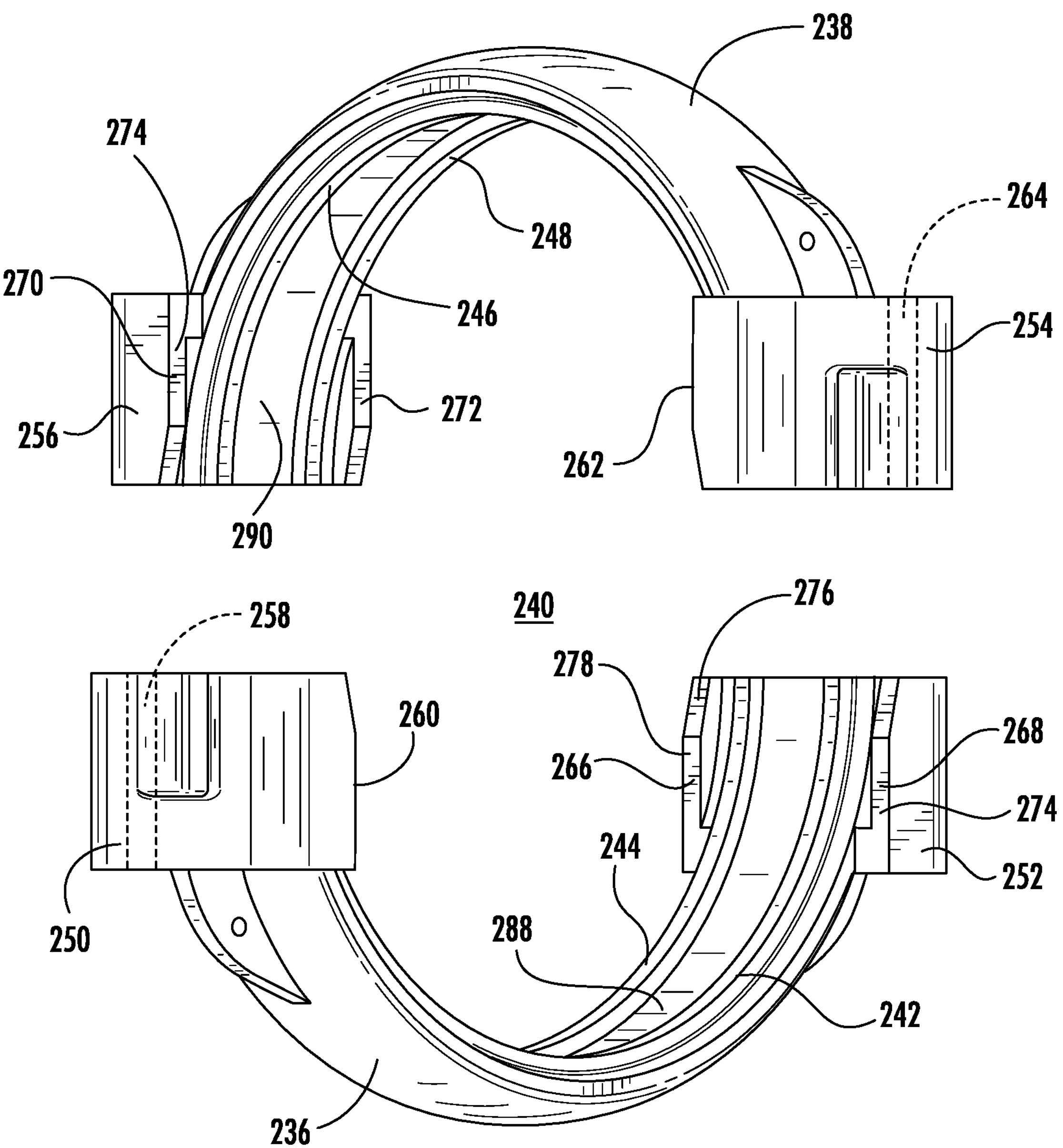
FIG. 27 is an exploded isometric view of segments comprising the coupling shown in FIG. 25.

As shown in FIGS. 25 and 26, the coupling 210 also comprises first and second segments 236 and 238 attachable end to end to surround a central space 240. As shown in FIGS. 27 and 30, the first segment 236 comprises first and second keys 242 and 244 which, in this example take the form of arcuate projections which extend lengthwise along the first segment and project toward the central space 240. The first and second keys 242 and 244 are in spaced apart relation and, as shown in FIG. 30, spaced so as to engage the first and second grooves 222 and 230 defined in the first and second rings 218 and 220 when the rings are positioned within the central space 240.

The second segment 238 may be identical to the first segment 236, as in the example coupling embodiment 210 shown in FIG. 25, and, as shown in FIGS. 27 and 30, comprises first and second keys 246, 248 extending lengthwise along the second segment 238 and projecting toward the central space 240. The first and second keys 246 and 248 on the second segment 238 are in spaced apart relation, and, as shown in FIG. 30, spaced so as to engage the first and second grooves 222 and 230 defined in the first and second rings 218 and 220 when the rings are positioned within the central space 240.

As shown in FIGS. 25 and 26, the first segment 236 comprises first and second attachment members 250 and 252 positioned at opposite ends thereof. The second segment 238 also comprises first and second attachment members 254 and 256, positioned at opposite ends thereof. The first attachment member 250 on the first segment 236 is engageable with the first attachment member 254 on the second segment 238. Similarly, the second attachment member 252 on the first segment 236 is engageable with the second attachment member 256 on the second segment 238, the attachment members attaching the first and second segments 236 and 238 to one another. As shown in FIGS. 25 and 27, the first attachment member 250 on the first segment 236 defines a first action surface 258 engageable with a first one of the receiving surfaces 224 on the first ring 218, and a second action surface 260 in spaced relation to the first action surface 258 and engageable with a second one of the receiving surfaces 232 (not visible) on the second ring 220 when the first and second rings 218 and 220 are within the central space 240. Engagement between the action surfaces 258, 260 and the receiving surfaces 224 and 232 respectively prevents rotation of the first and second pipe elements 212 and 214 with respect to one another about the longitudinal axis 216.

It is considered advantageous to have a plurality of action surfaces engage respective receiving surfaces. Thus, as shown in FIGS. 25, 26 and 27 in the example embodiment, the first attachment member 254 on the second segment 238 comprises a third action surface 262 engageable with the first receiving surface 224 on the first ring 218, and a fourth action surface 264 in spaced relation to the third action surface 262 and engageable with the second receiving surface 232 (not visible) on the second ring 220. It is also advantageous if action surfaces engage receiving surfaces on opposite sides of the rings 218 and 220. Thus, as shown in FIGS. 28 and 29, a third one of the receiving surfaces 226 extends over a portion of the first ring 218 adjacent to the first groove 222, and a fourth one of the receiving surfaces 234 extends over a portion of the second ring 220 adjacent to the second groove 230. As shown in FIGS. 26 and 27, the second attachment member 252 on the first segment 236 comprises a fifth action surface 266 engageable with the third receiving surface 226 on the first ring 218 shown in FIGS. 26 and 28. As shown in FIG. 27, a sixth action surface 268 is in spaced relation to the fifth action surface 266 and is engageable with a fourth one of the receiving surfaces 234 on the second ring 220 shown in FIG. 29. As shown in FIGS. 26 and 27, the second attachment member 256 on the second segment 238 comprising a seventh action surface 270 engageable with the third receiving surface 226 on the first ring 218, and an eighth action surface 272, in spaced relation to the seventh action surface 270, is engageable with the fourth receiving surface 234 on the second ring 220 (see FIG. 29).

For compatibility and effective engagement between the action surfaces and the receiving surfaces, it is advantageous if, as noted above, the receiving surfaces 224, 225, 226, and 227 and 232, 233, 234, and 235 comprise flat surfaces 228, each flat surface extending along a chord of the rings 218 and 220. For advantageous mating engagement to prevent relative rotation between the pipe elements 212 and 214 about longitudinal axis 216, in this example embodiment the first through eighth action surfaces 258, 260, 262, 264, 266, 268, 270 and 272 also comprise flat surfaces 274 capable of mating engagement with their respective receiving surfaces.

As shown in FIGS. 26 and 27, in this example embodiment, for each action surface, a first portion 276 of the action surface is angularly oriented with respect to a second portion 278 of the action surface. The angular orientation of the first portions 276 act as a lead in to guide the rings 218 and 220 into the segments 236 and 238 when the coupling 210 is assembled.

The receiving surfaces on each ring 218 and 220 work in opposite pairs to engage the eight action surfaces of the segments 236 and 238. It is advantageous to include a plurality of paired receiving surfaces on each ring 218 and 220. In this example there are two sets of paired receiving surfaces on ring 218, namely, paired receiving surfaces 224 and 226, and paired receiving surfaces 225 and 227. Similarly, ring 220 comprises paired receiving surfaces 232 and 234, and paired receiving surfaces 233 and 235. Using a plurality of paired receiving surfaces on each ring 218 and 220 permits effective mechanical engagement between the segments 236 and 238 and the rings and also allows the pipe elements to which the rings are attached to be rotated or "clocked" over angular intervals about the pipe element longitudinal axis relative to the segments 236 and 238 as defined by the number of paired receiving surfaces. In this example, the pipe elements may be clocked over 90° intervals consistent with the 90° angular separation between the paired receiving surfaces. The ability to clock the pipe elements allows them to be rotated to more evenly distribute the abrasive wear on their inner surfaces (thereby increasing the useful life of the pipe elements) while maintaining the orientation of the coupling segments 236 and 238. This is advantageous because it permits convenient access to the fasteners connecting the segments after repeated clocking of the pipe elements, which might not be possible if the segments rotated with the pipe elements when clocked.

In the example embodiment, each attachment member 250, 252, 254 and 256 comprises a lug 280 (see FIGS. 25 and 26) defining first and second holes 282 and 284 in spaced relation. Each hole is adapted to receive an adjustable fastener 286 for attaching the first attachment member 250 on the first segment 236 to the first attachment member 254 on the second segment 238, and the second attachment 252 member on the first segment 236 to the second attachment member 256 on the second segment 238.

It is thought advantageous to minimize the distance between the neutral axis of the cross section of the segments and a point, such as the centerline, on the cross section of a fastener attaching the segments to one another. Minimizing this distance reduces bending moments which are applied to the fasteners due to internal pressure within the rings which tries to separate the segments forming a pipe joint. The smaller bending moments allow for various design tradeoffs, such as using smaller diameter fasteners, less expensive fasteners of lower strength material, or increased pressure load performance for a given fastener and coupling combination. Prior art couplings are limited in the ability to locate the fastener centerlines close to the neutral axis of the coupling segments by the size of the fasteners and their heads (such as the bolt head or nut), and the need to provide access to the fasteners and clearance for tools used to install the fasteners.

Figure 26A:
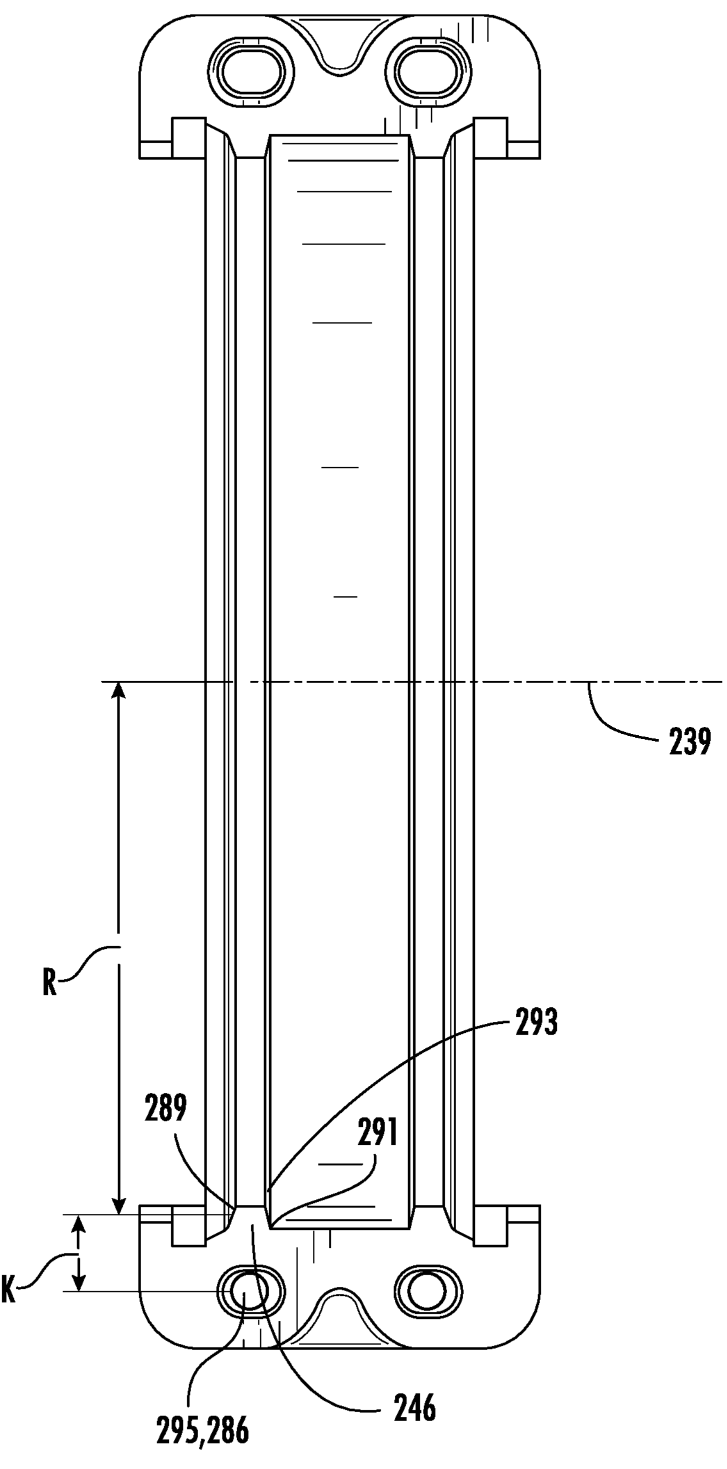
FIG. 26A is a cross sectional view of a segment comprising the coupling shown in FIG. 26.

FIG. 26A also illustrate another way of specifying an advantageous attachment configuration. In this example, a relationship between the radius of a convenient point on a key and the distance from that point on the key to a convenient point on a fastener, measured along a diameter of one of the rings (18, 20) is used as a proxy for the minimization of the distance between the neutral axis of the segments and the fasteners that is independent of the specific cross-section of the coupling. As shown by way of example in FIG. 26A, the distance K between a point 289 half way between the root 291 on the key 246 and the free end 293 of the key 246, and a point 295 on the centerline 297 of the fastener 286, measured along a diametral line of the ring 218 may be compared to the distance R between point 289 and the center of curvature of the key 246 at axis 239 by dividing distance K by distance R. This ratio expresses the relative closeness of the bolt to the key in terms of the radius of the key, and therefore generally of the pipe to be joined. This is expected to provide advantage where the ratio of R/K is greater than 23, and further when the ratio is greater than 5, such as between 5 and 6.

Figure 26B:
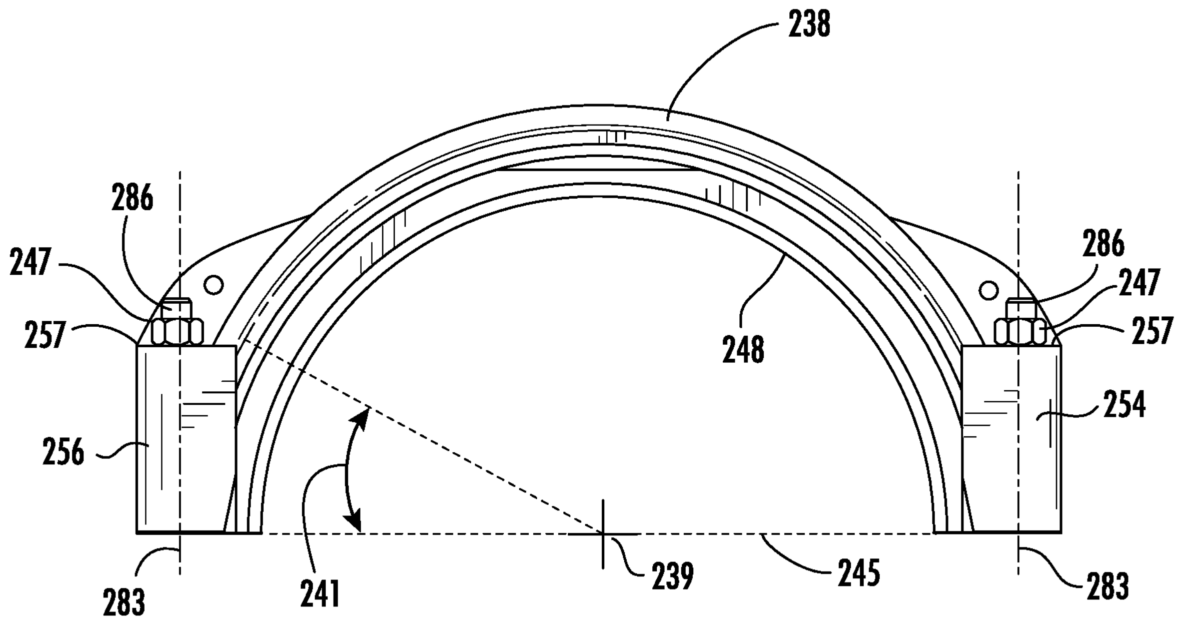
FIG. 26B is a plan view of a segment comprising the coupling shown in FIG. 26.

Another example of defining the advantageous configuration for pipe coupling segments is shown in FIG. 26B. In this example the attachment members on segments 236 and 238 (attachment members 256 and 258 on segment 238 shown) subtend a relatively large angular portion of each segment as measured from the axis 239 which is the center of curvature for the keys 242, 244 (segment 236), 246 and 248 (segment 238 shown). Subtended angles 241 for attachment members 250, 252, 254 and 256 (254 and 256 shown) range from 15° to about 35°, with a subtended angle of 25° being considered advantageous. In this example, the relatively large angle subtended by the attachment members 256 and 258 permits the centerlines 283 of fasteners 286 to be located relatively closer to the keys 246 because the bearing surfaces 257 on attachment members 256 and 258 are then located advantageously distant from the mating plane 245. This positioning is advantageous because the clearance between the outer surfaces of segment 238 and the nuts 247 of fastener 286 increases as the bearing surfaces 257 become more distant from plane 245.

As shown in FIGS. 27 and 30, the first segment 236 defines a first channel 288 positioned between the first and second keys 242 and 244 on the first segment. The channel 288 extends lengthwise along the first segment 236. The second segment 238 defines a second channel 290 positioned between the first and second keys 246, 248 on the second segment 238. The second channel 290 extends lengthwise along the second segment 238. As shown in FIG. 30, a seal 292 is received within the first and second channels 288 and 290. The seal 292 is engageable with the first and second rings 218 and 220 for effecting a fluid-tight joint between the pipe elements 212 and 214.

It is expected that pipe couplings according to the invention can eliminate various disadvantages associated with rotating pipeline sections and thereby improve the efficiency and safety of such operations.

Rotational Couplings

Also disclosed herein is an example rotational coupling configured to join pipe elements together and allow rotation of the pipe elements with respect to one another.

Figure 31:
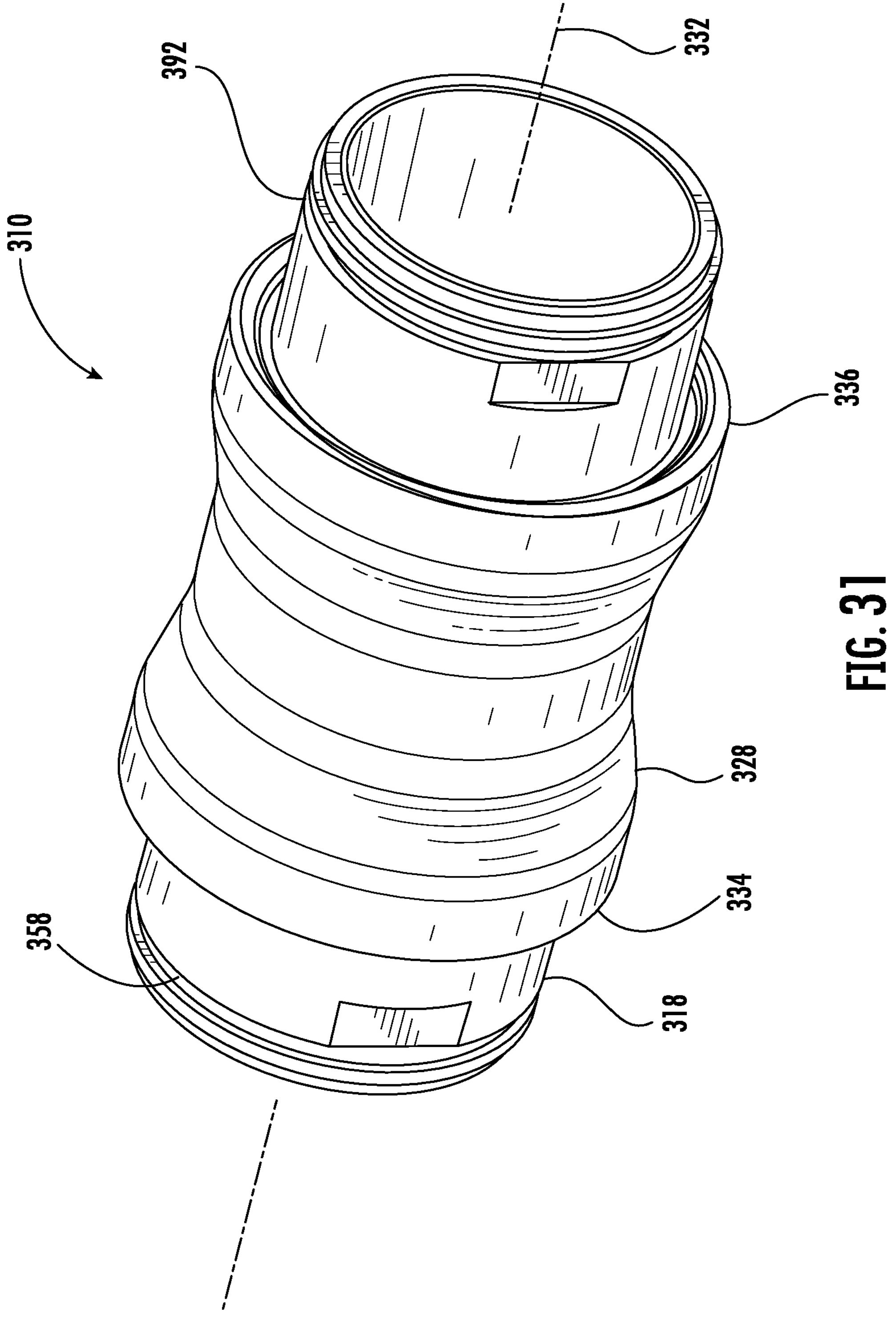
FIG. 31 is an isometric view of an example coupling permitting rotation of pipe elements about their longitudinal axes.
Figure 32:
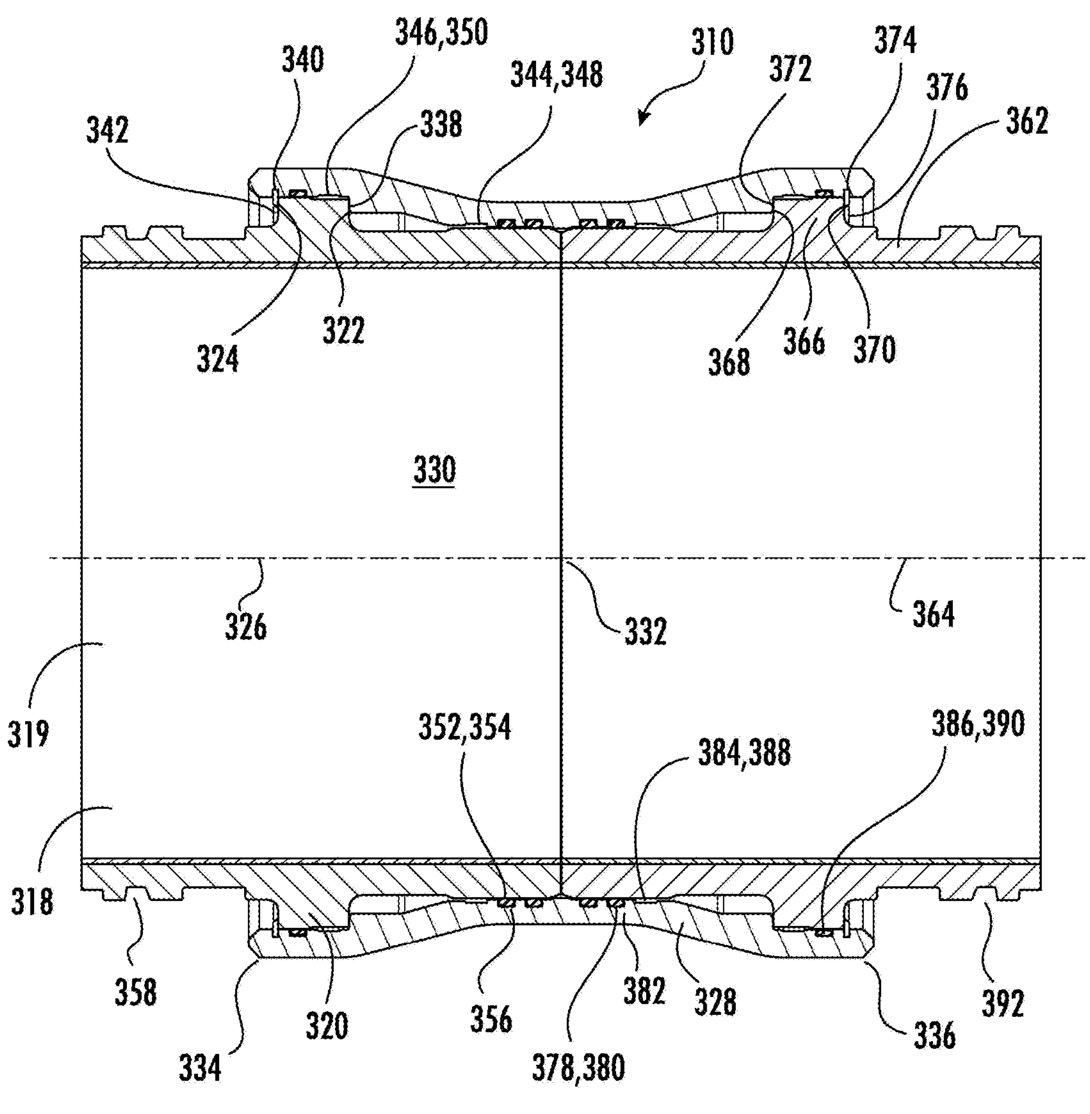
FIG. 32 is a longitudinal sectional view of the pipe coupling shown in FIG. 31.
Figure 33:
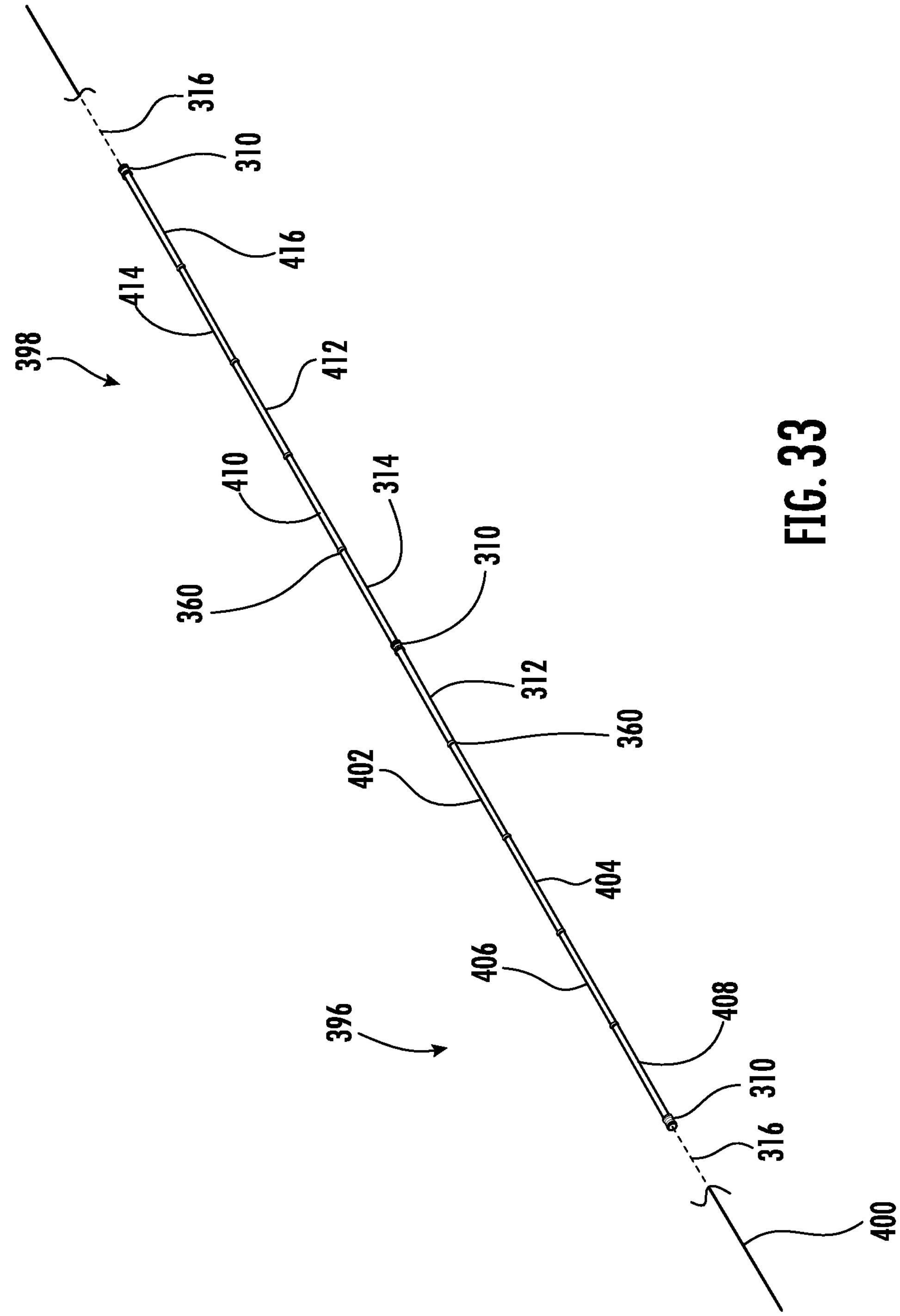
FIG. 33 is an isometric view of an example pipeline comprising pipe elements connected to one another using the coupling shown in FIG. 31.

FIGS. 31-33 show an example embodiment of a coupling 310 permitting rotation of pipe elements 312, 314 about their longitudinal axes 316 according to the invention. As shown in detail in FIG. 32, example coupling 310 comprises a first ring 318 attachable to a first of the pipe elements, the first ring 318 comprising a first collar 320 extending circumferentially around the first ring and projecting outwardly therefrom. The first collar 320 defines a bearing surface 322 and a retaining surface 324 oppositely disposed from one another. The surfaces 322 and 324 are oriented transversely to a first ring axis 326 arranged coaxially with the first ring 318. Optionally, the surfaces 322 and 324 are oriented perpendicularly or substantially perpendicularly (e.g., within 10 degrees of perpendicular) to the first ring axis 326. First ring 318 may also comprise a liner 319 to act as a sacrificial wearing surface, protecting the first ring against abrasion. Liner 319 may be formed from or comprise an abrasion resistant material such as steel, chromium carbide, and urethane to cite some examples, the liner being replaceable to permit the ring to be reused.

A housing 328 defines a through bore 330 which surrounds a longitudinal axis 332 arranged coaxially with the bore. The housing 328 has a first end 334 and a second end 336 oppositely disposed from one another. The housing 328 has a length extending between the first end 334 and the second end 336 along the longitudinal axis 332. The first end 334 of housing 328 is adapted to receive the first ring 318 coaxially within the housing bore 330. In this example embodiment the housing comprises a first shoulder 338 positioned distal to the first end 334 of the housing (for example, spaced from the first end 334 in a direction moving toward the second end 336 of the housing 328). The first shoulder 338 may be positioned between the first end 334 and the middle point of the housing 328 between the first and second ends 334 and 336. The first shoulder 338 projects toward the longitudinal axis 332 and is oriented transversely thereto. Optionally, the first shoulder 338 is oriented perpendicularly or substantially perpendicularly (e.g., within 10 degrees of perpendicular) to the longitudinal axis 332. A first channel 340 extends circumferentially around the housing 328 and faces the longitudinal axis 332. The first channel 340 is positioned in spaced apart relation to the first shoulder 338 and proximate to the first end 334 of the housing 328 (for example, first channel 340 may be positioned within 10-15% of the housing's length from the first end 334). Optionally, the first channel 340 may be positioned between the first shoulder 338 and the first end 334. A first retaining ring 342 is positionable within the first channel 340. Example retaining rings 342 suitable for use in the invention are commercially available from Smalley USA, located in Lake Zurich, Illinois. The retaining rings 342 operate similarly to snap rings to fit within the bore 330 and then expand radially outwardly to engage the channel 340. The first retaining ring 342 projects into the bore 330 toward the housing longitudinal axis 332.

When, as shown in FIG. 32, the first ring 318 is received within the bore 330 of housing 328 at its first end 334, the first collar 320 of first ring 318 is positionable between the first shoulder 338 and the first channel 340 of the housing 328. The first retaining ring 342 is thereafter positionable within the first channel 340. The bearing surface 322 of collar 320 is engageable with the first shoulder 338 and the first collar's retaining surface 324 is engageable with the first retaining ring 342. The first ring 318 is thereby retained in the axial direction within the housing 328, but the only resistance to relative rotation between the first ring 318 and the housing 328 about the housing longitudinal axis 332 is friction between housing 328 and the first ring 318.

As the coupling 310 according to the invention is intended to permit relative rotation between the first ring 318 and the housing 328 (along with any pipe elements attached to the first ring, see FIG. 33) it is advantageous to position a first bearing 344 between the housing 328 and the first ring 318. In this example the first bearing 344 is positioned distal to the first end 334 of the housing 328 (for example, spaced from the first end 334 in a direction moving toward the second end 336 of the housing 328). The first bearing 344 may be positioned between the first shoulder 338 and the middle point of the housing 328 between the first and second ends 334 and 336. To provide two point support to the ring 318 for smooth rotation a second bearing 346 is advantageously positioned between the housing 328 and the first ring 318. In this example the second bearing 346 is positioned between the first collar 320 and the housing. By way of example, both the first and second bearings 344 and 346 comprise first and second bearing rings 348 and 350, each of which extend circumferentially around the bore 330. Both the first and second bearing rings 348 and 350 are formed of material having a lower coefficient of friction than either the first ring 318 or the housing 328. In a practical design the bearing rings 348 and 350 are formed from or comprise polytetrafluoroethylene for a low friction interface between housing 328 and first ring 318.

It is further advantageous to provide one or more seals 352 between the housing 328 and the first ring 318 to provide a fluid-tight joint between the first ring 318 and the housing 328. In the example coupling embodiment 310 shown in FIG. 32, a plurality of seals are used, positioned distal to the first end 334 of the housing 328 as well as between the housing and the first collar 320 (for example, spaced from the first end 334 in a direction moving toward the second end 336 of the housing 328). Optionally, the plurality of seals may be positioned between the first shoulder 338 and the middle point of the housing 328 between the first and second ends 334 and 336. In a practical design seals 352 may comprise O-rings or similar engineered seals 354 received within respective circumferential grooves 356 positioned in either first ring 318 (including the first collar 320) or the housing 328 (shown). O-rings or similar engineered seals may be considered advantageous because they permit relative rotation between the housing and ring.

Figure 34:
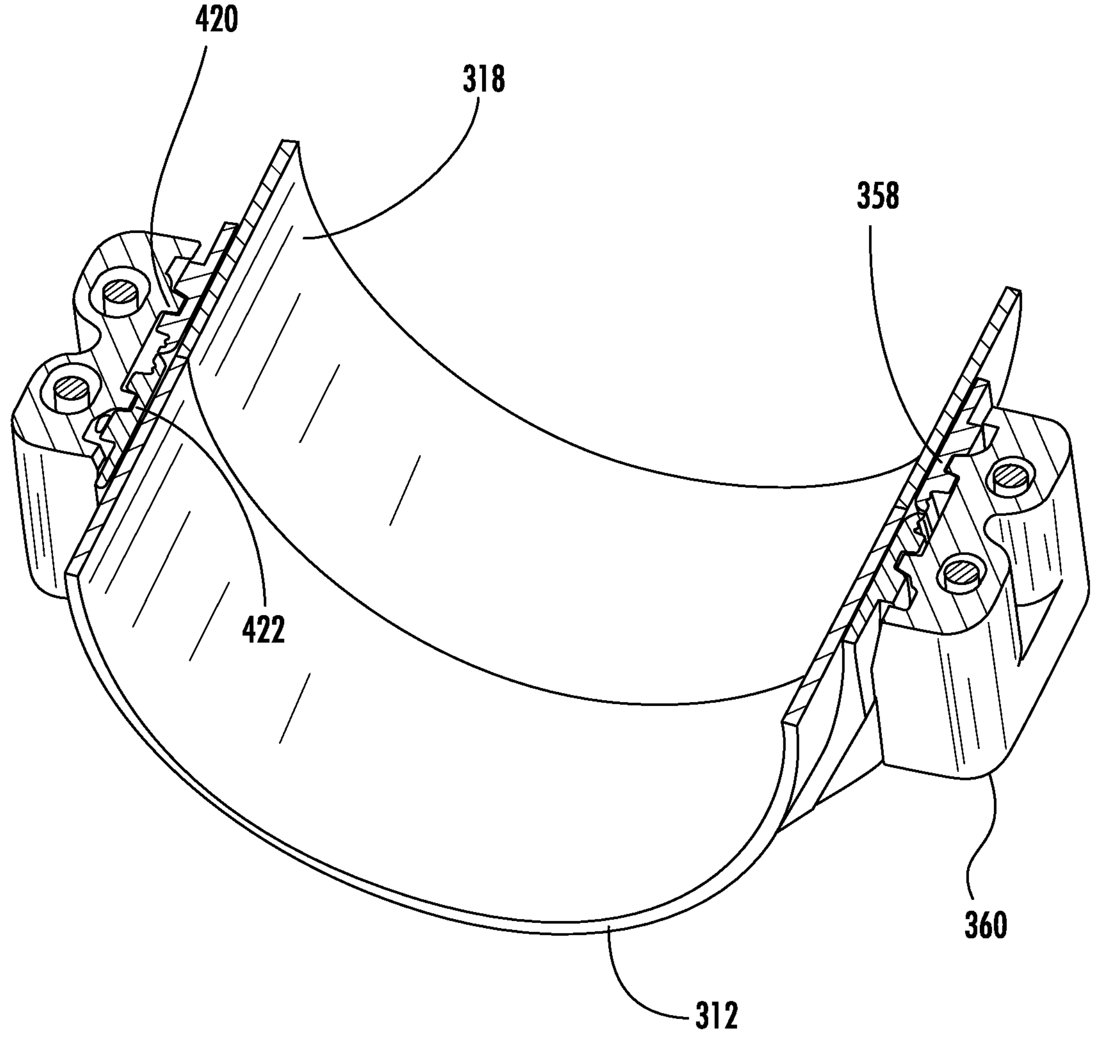
FIG. 34 is an isometric sectional view of a portion of the coupling shown in FIG. 31 connected to a pipe element.

As shown in FIGS. 31 and 32, to permit the first ring 318 to be conveniently coupled to a pipe element the first ring comprises a first outer groove 358 extending circumferentially therearound. The outer groove 358 is positioned outside of the bore 330 of housing 328 to receive mating keys from a mechanical coupling 360, joining the first ring 318, and thus the coupling 310, to a first pipe element 312 as shown in FIG. 34. Alternatively, the first ring 318 may include a flange to couple to a flanged pipe element or may be joined to the first pipe element 312 by other means known in the art.

As shown in FIG. 32 the example coupling 310 may further comprise a second ring 362 attachable to a second of the pipe elements. The second end 336 of the housing 328 is adapted to receive the second ring 362 coaxially within its bore 330 and is a mirror image of the first ring 318. The second ring 362 comprises the same elements as the first ring 318, namely, a second ring axis 364 arranged coaxially with the second ring 362; a second collar 366 extending circumferentially around the second ring and projecting outwardly therefrom, the second collar 366 defining a bearing surface 368 and a retaining surface 370 oppositely disposed from one another, the surfaces 368 and 370 being oriented transversely to the second ring axis 364 arranged coaxially with the second ring 362. Optionally, the surfaces 368 and 370 are oriented perpendicularly or substantially perpendicularly (e.g., within 10 degrees of perpendicular) to the second ring axis 364. Second ring 362 may also comprise a sacrificial wearing surface, such as liner 319, described above. Similarly, the housing 328 further comprises a second shoulder 372 positioned distal to the second end 336 of the housing, the second shoulder projecting toward the housing's longitudinal axis 332 and oriented transversely thereto (for example, spaced from the second end 336 in a direction moving toward the first end 334 of the housing 328). Optionally, the second shoulder 372 is oriented perpendicularly or substantially perpendicularly (e.g., within 10 degrees of perpendicular) to the housing's longitudinal axis 332. The second shoulder 372 may be positioned between the second end 336 and the middle point of the housing 328 between the first and second ends 334 and 336. A second channel 374 extends circumferentially around the housing 328 and faces the longitudinal axis 332, the second channel being positioned in spaced apart relation to the second shoulder 372 and proximate to the second end 336 of the housing 328 (for example, the second channel 374 may be positioned within 10-15% of the housing's length from the second end 336). Optionally, the second channel 374 may be positioned between the second shoulder 372 and the second end 336. A second retaining ring 376 is positionable within the second channel 374, the second retaining ring projecting into the bore 330 toward the longitudinal axis 332. As for the first ring 318, when the second ring 362 is received within the bore 330 at the second end 336 of the housing 328, the second collar 366 is positionable between the second shoulder 372 and the second channel 374, the second retaining ring 376 being thereafter positionable within the second channel 374, the bearing surface 368 of the second collar 366 being engageable with the second shoulder 372, the retaining surface 370 of the second collar 366 being engageable with the second retaining ring 376, the second ring 362 being thereby retained within the housing 328.

The example coupling 310 according to the invention may also comprise one or more additional seals 378 positioned between the housing 328 and the second ring 362. As shown in FIG. 32, seals 378 are positioned distal to the second end 336 of the housing 328 as well as between the housing and the second collar 366 (for example, spaced from the second end 336 in a direction moving toward the first end 334 of the housing 328). Optionally, the seals 378 may be positioned between the second shoulder 372 and the middle point of the housing 328 between the first and second ends 334 and 336. Seals 378 may comprise O-rings 380 received within circumferential grooves 382 positioned in one of the second ring 362 (including the second collar 366) or the housing 328 (shown).

To provide support and minimize friction between the second ring 362 and the housing 328, first and second bearings are positioned between the housing and the second ring. In this example the first bearing 384 is positioned distal to the second end 336 of the housing 328 and the second bearing 386 is positioned between the second collar 366 and the housing 328 (for example, spaced from the second end 336 in a direction moving toward the first end 334 of the housing 328). The first bearing 384 may be positioned between the second shoulder 372 and the middle point of the housing 328 between the first and second ends 334 and 336. The bearings 384 and 386 may respectively comprise first and second bearing rings 388 and 390 which extend circumferentially around the bore 330. Bearing rings 388 and 390 are advantageously formed of material having a lower coefficient of friction than either the second ring 362 or the housing 328. In a practical design the bearing rings 388 and 390 may be formed from or comprise polytetrafluoroethylene.

As with the first ring 318 the second ring 362 comprises an outer groove 392 extending circumferentially therearound. The outer groove 392 of the second ring 362 is positioned outside of the bore 330 of housing 328 to receive mating keys from a mechanical coupling similar to 360, joining the second ring 362, and thus the coupling 310, to the second pipe element 314 (see FIG. 33) analogous to the joint shown in FIG. 34. Alternatively, the second ring 362 may include a flange to join to a flanged pipe element or may be joined to the second pipe element 314 by other means known in the art.

Figure 35:
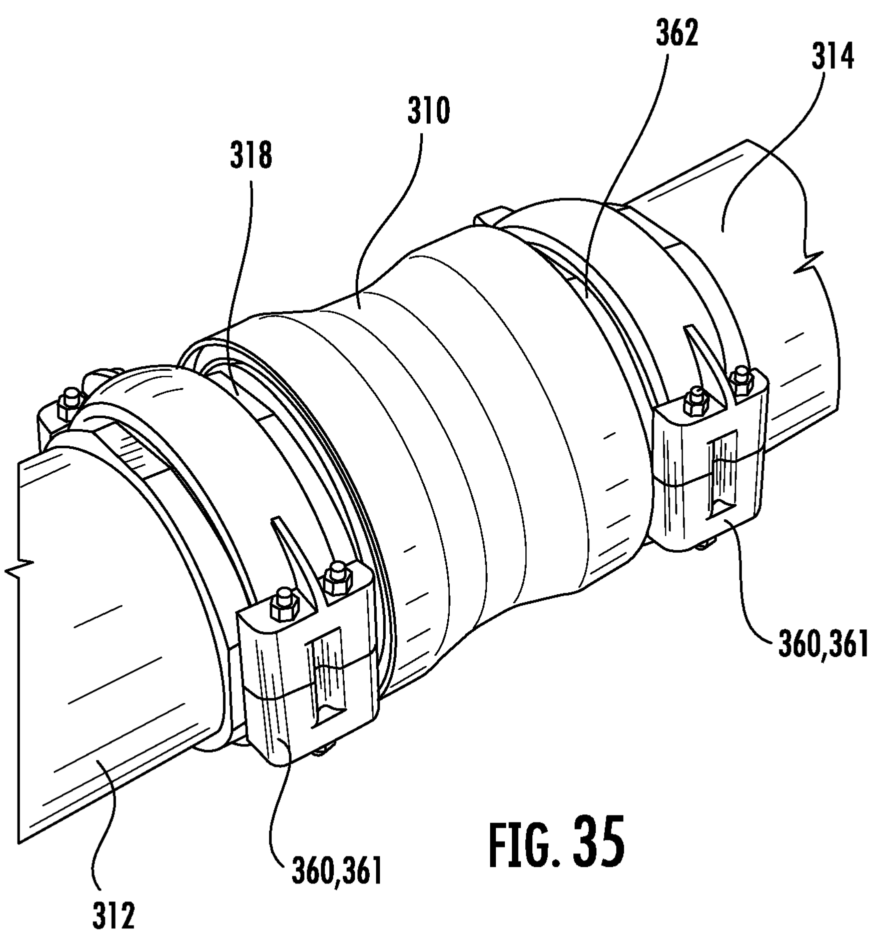
FIG. 35 shows an isometric view of an example coupling according to the invention connected to pipe elements.
Figure 36:
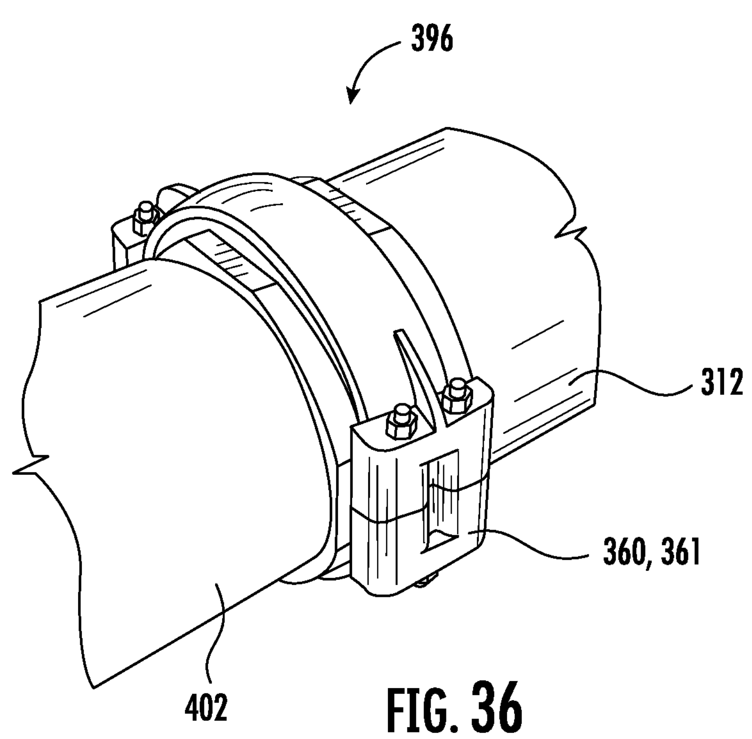
FIG. 36 shows an isometric view of an example first type of non-rotational coupling connecting two pipe elements.
Figure 35A:
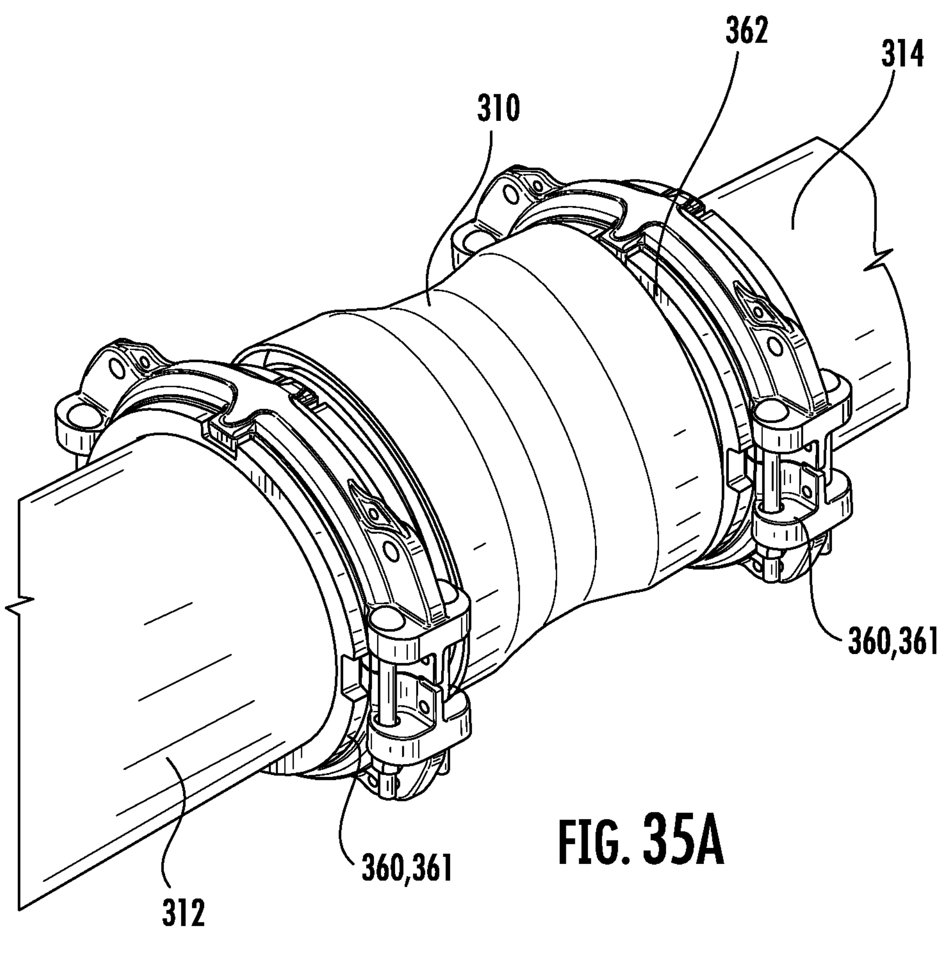
FIG. 35A shows an isometric view of an example coupling according to the invention connected to pipe elements.
Figure 36A:
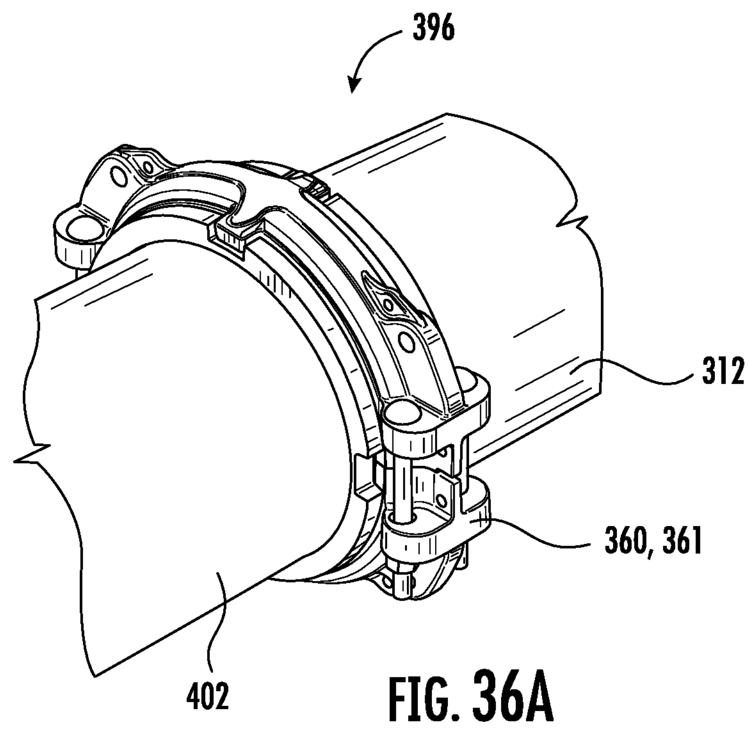
FIG. 36A shows an isometric view of an example second type of non-rotational coupling connecting two pipe elements.

FIG. 33 shows two example sections 396 and 398 of a pipe line 400. Sections 396 and 398 respectively comprise pipe elements 312, 402, 404, 406, 408 and 314, 410, 412, 414 and 416. Each pipe element may be as long as 50 feet, and are known as "double random" lengths of pipe. Couplings 310 allow sections 396 and 398 to be rotated about the longitudinal axes 316 of the pipe elements without disconnecting the sections 396 and 398 from the pipe line 400 or from one another. Couplings 310, which permit rotation about axis 316, are positioned at opposite ends of each section 396 and 398, a rotational joint using coupling 310 being shown in FIGS. 35 and 35A. Pipe elements 312 and 314 are respectively joined to the first and second rings 318 and 362 comprising coupling 310 using mechanical couplings 360 which prevent relative rotation between the pipe element 312 and the first ring 318, and between the pipe element 314 and the second ring 362. Connection between the pipe elements 312, 314 and the rings 318, 362 are effected as shown in FIG. 34 when keys 420 of the couplings 360 engage outer grooves 358 (shown) and 392 of the rings 318 (shown) and 362 (see also FIG. 31) and similar grooves 422 in the pipe elements 312 (shown) and 314. Non-rotational couplings 360 are also used to connect the pipe elements of sections 396 and 398 to one another between the couplings 310 as shown in FIGS. 33 and 36 for pipe elements 312 and 402. An example first type of non-rotational coupling 361 is shown in FIGS. 35 and 36. An example second type of non-rotational coupling 363 is shown in FIGS. 35A and 36A. Optionally, the non-rotational coupling 361 may be coupling 10 or 210 shown in FIGS. 1-30. Note that although the pipe elements 312 and 314 cannot rotate relatively to the first and second rings 318 and 362, the rings can rotate relatively to the housing 328. Thus, the five pipe elements comprising each section 396 and 398 are all fixed in rotation relatively to one another, but each section 396, 398 may rotate as one pipe between the couplings 310. Couplings 310 thus allow entire sections of the pipe line comprising a plurality of pipe elements to be rotated or "clocked" as one to ensure even wear of the inner surfaces of the pipe elements when abrasive media are being transported.

Figure 37:
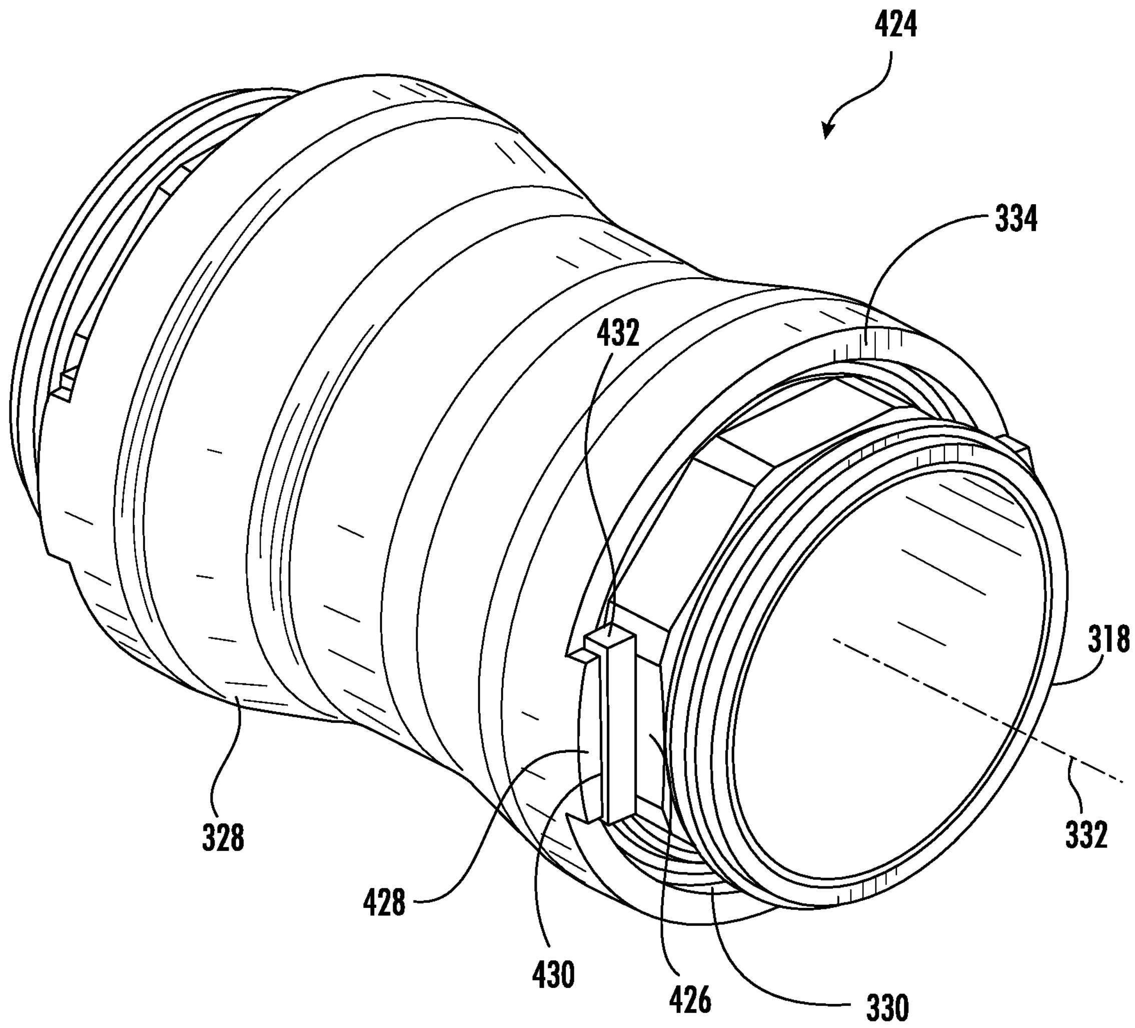
FIG. 37 is an isometric view of an example coupling according to the invention having a locking feature.

FIG. 37 shows another coupling embodiment 424 according to the invention. Coupling 424 differs from coupling 310 in that the first ring 318 also comprises a locking surface 426 positioned in spaced relation to the retaining surface 324 (see FIG. 32) and outside of the bore 330 of the housing 328. Locking surface 426 facing away from the bore axis 332. In a further difference, the housing 328 comprises a locking tab 428 projecting from the first end 334 of the housing. The locking tab 428 defines a jamming surface 430 in spaced relation to and facing the locking surface 426. A lock body 432 is insertable between the locking surface 426 and the jamming surface 430 such that the lock body 432 engages both the locking surface 426 and the jamming surface 430 when the lock body 432 is positioned therebetween so as to prevent relative rotation between the first ring 318 and the housing 328.

In the example embodiment shown the locking surface 426 comprises a flat surface extending through a chord of the first ring 318, and the jamming surface 430 also comprises a flat surface on the locking tab 428. In a practical example embodiment the lock body may comprise a bar having flat faces to engage the flat surfaces of the jamming surface 430 and the locking surface 426.

Figure 38:
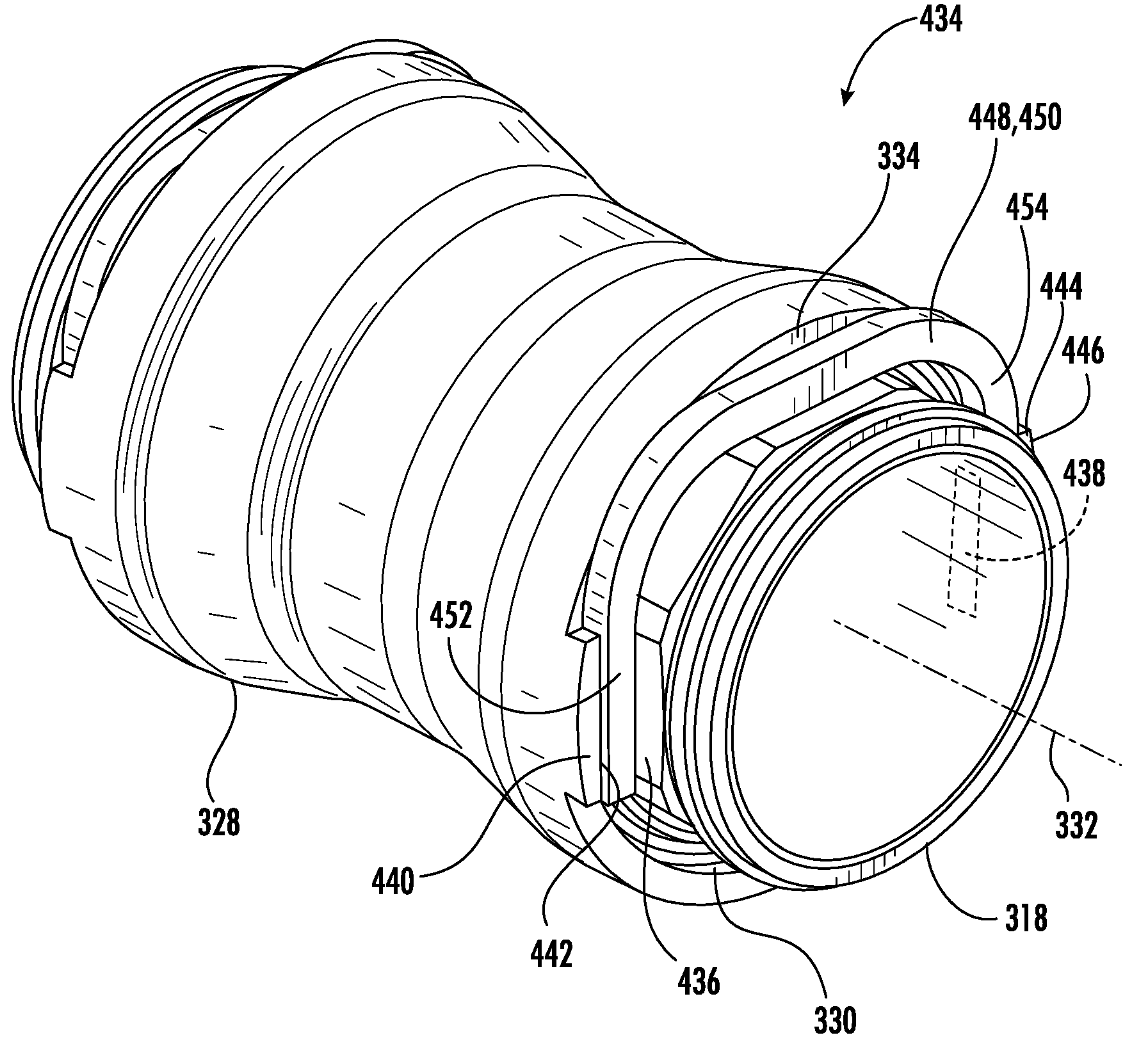
FIG. 38 is an isometric view of an example coupling according to the invention having a locking feature.

FIG. 38 shows another coupling embodiment 434 wherein the first ring 318 comprises a first locking surface 436 positioned in spaced relation to the retaining surface 324 (see FIG. 32) and outside of the bore 330. The first locking surface 436 faces away from the bore axis 332. A second locking surface 438 is positioned in spaced relation to the retaining surface 324 and outside of the bore 330, the second locking surface also facing away from the bore axis 332. Similarly, the housing 328 comprises a first locking tab 440 projecting from the first end 334 thereof. The first locking tab 440 defines a first jamming surface 442 in spaced relation to and facing the first locking surface 436. A second locking tab 444 projects from the first end 334 of housing 328, the second locking tab defining a second jamming surface 446 in spaced relation to and facing the second locking surface 438. A lock body 448 is insertable between the first locking surface 436 and the first jamming surface 442, and the second locking surface 438 and the second jamming surface 446 such that the lock body 448 engages the first and second locking surfaces 436, 438 and the first and second jamming surfaces 442, 446 when the lock body 448 is positioned therebetween so as to prevent relative rotation between the first ring 318 and the housing 328.

In example coupling embodiment 434 the locking surfaces 436, 438 comprise respective flat surfaces extending through respective chords of the first ring 318 and the jamming surfaces 442, 446 comprise respective flat surfaces on the first and second locking tabs 440 and 444. In this example the locking tabs 440 and 444 are positioned opposite one another on housing 328. This configuration allows the lock body 448 to comprise a fork 450 having a first tine 452 positionable between the first locking surface 436 and the first jamming surface 442 and a second tine 454 positionable between the second locking surface 438 and the second jamming surface 446.

Figure 38A:
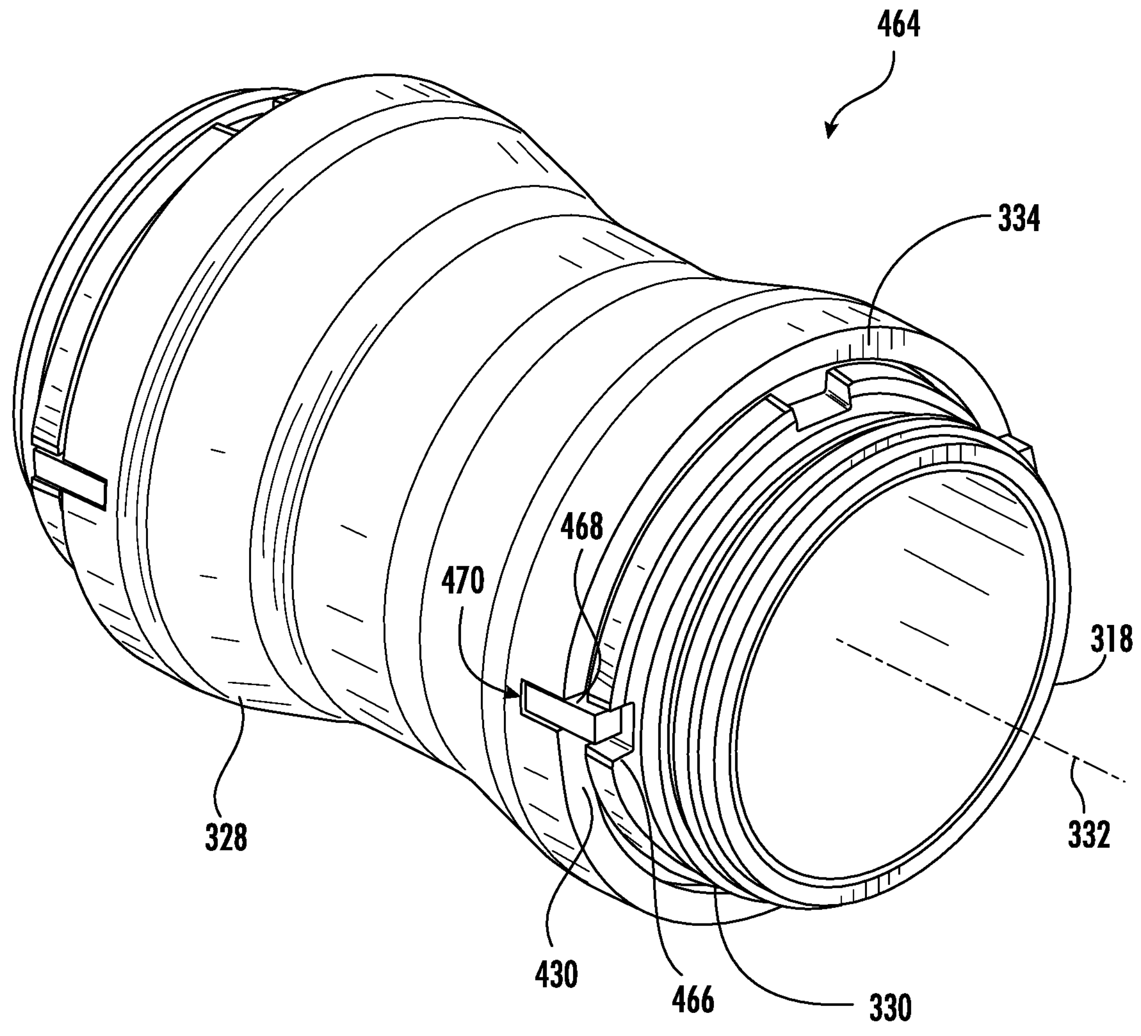
FIG. 38A is an isometric view of an example coupling according to the invention having a locking feature.

FIG. 38A shows another coupling embodiment 464 according to the invention. Coupling 464 differs from coupling 310 in that the first ring 318 also comprises at least one notch 466 positioned in spaced relation to the retaining surface 324 (see FIG. 32) and outside of the bore 330 of the housing 328. The notches 466 face away from the bore axis 332. A lock body 468 is insertable in a slot 470 in the housing 328 and engages with a notch 466 such that the lock body 468 engages both the housing 328 and the notch 466 so as to prevent relative rotation between the first ring 318 and the housing 328.

For all coupling embodiments 424, 434, 464, the housings and rings are substantially similar to the housing and rings of embodiment 310, with exceptions as described above. Although the description is drawn to the first ends of the housings for example embodiments 424, 434, and 464, it is understood (and shown in FIGS. 37, 38, and 38A) that the opposite ends of the housings may also have the locking features as described herein. Furthermore, coupling embodiments 424, 434, and 464 may have a plurality of locking surfaces to permit the rings 318 to be repeatedly clocked about axis 332 to more evenly distribute wear about the inside surfaces of the rings and the pipe elements connected thereto.

Methods of Rotating a Pipeline Section

Figure 39:
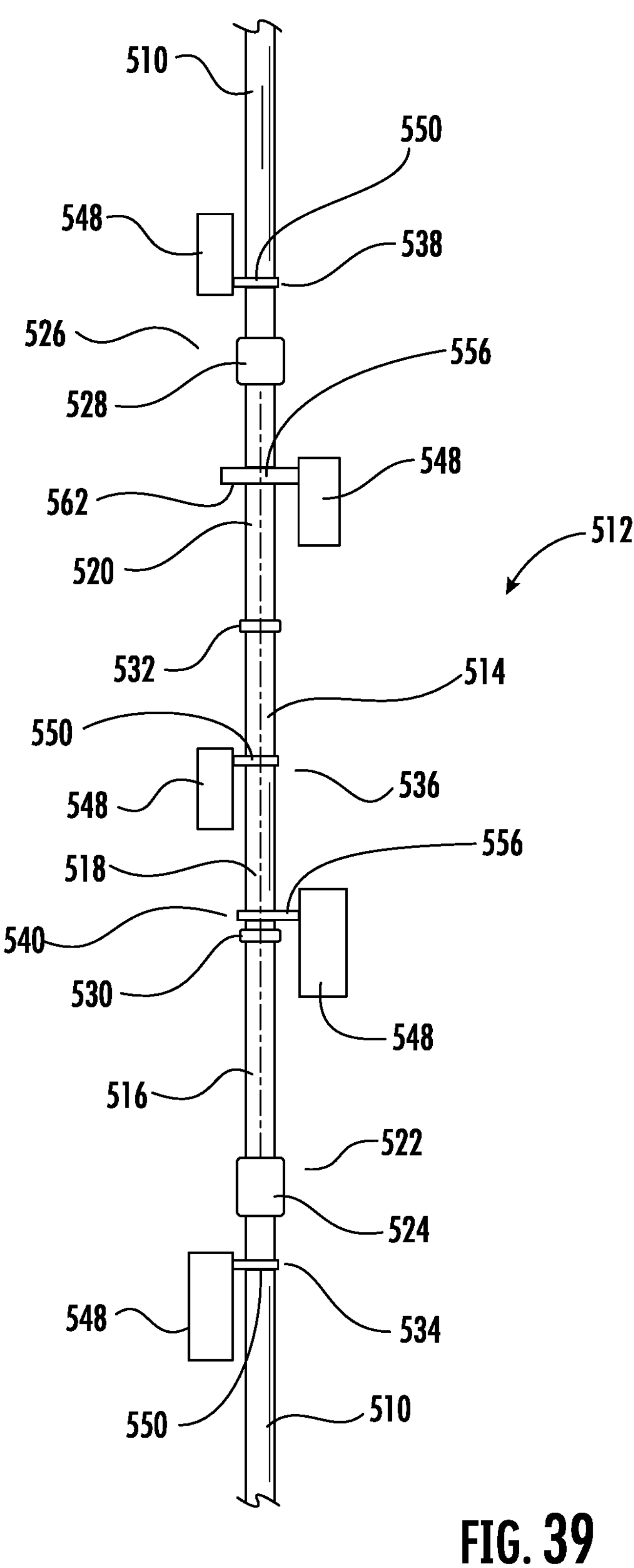
FIG. 39 is a plan schematic view of a pipe line having a section to be rotated according to an example method of the invention.

Further disclosed herein are methods of rotating a section of a pipeline. FIG. 39 shows a portion of an example pipe line 510 comprising a plurality of sections, an example section 512 being shown in detail. The methods disclosed herein allow rotation of each section, for example section 512, without the ends of each section being disconnected from adjacent sections. Section 512 has a longitudinal axis 514 arranged coaxially with a bore of the section. Section 512 comprises a plurality of pipe elements, in this example, three pipe elements, 516, 518 and 520 respectively, joined to one another end to end. Three elements comprising section 512 are shown by way of example only, as there could be more or fewer pipe elements comprising a section. In a practical example, each pipe element may be as long as 50 feet, and such elements are known as "double random" lengths of pipe.

Section 512 has a first end 522 connected to the pipeline 510 by a first coupling 524. First coupling 524 permits rotation of the section 512 relatively to the pipeline 510 about the longitudinal axis 514. Section 512 has a second end 526 connected to the pipeline 510 by a second coupling 528 which also permits rotation of the section 512 about longitudinal axis 514 relatively to the pipeline 510. In this example embodiment, the first and second couplings are known as "rotation permitting couplings" (hereafter "rotational couplings"). The rotational couplings 524 and 528 are identical to one another in this example and define the extent of the section 512. Optionally, rotation permitting couplings 524 and 528 may be rotational permitting couplings 310, 424, 434, or 464 disclosed herein and shown in FIGS. 31-38A.

In example section 512 the pipe elements 516, 518 and 520 are connected to one another using "torsion resistant couplings", two of which are shown in FIG. 39, numbered 530 and 532. Optionally, torsion resistant couplings 530 and 532 may be torsion resistant couplings 10 or 210 disclosed herein and shown in FIGS. 1-30. Torsion resistant couplings 530 and 532 (described further herein) prevent relative rotation about longitudinal axis 514 between the pipe elements which they connect. In this example, relative rotation between pipe elements 516, 518 and 520 about axis 514 is prevented. It is considered advantageous to prevent relative rotation between pipe elements comprising a section when mechanical couplings having keys are used to connect pipe elements having circumferential grooves engaged by the keys. Grooved pipe elements connected by mechanical couplings rely largely on friction between the coupling and the pipe element to prevent relative rotation, and such mechanical joints may not generate sufficient friction to prevent relative rotation of one pipe element relative to another in all circumstances. Thus, when a torque is applied to one pipe element to rotate section 512, unless torsion resistant couplings are used to connect all pipe elements 516, 518 and 520 comprising the section 512, it cannot be guaranteed that all of the pipe elements will rotate, or rotate the same amount as the pipe element to which the torque is applied.

Figure 40:
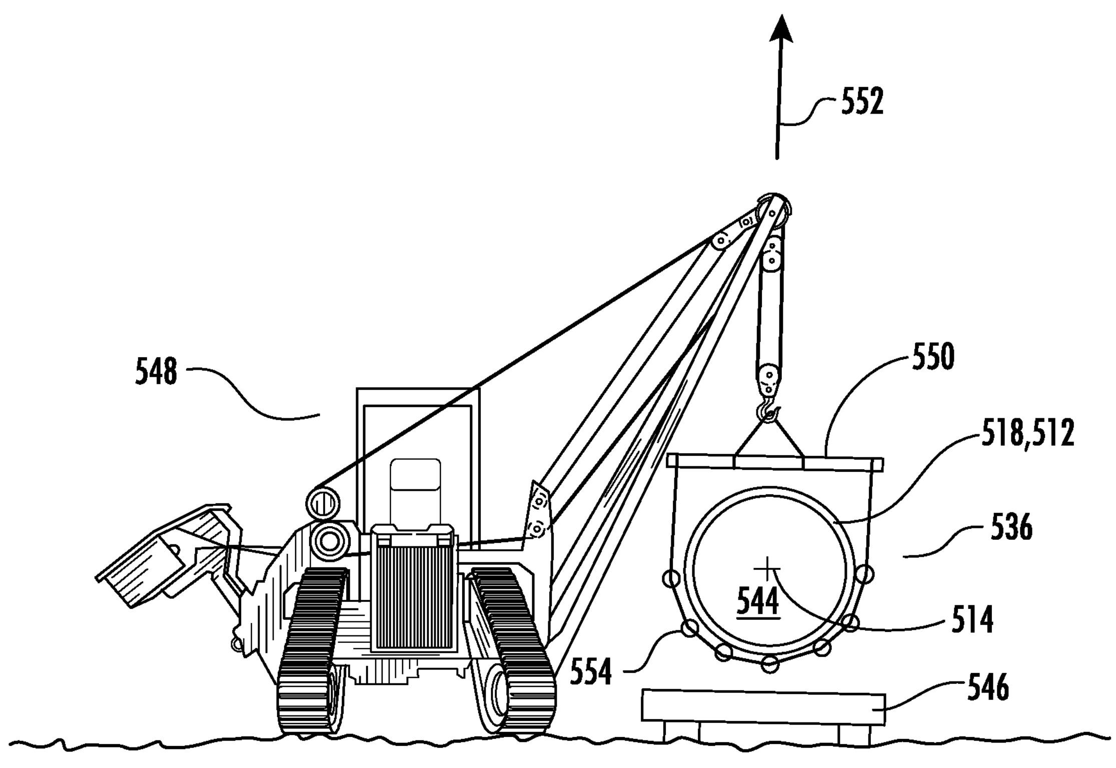
FIG. 40 is an axial view of a point on the pipeline wherein a section is supported by a sideboom.

FIGS. 39-42A illustrate an example method of rotating a section 512 of the pipeline 510, the example method comprising:

supporting the section 512 at a plurality of points 534, 536, 538 (FIGS. 39 and 40);

applying a first torque to the section 512 about the longitudinal axis 514 (FIGS. 39 and 41) at least one point 540 between the first and the second ends 522 and 526 of the section 512, thereby rotating the section 512 through a first angular displacement 542 about the longitudinal axis 514 arranged coaxially with the bore 544 of the section 512.

In practice the, method may be performed while the first and/or second ends 522, 526 of the section 512 are connected to adjacent pipeline 510 via the rotation couplings.

In practice, the number and position of the support points of a section 512 will of course depend on the length of the section along with other factors such as pipe diameter and the topography, and may require more than those shown in the figures. Regardless, the support points may be located between the ends 522 and 526 (e.g., point 536) as well as proximate to the first and second ends of the section (points 534 and 538), either between the ends 522 and 526, or outside of the ends on the pipeline 510 itself as shown in FIG. 39. Optionally, support points proximate to the first and second ends of the section may be positioned between the ends on the pipeline 510 and within 30 feet from the ends on the pipeline 510.

As illustrated in FIG. 40, the supporting step may comprise lifting the section 512, for example, off of a plurality of supporting footings 546. Lifting is an optional operation in the supporting step and may or may not be required depending upon the size of the pipe elements comprising the section, the terrain upon which the section sits and the manner in which it is supported in situ. Specialized tracked vehicles, known as "sidebooms" 548, are commonly used to support, lift (when necessary), and apply torque to the section 512, although it is feasible to use cranes or other lifting apparatus known in the art. As shown in FIGS. 39 and 40, lifting and supporting the section 512 comprises using a plurality of sidebooms 548 to pull on a plurality of lifting slings 550. Each lifting sling 550 is positioned at a respective one of the plurality of lift/support points 534, 536 and 538. To lift and support the section 512, each lifting sling 550 has a line of action 552 (see FIG. 40) aligned or substantially aligned with (e.g., within 10 degrees of being in alignment with) the longitudinal axis 514. To minimize friction between the section 512 and the lifting slings 550, the lifting slings may have rollers 554 aligned to support the section 512 while permitting rotation about the longitudinal axis 514.

Figure 41:
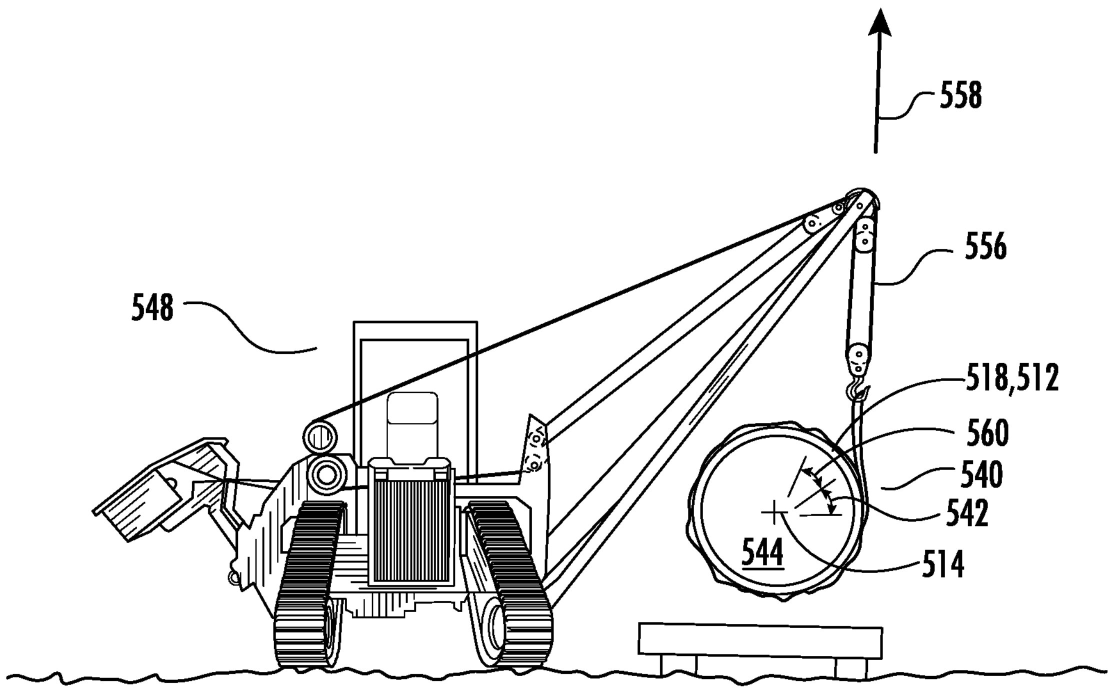
FIG. 41 is an axial view of a point on the pipeline wherein torque is applied to a section by a sideboom using a sling.

As shown in FIGS. 39 and 41, torque is applied to the section 512 at point 540 using a sideboom 548 pulling a cinching sling 556 surrounding the section 512. Cinching sling 556 is designed to contract around and grip the pipe element (in this example, pipe element 518). The cinching sling 556 also has a line of action 558 which is offset from the longitudinal axis 514 in a direction transverse thereto. Thus when tension is applied to cinching sling 556 it grips the pipe element 518 and, by virtue of the offset line of action 558, applies a torque about the longitudinal axis 514, causing the pipe element 518, and those attached thereto (pipe element 516 and 520) to rotate through the angular displacement 542. Rotation of the section 512 relative to the pipeline 510 is permitted by the use of the rotational couplings 524 and 528 at opposite ends of the section, and rotation of all of the pipe elements comprising the section 512 is ensured by the use of torsion resistant couplings 530 and 532 connecting pipe element 518 with pipe elements 516 and 520. Rollers 554 on support slings 550 (see FIG. 40)

permit the section 512 to rotate with minimum friction while supported by the sidebooms 548 at support points 534, 536 and 538 (see FIG. 39).

One purpose of rotating section 512 is to extend the useful life of the section by ensuring that all interior surfaces of the pipe elements comprising the section experience roughly the same degree of wear. Pipe elements carrying abrasive slurries, for example, wear unevenly, most of the wear occurring over a lowermost sector of the interior surface where the abrasive particles of the slurry are concentrated and contact the pipe elements' interior surface, causing the most wear over the lowermost sector. Rotating (or "clocking") the section moves a new, unabraded sector of the pipe element interior into the lowermost position so that it experiences the abrasion and wear. Various factors, such as the nature of the slurry and the pipe diameter, will determine the degree of angular displacement necessary to remove the worn sector from the lowermost position and replace it with the unabraded sector. However, it may not be possible for the cinching sling 556 to rotate the section 512 through the entire required angular displacement in one pull. Thus the example method according to the invention provides for applying a second torque at the at least one point 540 between the first and second ends 522 and 526 of the section 512, thereby rotating the section through a second angular displacement 560 about the longitudinal axis 514. This step may be repeated until the desired angular displacement is achieved. The first, second and subsequent angular displacements may be equal to one another or different from one another as required to achieve the desired displacement.

As shown in FIG. 39, for long, heavy sections 512 it may be necessary to use a plurality of side booms 548 applying torque at a plurality of points (540, 562) between the first and second ends of the section 512 to effect rotation of the section through the various angular displacements 542, 560 about the longitudinal axis 514. Multiple applications of torque may be necessary to achieve the desired angular displacement, thus this step may be repeated in the method.

Figure 42:
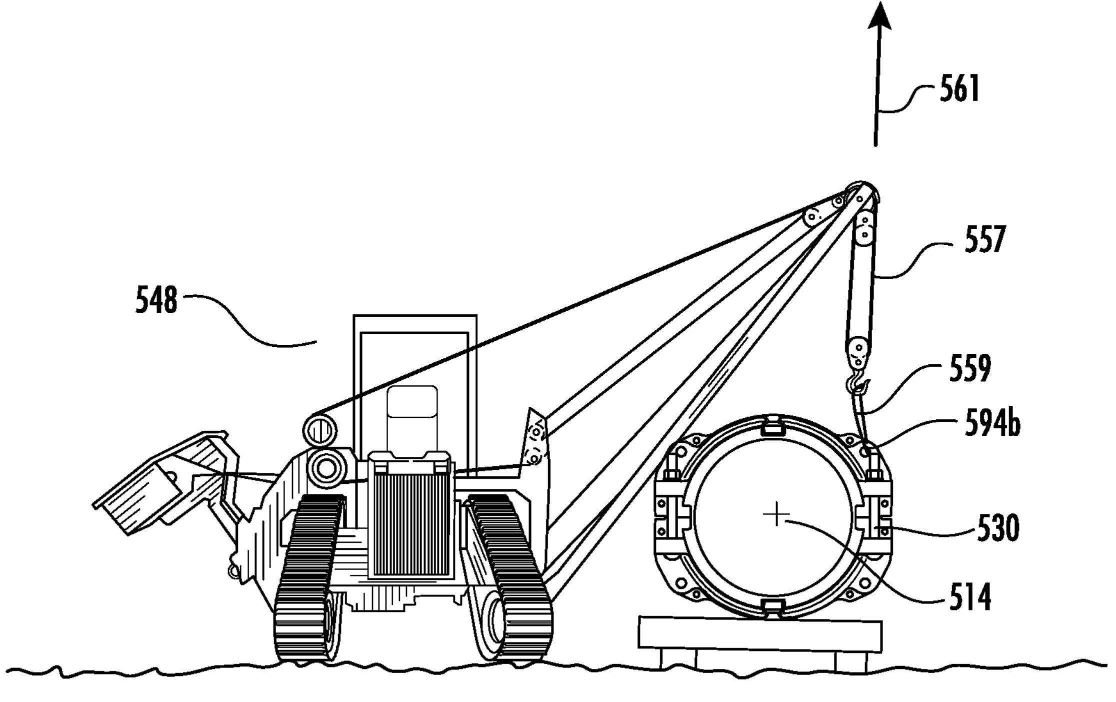
FIG. 42 is an axial view of a point on the pipeline wherein torque is applied to a section by a sideboom using a sling connected to a torsion resistant coupling.

As shown in FIG. 42, the method according to the invention also contemplates connecting a sling 557 to the section 512 at the at least one point 540 instead of the offset, cinching sling 556. Alternatively, the section 512 may be connected to the sling 557 at the at least one point 540 and the offset, cinching sling 556 may be connected to the section 512 at other points. As shown in FIG. 42, the sling 557 may be connected to a torsion resistant coupling 530, 532 (torsion resistant coupling 530 shown). The sling 557 may be connected to the torsion resistant coupling 530 via a shackle 559 connected to a rotation opening 594*b* of the torsion resistant coupling 530 wherein the torsion resistant coupling 530 may comprise the components and embodiments described for coupling 10 herein. The sling 557 connected to the rotation opening 594*b* has a line of action 561 which is offset from the longitudinal axis 514 in a direction transverse thereto. When tension is applied to the sling 557, by virtue of the offset line of action 561, the sling 557 applies a torque about the longitudinal axis 514, causing the torsion resistant coupling 530, and therefore, the connected pipe elements 516, 518, 520 to rotate.

Figure 42A:
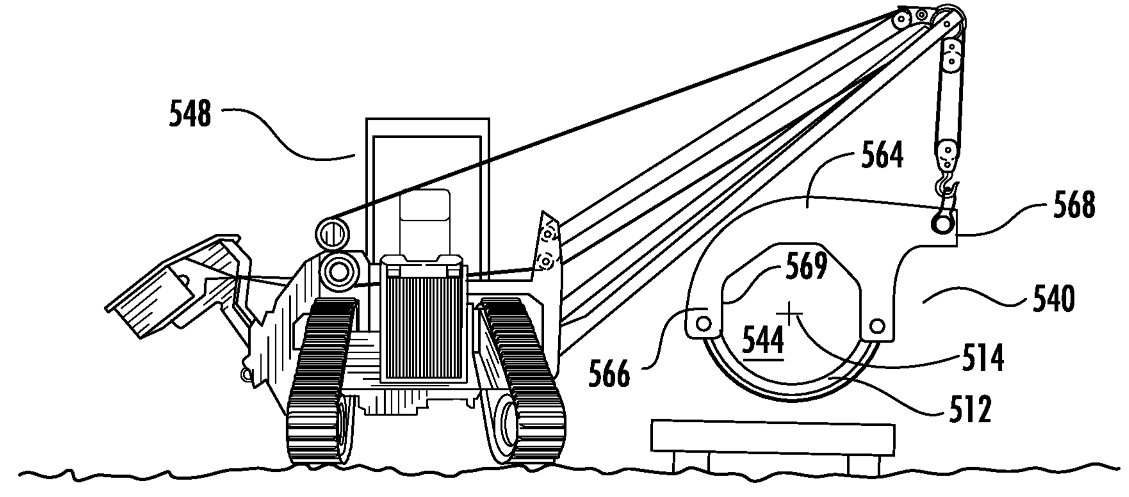
FIG. 42A is an axial view of a point on the pipeline wherein torque is applied to a section by a sideboom using a wrench.

As shown in FIG. 42A, the method according to the invention contemplates fitting a wrench 564 to the section 512 at the at least one point 540 instead of the offset, cinching sling. Wrench 564 has a jaw 566 which receives the section 512 and an arm 568 extending from the jaw 566 in a direction transverse to the longitudinal axis 514 of the section 512. Thus, applying a force to the arm 568 at a point distal to the section 512 applies a torque to the section about the axis 514 (for example, spaced outwardly away from the outer circumference of the pipeline of the section 512). Optionally, the force may be applied to the arm 568 at a position spaced outwardly away from the outer circumference of the pipeline. It may be advantageous to provide flat surfaces 569 on the section 512, for example, flat surfaces that may be associated with torsion resistant couplings 530 and 532, to permit positive mechanical engagement between the jaw 566 of wrench 564 and the section 512 and ensure rotation of the section when force is applied to arm 568 by the sideboom 548. Alternatively, it may be advantageous to provide notches on the section 512, for example notches associated with the torsion resistant couplings 530 and 532 and provide pins on the jaw 566 of the wrench 564 extending parallel to axis 514 to permit positive mechanical engagement between the jaw 566 of wrench 564 and the section 512 via engagement between the pins of the wrench 564 and the notches on the section 512 to ensure rotation of the section when force is applied to arm 568 by the sideboom 548.

It is expected that using the example method according to the invention to rotate sections of a pipeline can provide an efficient and safe way to extend the life of the pipe line, which does not require the pipe line to be shut down and the section disconnected to effect rotation.

All of the embodiments of the claimed invention described herein are provided expressly by way of example only. Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A coupling permitting rotation of pipe elements about their longitudinal axes, said coupling comprising:

a first ring attachable to a first of said pipe elements, said first ring comprising a first collar extending circumferentially around said first ring and projecting outwardly therefrom, said first collar defining a bearing surface and a retaining surface oppositely disposed from one another, said surfaces being oriented transversely to a first ring axis arranged coaxially with said first ring;

a housing defining a bore therethrough surrounding a longitudinal axis arranged coaxially with said bore, said housing having a first end and a second end oppositely disposed from one another, said first end adapted to receive said first ring coaxially within said bore, said housing comprising:

a first shoulder positioned distal to said first end thereof, said first shoulder projecting toward said longitudinal axis and oriented transversely thereto;

a first channel extending circumferentially around said housing and facing said longitudinal axis, said first channel positioned in spaced apart relation to said first shoulder and proximate to said first end of said housing;

a first retaining ring positionable within said first channel, said first retaining ring projecting into said bore toward said longitudinal axis; and at least one bearing positioned between said housing and said first ring, wherein a first bearing of said at least one bearing is positioned radially between said housing and said first collar of said first ring, and wherein when said first ring is received within said bore at said first end, said first collar is positionable between said first shoulder and said first channel, said first retaining ring is thereafter positionable within said first channel, said bearing surface is engageable with said first shoulder, and said retaining surface being engageable with said first retaining ring, thereby retaining said first ring within said housing.

2. The coupling according to claim 1, further comprising a seal positioned between said housing and said first ring.

3. The coupling according to claim 2, wherein said seal is positioned distal to said first end of said housing.

4. The coupling according to claim 2, wherein said seal comprises an O-ring received within a circumferential groove positioned in one of said first ring or said housing.

5. The coupling according to claim 2, wherein said seal is positioned between said housing and said first collar.

6. The coupling according to claim 5, wherein said seal comprises an O-ring received within a circumferential groove in one of said first collar or said housing.

7. The coupling according to claim 1, wherein a second bearing of said at least one bearing is positioned distal to said first end of said housing.

8. The coupling according to claim 7, wherein said second bearing comprises a second bearing ring extending circumferentially around said bore, said second bearing ring being formed of material having a lower coefficient of friction than either said first ring or said housing.

9. The coupling according to claim 8, wherein said second bearing ring comprises polytetrafluoroethylene.

10. The coupling according to claim 1, wherein said first bearing comprises a first bearing ring extending circumferentially around said first collar, said first bearing ring being formed of material having a lower coefficient of friction than either said first ring or said housing.

11. The coupling according to claim 10, wherein said first bearing ring comprises polytetrafluoroethylene.

12. The coupling according to claim 1, wherein said first ring comprises a first outer groove extending circumferentially therearound, said outer groove being positioned outside of said bore.

13. The coupling according to claim 1, further comprising:

a second ring attachable to a second of said pipe elements, said second ring comprising a second collar extending circumferentially around said second ring and projecting outwardly therefrom, said second collar defining a bearing surface and a retaining surface oppositely disposed from one another, said surfaces of said second ring being oriented transversely to a second ring axis arranged coaxially with said second ring;

wherein said second end of said housing is adapted to receive said second ring coaxially within said bore, said housing further comprising:

a second shoulder positioned distal to said second end thereof, said second shoulder projecting toward said longitudinal axis and oriented transversely thereto;

a second channel extending circumferentially around said housing and facing said longitudinal axis, said second channel positioned in spaced apart relation to said second shoulder and proximate to said second end of said housing;

a second retaining ring positionable within said second channel, said second retaining ring projecting into said bore toward said longitudinal axis; wherein when said second ring is received within said bore at said second end of said housing, said second collar is positionable between said second shoulder and said second channel, said second retaining ring is thereafter positionable within said second channel, said bearing surface of said second collar is engageable with said second shoulder, and said retaining surface of said second collar is engageable with said second retaining ring, thereby retaining said second ring within said housing.

14. The coupling according to claim 13, further comprising a seal positioned between said housing and said second ring.

15. The coupling according to claim 14, wherein said seal is positioned distal to said first end of said housing.

16. The coupling according to claim 14, wherein said seal comprises an O-ring received within a circumferential groove positioned in one of said second ring or said housing.

17. The coupling according to claim 14, wherein said seal is positioned between said housing and said second collar.

18. The coupling according to claim 17, wherein said seal comprises an O-ring received within a circumferential groove in one of said second collar or said housing.

19. A coupling permitting rotation of pipe elements about their longitudinal axes, said coupling comprising:

a first ring attachable to a first of said pipe elements, said first ring comprising a first collar extending circumferentially around said first ring and projecting outwardly therefrom, said first collar defining a bearing surface and a retaining surface oppositely disposed from one another, said surfaces being oriented transversely to a first ring axis arranged coaxially with said first ring;

a housing defining a bore therethrough surrounding a longitudinal axis arranged coaxially with said bore, said housing having a first end and a second end oppositely disposed from one another, said first end adapted to receive said first ring coaxially within said bore, said housing comprising:

a first shoulder positioned distal to said first end thereof, said first shoulder projecting toward said longitudinal axis and oriented transversely thereto;

a first channel extending circumferentially around said housing and facing said longitudinal axis, said first channel positioned in spaced apart relation to said first shoulder and proximate to said first end of said housing;

a first retaining ring positionable within said first channel, said first retaining ring projecting into said bore toward said longitudinal axis, wherein when said first ring is received within said bore at said first end, said first collar is positionable between said first shoulder and said first channel, said first retaining ring is thereafter positionable within said first channel, said bearing surface is engageable with said first shoulder, and said retaining surface being engageable with said first retaining ring, thereby retaining said first ring within said housing;

a second ring attachable to a second of said pipe elements, said second ring comprising a second collar extending circumferentially around said second ring and projecting outwardly therefrom, said second collar defining a bearing surface and a retaining surface oppositely disposed from one another, said surfaces of said second ring being oriented transversely to a second ring axis arranged coaxially with said second ring;

wherein said second end of said housing is adapted to receive said second ring coaxially within said bore, said housing further comprising:

at least one bearing positioned between said housing and said second ring;

a second shoulder positioned distal to said second end thereof, said second shoulder projecting toward said longitudinal axis and oriented transversely thereto;

a second channel extending circumferentially around said housing and facing said longitudinal axis, said second channel positioned in spaced apart relation to said second shoulder and proximate to said second end of said housing;

a second retaining ring positionable within said second channel, said second retaining ring projecting into said bore toward said longitudinal axis; wherein when said second ring is received within said bore at said second end of said housing, said second collar is positionable between said second shoulder and said second channel, said second retaining ring is thereafter positionable within said second channel, said bearing surface of said second collar is engageable with said second shoulder, and said retaining surface of said second collar is engageable with said second retaining ring, thereby retaining said second ring within said housing.

20. The coupling according to claim 19, wherein a first bearing of said at least one bearing is positioned distal to said second end of said housing.

21. The coupling according to claim 19, wherein said first bearing comprises a first bearing ring extending circumferentially around said bore, said first bearing ring being formed of material having a lower coefficient of friction than either said second ring or said housing.

22. The coupling according to claim 21, wherein said first bearing ring comprises polytetrafluoroethylene.

23. The coupling according to claim 19, wherein a second bearing of said at least one bearing is positioned between said second collar and said housing.

24. The coupling according to claim 23, wherein said second bearing comprises a second bearing ring extending circumferentially around said second collar, said second bearing ring being formed of material having a lower coefficient of friction than either said second ring or said housing.

25. The coupling according to claim 24, wherein said second bearing ring comprises polytetrafluoroethylene.

26. The coupling according to claim 13, wherein said first ring comprises an outer groove extending circumferentially therearound, said outer groove being positioned outside of said bore.

27. In combination, a coupling permitting rotation of pipe elements about their longitudinal axes and a lock body, said coupling comprising:

a first ring attachable to a first of said pipe elements, said first ring comprising a first collar extending circumferentially around said first ring and projecting outwardly therefrom, said first collar defining a bearing surface and a retaining surface oppositely disposed from one another, said surfaces being oriented transversely to a first ring axis arranged coaxially with said first ring;

a housing defining a bore therethrough surrounding a longitudinal axis arranged coaxially with said bore, said housing having a first end and a second end oppositely disposed from one another, said first end adapted to receive said first ring coaxially within said bore, said housing comprising:

a first shoulder positioned distal to said first end thereof, said first shoulder projecting toward said longitudinal axis and oriented transversely thereto;

a first channel extending circumferentially around said housing and facing said longitudinal axis, said first channel positioned in spaced apart relation to said first shoulder and proximate to said first end of said housing;

a first retaining ring positionable within said first channel, said first retaining ring projecting into said bore toward said longitudinal axis; wherein when said first ring is received within said bore at said first end, said first collar is positionable between said first shoulder and said first channel, said first retaining ring is thereafter positionable within said first channel, said bearing surface is engageable with said first shoulder, and said retaining surface being engageable with said first retaining ring, thereby retaining said first ring within said housing;

a locking surface positioned in spaced relation to said retaining surface and outside of said bore, said locking surface facing away from said longitudinal axis; and wherein said housing comprises a locking tab projecting from said first end thereof, said locking tab defining a jamming surface in spaced relation to and facing said locking surface; wherein said lock body is insertable between said locking surface and said jamming surface; wherein said lock body is engageable with said locking surface and said jamming surface when said lock body is positioned therebetween so as to prevent relative rotation between said first ring and said housing.

28. The coupling according to claim 27, wherein said locking surface comprises a flat surface extending through a chord of said first ring.

29. The coupling according to claim 28 wherein said jamming surface comprises a flat surface on said locking tab.

30. The coupling according to claim 27, wherein said lock body comprises a bar.

31. In combination, a coupling permitting rotation of pipe elements about their longitudinal axes according to claim 1 and a lock body, said coupling further comprising:

a first locking surface positioned in spaced relation to said retaining surface and outside of said bore, said first locking surface facing away from said longitudinal axis;

a second locking surface positioned in spaced relation to said retaining surface and outside of said bore, said second locking surface facing away from said longitudinal axis; and wherein said housing comprises:

a first locking tab projecting from said first end thereof, said first locking tab defining a first jamming surface in spaced relation to and facing said first locking surface;

a second locking tab projecting from said first end thereof, said second locking tab defining a second jamming surface in spaced relation to and facing said second locking surface; wherein said lock body is insertable between said first locking surface and said first jamming surface and said second locking surface and said second jamming surface; wherein said lock body is engageable with said first and second locking surfaces and said first and second jamming surfaces when said lock body is positioned therebetween so as to prevent relative rotation between said first ring and said housing.

32. The coupling according to claim 31, wherein said locking surfaces comprise respective flat surfaces extending through respective chords of said first ring.

33. The coupling according to claim 32 wherein said jamming surfaces comprises respective flat surfaces on said first and second locking tabs.

34. The coupling according to claim 27, wherein said lock body comprises a fork having a first tine positionable between said first locking surface and said first jamming surface and a second tine positionable between said second locking surface and said second jamming surface.

35. In combination, a coupling permitting rotation of pipe elements about their longitudinal axes and a lock body, said coupling comprising:

a first ring attachable to a first of said pipe elements, said first ring comprising a first collar extending circumferentially around said first ring and projecting outwardly therefrom, said first collar defining a bearing surface and a retaining surface oppositely disposed from one another, said surfaces being oriented transversely to a first ring axis arranged coaxially with said first ring;

a housing defining a bore therethrough surrounding a longitudinal axis arranged coaxially with said bore, said housing having a first end and a second end oppositely disposed from one another, said first end adapted to receive said first ring coaxially within said bore, said housing comprising:

a first shoulder positioned distal to said first end thereof, said first shoulder projecting toward said longitudinal axis and oriented transversely thereto;

a first channel extending circumferentially around said housing and facing said longitudinal axis, said first channel positioned in spaced apart relation to said first shoulder and proximate to said first end of said housing;

a first retaining ring positionable within said first channel, said first retaining ring projecting into said bore toward said longitudinal axis; wherein when said first ring is received within said bore at said first end, said first collar is positionable between said first shoulder and said first channel, said first retaining ring is thereafter positionable within said first channel, said bearing surface is engageable with said first shoulder, and said retaining surface being engageable with said first retaining ring, thereby retaining said first ring within said housing; wherein said first ring further comprises a notch positioned in spaced relation to said retaining surface and outside of said bore, said notch facing away from said longitudinal axis; and wherein said housing comprises a slot extending into said housing from said first end thereof; wherein said lock body is insertable into said notch of said first ring and said slot of said housing; wherein said lock body is engageable with said notch and said slot so as to prevent relative rotation between said first ring and said housing.

* * * * *